United States Patent
Sekiguchi et al.

(10) Patent No.: US 10,891,751 B2
(45) Date of Patent: Jan. 12, 2021

(54) RANGE IMAGE GENERATING METHOD, RANGE IMAGE GENERATING APPARATUS, AND ON-BOARD DEVICE HAVING RANGE IMAGE GENERATING FUNCTION

(71) Applicants: Hiroyoshi Sekiguchi, Kanagawa (JP);
Soichiro Yokota, Kanagawa (JP);
Kenichiroh Saisho, Tokyo (JP)

(72) Inventors: Hiroyoshi Sekiguchi, Kanagawa (JP);
Soichiro Yokota, Kanagawa (JP);
Kenichiroh Saisho, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 156 days.

(21) Appl. No.: 16/253,839

(22) Filed: Jan. 22, 2019

(65) Prior Publication Data

US 2019/0228537 A1 Jul. 25, 2019

(30) Foreign Application Priority Data

Jan. 23, 2018 (JP) .................................. 2018-009067
Dec. 26, 2018 (JP) .................................. 2018-243505

(51) Int. Cl.
*G06T 17/00* (2006.01)
*G06T 7/593* (2017.01)
(Continued)

(52) U.S. Cl.
CPC .............. *G06T 7/593* (2017.01); *B60R 11/04* (2013.01); *G01S 17/08* (2013.01); *G01S 17/89* (2013.01);
(Continued)

(58) Field of Classification Search
CPC ..... G01S 17/894; G01S 17/86; H04N 13/239; H04N 2013/0081; H04N 13/254;
(Continued)

(56) References Cited

U.S. PATENT DOCUMENTS 5,633,705 A 5/1997 Asayama
2013/0010106 A1 1/2013 Yokota
(Continued)

FOREIGN PATENT DOCUMENTS

JP 2001-216571 8/2001
JP 3212218 9/2001
(Continued)

OTHER PUBLICATIONS

Jan Fischer et al: "Combination of Time-of-Flight depth and stereo using semiglobal optimization", Robotics and Automation (ICRA), 2011 IEEE International Conference on, IEEE, May 9, 2011, pp. 3548-3553.

(Continued)

*Primary Examiner* — Brian Werner
(74) *Attorney, Agent, or Firm* — IPUSA, PLLC

(57) ABSTRACT

An image processing method of generating a range image is provided. The method includes a step of detecting a distance to the object as a measured distance, by a distance measurement unit; a step of performing, by an image processing unit, integration of the distance with a matching evaluation value of a pixel in a stereogram corresponding to a location on the object of which the distance is detected by the distance measurement unit, among a plurality of pixels in the stereogram each including a corresponding matching evaluation value; and a step of generating a range image based on a result of the integration. The generating step is performed after the integration.

15 Claims, 50 Drawing Sheets

(51) Int. Cl.
  *G01S 17/08* (2006.01)
  *H04N 5/232* (2006.01)
  *B60R 11/04* (2006.01)
  *G01S 17/89* (2020.01)
  *G06T 7/521* (2017.01)
  *G01S 17/931* (2020.01)

(52) U.S. Cl.
  CPC ............ *G01S 17/931* (2020.01); *G06T 7/521* (2017.01); *H04N 5/23229* (2013.01); *G06T 2207/10028* (2013.01); *G06T 2207/30252* (2013.01)

(58) Field of Classification Search
  CPC ........... G06T 7/593; G06T 2207/10028; G06T 7/521; G06T 2200/04
  See application file for complete search history.

(56) References Cited

U.S. PATENT DOCUMENTS

| | | | |
|---|---|---|---|
| 2015/0332103 A1 | 11/2015 | Yokota et al. | |
| 2016/0349371 A1 | 12/2016 | Suzuki et al. | |
| 2017/0123063 A1 | 5/2017 | Yamashita et al. | |
| 2018/0120108 A1 | 5/2018 | Takahashi et al. | |
| 2018/0165834 A1 | 6/2018 | Sekiguchi et al. | |
| 2020/0183411 A1* | 6/2020 | Oba | B60W 30/165 |

FOREIGN PATENT DOCUMENTS

| | | |
|---|---|---|
| JP | 4265931 | 5/2009 |
| JP | 5682065 | 3/2015 |
| JP | 2015-143679 | 8/2015 |
| JP | 2015-179077 | 10/2015 |
| JP | 2017-083430 | 5/2017 |

OTHER PUBLICATIONS

Carlo Dal Mutto: "A probabilistic approach to tof and stereo data fusion.", 3DPVT, Paris, France 2, Jan. 1, 2010, Retrieved from the Internet: URL:http://www.researchgate.net/profile/Carlo_Dal_Mutto/publication/228745267_A_probabilistic_approach_to_tof_and_stereo_data_fusion/links/00b7d516c3359577f1000000.pdf [retrieved on Aug. 31, 2015].

Uwe Hahne et al: "Combining Time-Of-Flight depth and stereo images without accurate extrinsic calibration", International Journal of Intelligent Systems Technologies and Applications, vol. 5, No. 3/4, Jan. 1, 2008, pp. 325-333.

Extended European search report for 19152873.6 dated Apr. 25, 2019.

Hernán Badino et al., "Integrating LIDAR into Stereo for Fast and Improved Disparity Computation", China, 2011 International Conference on 3D Imaging, Modeling, Processing, Visualization and Transmission, May 16, 2011.

* cited by examiner

CAPTURING RANGE

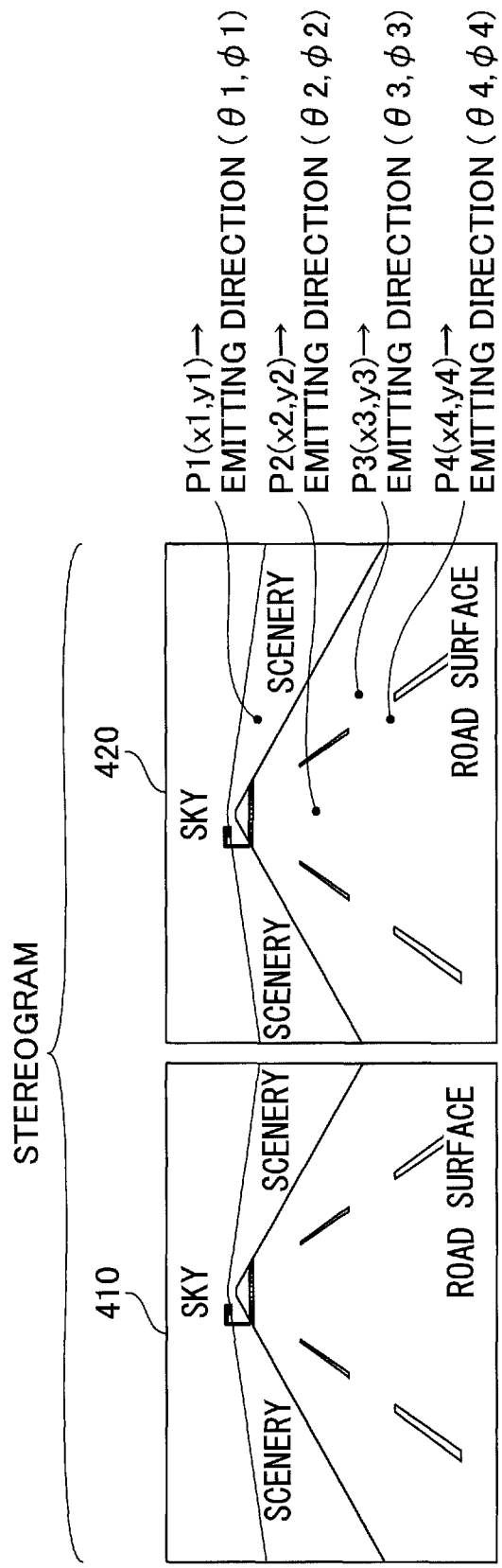

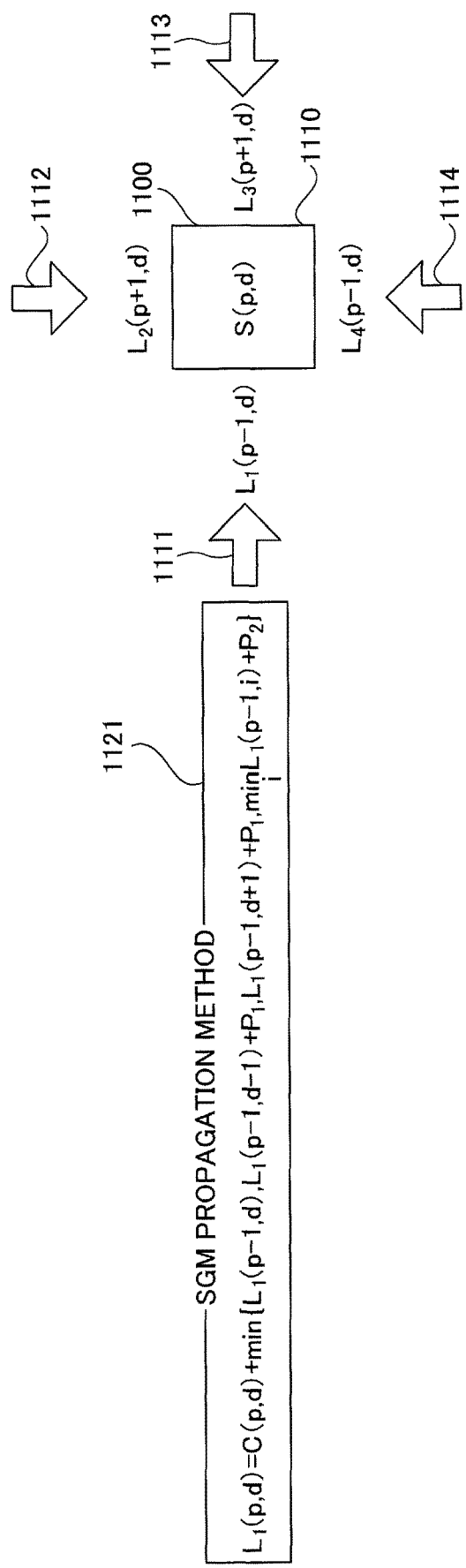

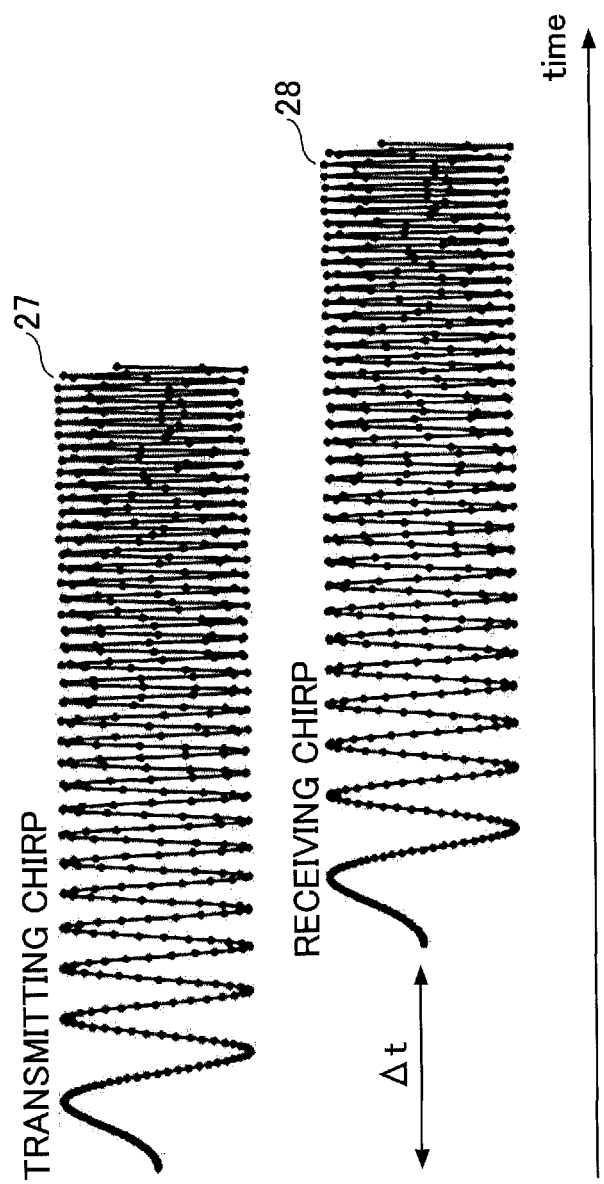

Road surface distance appears

Only small amount of
road surface distance appears
(because of dilation of chart image)

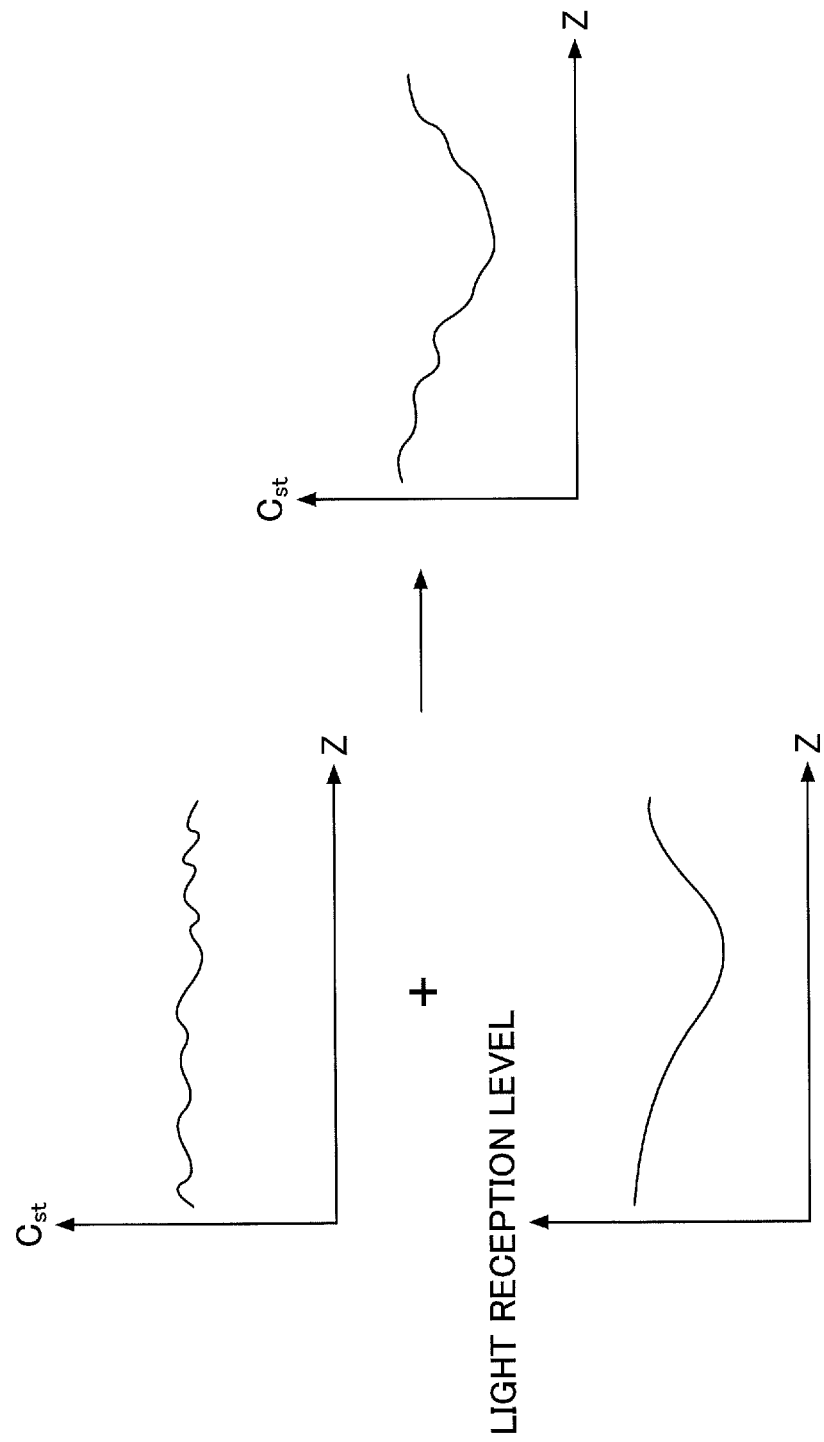

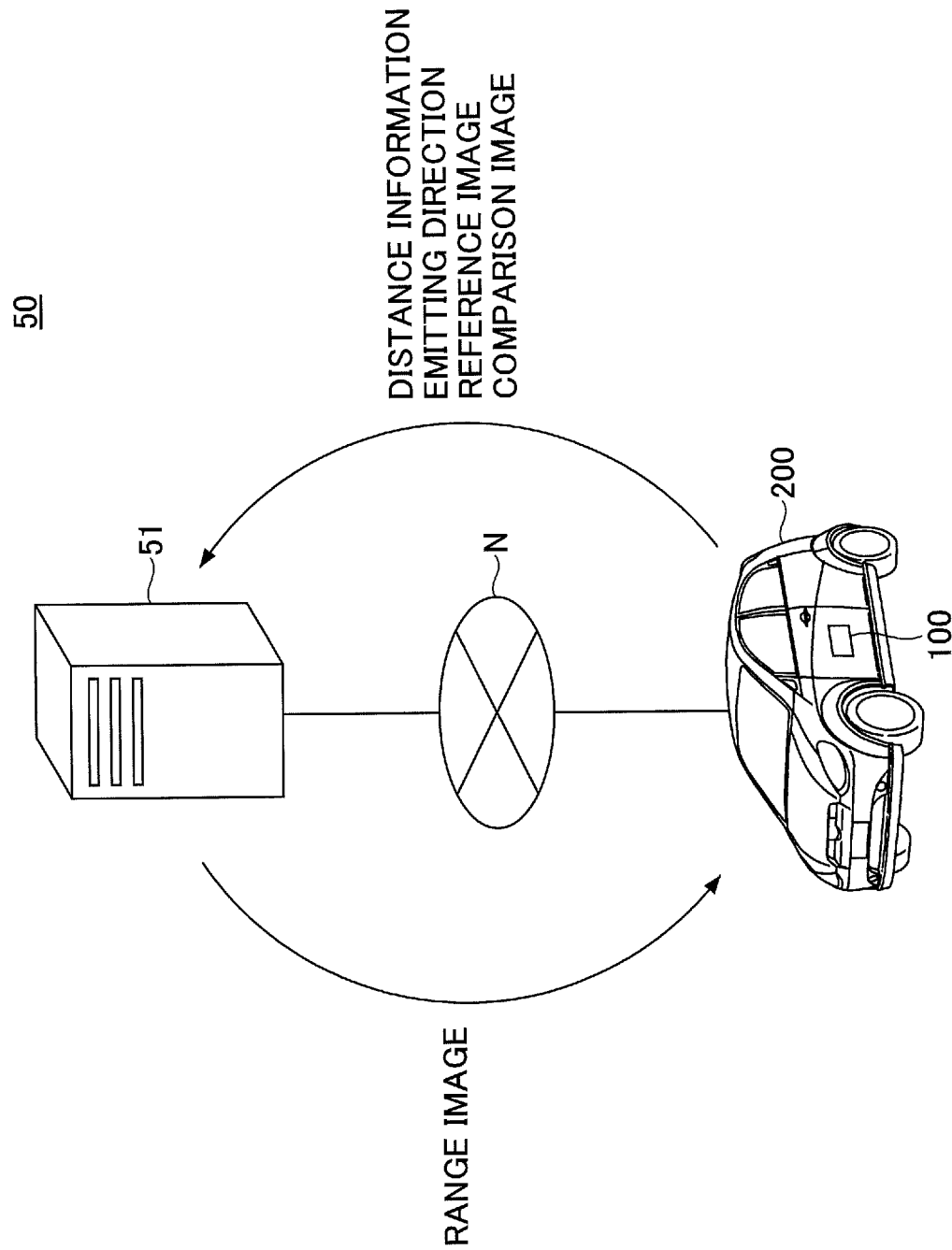

RANGE IMAGE GENERATING METHOD, RANGE IMAGE GENERATING APPARATUS, AND ON-BOARD DEVICE HAVING RANGE IMAGE GENERATING FUNCTION

CROSS-REFERENCE TO RELATED APPLICATION

The present application claims priority under 35 U.S.C. § 119 to Japanese Patent Application No. 2018-009067, filed on Jan. 23, 2018, and Japanese Patent Application No. 2018-243505, filed on Dec. 26, 2018, the contents of which are incorporated herein by reference in their entirety.

BACKGROUND OF THE INVENTION

1. Field of the Invention

The present disclosure relates to an image processing method, an image processing apparatus, and an on-board device.

2. Description of the Related Art

Conventionally, in a technical field of a stereocamera, as a parallax calculation algorithm for calculating parallax for each pixel, a block matching method of a feature point, a semi-global-matching (SGM) propagation method, and the like, are known. In these methods, when finding a feature point from each of an image of a left side and an image of a right side, a cost is calculated for each parallax, and a parallax having a minimum cost that is found in a search space is obtained as an integer parallax. Further, a parallax d including a subpixel parallax estimated by a predetermined calculation method is calculated, and a distance corresponding to each pixel is calculated using an expression indicating a relationship between the parallax d and a distance Z ($Z=BF/d$). That is, the above mentioned methods can be said that a method of voting cost in a parallax space (note that B is a distance between cameras, and F is a focal length).

In the above mentioned conventional parallax space cost voting method, it is known that assuring distance resolution is difficult for a remote region having a small integer parallax (that is, having a large distance Z). Thus, in a remote region, variance of a calculation result of parallax is larger, and variance of a measured value of distance tends to be larger.

For example, in a case in which a distance measurement system is installed on a vehicle, as exemplified by autonomous driving technology, accuracy of distance measurement of a remote place tends to be required. To meet the requirement, by using LIDAR (Light Detection And Ranging, or Laser Imaging Detection And Ranging) not having high spatial resolution but having high distance resolution, a method of integrating a measured result that is measured by a stereocamera (having high spatial resolution but not having high distance resolution of a remote place) and a measured result that is measure by LIDAR is known (the above mentioned integration may also be referred to as "fusion"). By the fusion, a sensor having measurement performance exceeding performance limits of a stereocamera and LIDAR can be developed. That is, even when measuring a distance in a remote place, a range image having small variance of distance resolution and high spatial resolution may be able to output. For example, it is expected that the fusion enables highly accurate distance measurement, low variance of a measured distance value, separation of discontinuous surface, and improvement of robustness with respect to environment.

As an example of the above mentioned fusion, a method of correlating distance information obtained by LIDAR with a depth image captured by a stereocamera is known (see Non-Patent Document 1 for example). Non-Patent Document 1 discloses a fusion method for increasing density of a low-texture region in a parallax image by using distance information obtained from LIDAR.

However, the technique disclosed in Non-Patent Document 1 does not necessarily perform integration by utilizing advantages of both distance measurement methods. Generally, in an integration method of related arts, after a stereocamera outputs a range image by performing the block matching, distance information measured by LIDAR is added to the range image. In this method, because error in the range image output from the stereocamera is large, improvement of accuracy was limited even if the distance information obtained from the LIDAR was added.

That is, in the technique of related art, integration of LIDAR, which does not have high spatial resolution but has high distance resolution, and a stereocamera, which has high spatial resolution but does not have high distance resolution of a remote place, is not sufficient.

CITATION LIST

Non-Patent Literature

[Non-Patent Document 1] Hernan Badino et al., "Integrating LIDAR into Stereo for Fast and Improved Disparity Computation", China, 2011 International Conference on 3D Imaging, Modeling, Processing, Visualization and Transmission, 16 May 2011

SUMMARY OF THE INVENTION

According to one aspect of the present disclosure, an image processing method of generating a range image is provided. The method includes a step of detecting a distance to the object as a measured distance by a distance measurement unit; a step of performing, by an image processing unit, integration of the distance with a matching evaluation value of a pixel in a stereogram corresponding to a location on the object of which the distance is detected by the distance measurement unit, among a plurality of pixels in the stereogram each including a corresponding matching evaluation value; and a step of generating a range image for measuring a distance to an object based on a result of the integration. The generating step is performed after the integration.

BRIEF DESCRIPTION OF THE DRAWINGS

FIGS. 11A to 11C are diagrams illustrating a relationship between a position to which laser light is emitted by the laser radar distance measurement unit and a position of a pixel of a reference image of a stereogram captured by the stereogram processing unit;

FIG. 16 is a schematic diagram illustrating the process for calculating propagation cost $L_r$ by using the SGM algorithm;

FIGS. 31A to 31C are diagrams for explaining frequencies of the transmitting wave and the receiving wave;

FIGS. 48A and 48B are diagrams illustrating integration of a light reception level associated with distance information with stereo matching cost $C_{ST}(p, Z)$;

FIG. 49 is a schematic diagram of a range image provision system; and

DESCRIPTION OF THE EMBODIMENTS

In the following, as embodiments of the present disclosure, a distance measurement system, and a method of measuring a distance (distance measurement method) performed by the distance measurement system will be described.

First Embodiment

<Distance Measurement Performance of LIDAR and Stereocamera>

Figure 1A:
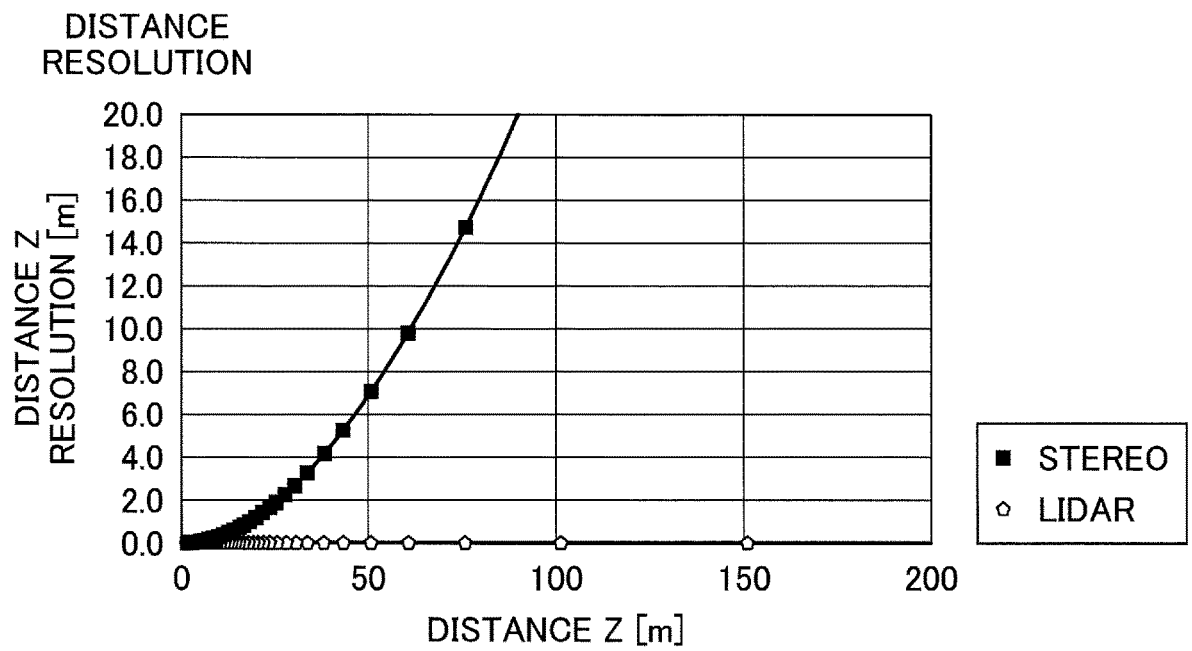
FIGS. 1A to 1C are graphs for explaining performance of LIDAR and a stereocamera.

First, distance measuring performance of LIDAR and a stereocamera will be described with reference to FIGS. 1A to 1C. FIG. 1A is a graph illustrating a relationship between a distance Z and distance resolution, with respect to LIDAR and a stereocamera. Note that, if a value of the distance resolution is smaller, it is expressed as "the distance resolution is superior" or "accuracy of distance measurement is superior" (conversely, if a value of the distance resolution is large, it is expressed as "the distance resolution is poor" or "accuracy of distance measurement is low"). As illustrated in FIG. 1A, the distance resolution of LIDAR is almost constant regardless of a value of the distance Z, but the distance resolution of a stereocamera becomes sharply larger in accordance with increase of the distance Z. That is, with respect to a stereocamera, accuracy of distance measurement greatly degrades in a remote region.

Figure 1B:
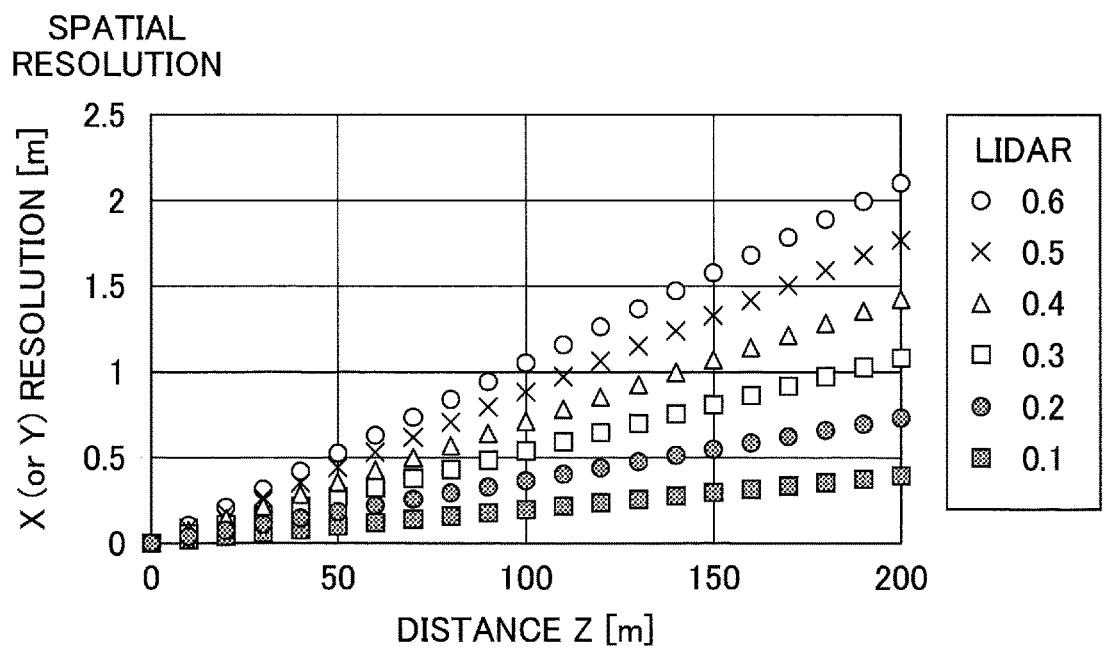

FIG. 1B is a graph illustrating a relationship between a distance Z and spatial resolution with respect to LIDAR. Note that, if a value of the spatial resolution is smaller, it is expressed as "the spatial resolution is superior" or "accuracy of spatial measurement is superior" (conversely, if a value of the spatial resolution is large, it is expressed as "the spatial resolution is poor" or "accuracy of spatial measurement is low"). In FIG. 1B, spatial resolution is illustrated for each emitting interval of 0.1 degrees, 0.2 degrees, 0.3 degrees, 0.4 degrees, 0.5 degrees, and 0.6 degrees (emitting resolution). However, regardless of magnitude of the emitting resolution, the spatial resolution becomes larger in accordance with increase of the distance Z.

Figure 1C:
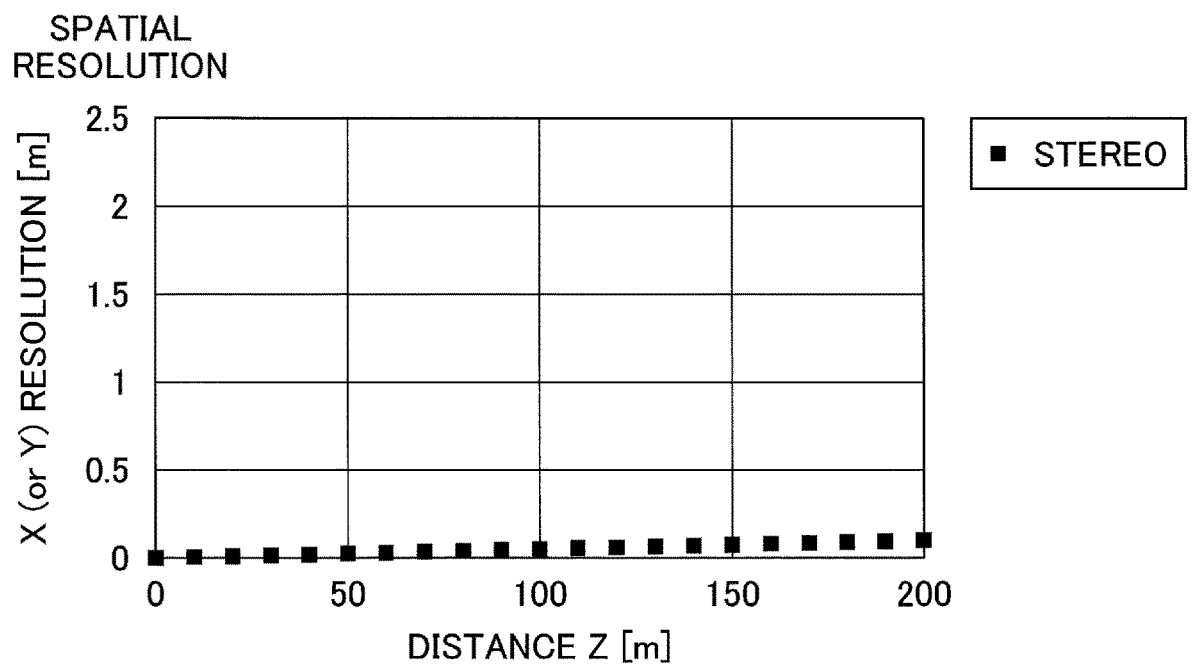

FIG. 1C is a graph illustrating a relationship between a distance Z and spatial resolution with respect to stereocamera. As spatial resolution of a stereocamera is superior because a stereocamera can resolve space for each pixel, the spatial resolution does not sharply increase in accordance with increase of the distance Z.

Based on the above result, the following points need to be improved.

(Problems of Stereocamera)
Because accuracy of distance measurement degrades in a remote region, measuring a distance in a remote region or detecting an object in a remote region is difficult.
In a repetitive pattern or low-texture region, erroneous matching occurs and variance of measured distance tends to be large.
It is difficult to measure distance at night.
(Problems of LIDAR)
Spatial resolution is not good.

A distance measurement system 100 according to embodiments of the present disclosure solves the above problems. Also, as will be described below, when a range image is obtained by using an algorithm called semi-global-matching (SGM), a problem that a boundary of an object is lost in the range image or a problem of dilation of an object region may occur. The distance measurement system 100 according to the embodiments of the present disclosure can suppress occurrence of the above problems.

Terms and Definitions

An act of finding a corresponding point of a certain point is referred to as "matching", and a degree of matching is expressed as an evaluation value. The evaluation value expressing a degree of matching may sometimes be referred to as "cost", "resemblance", or "dissimilarity"). When dissimilarity is low or when a resemblance is high, it means that both points match more. Dissimilarity and a resemblance may be generally expressed as a "matching level".

Figure 2:
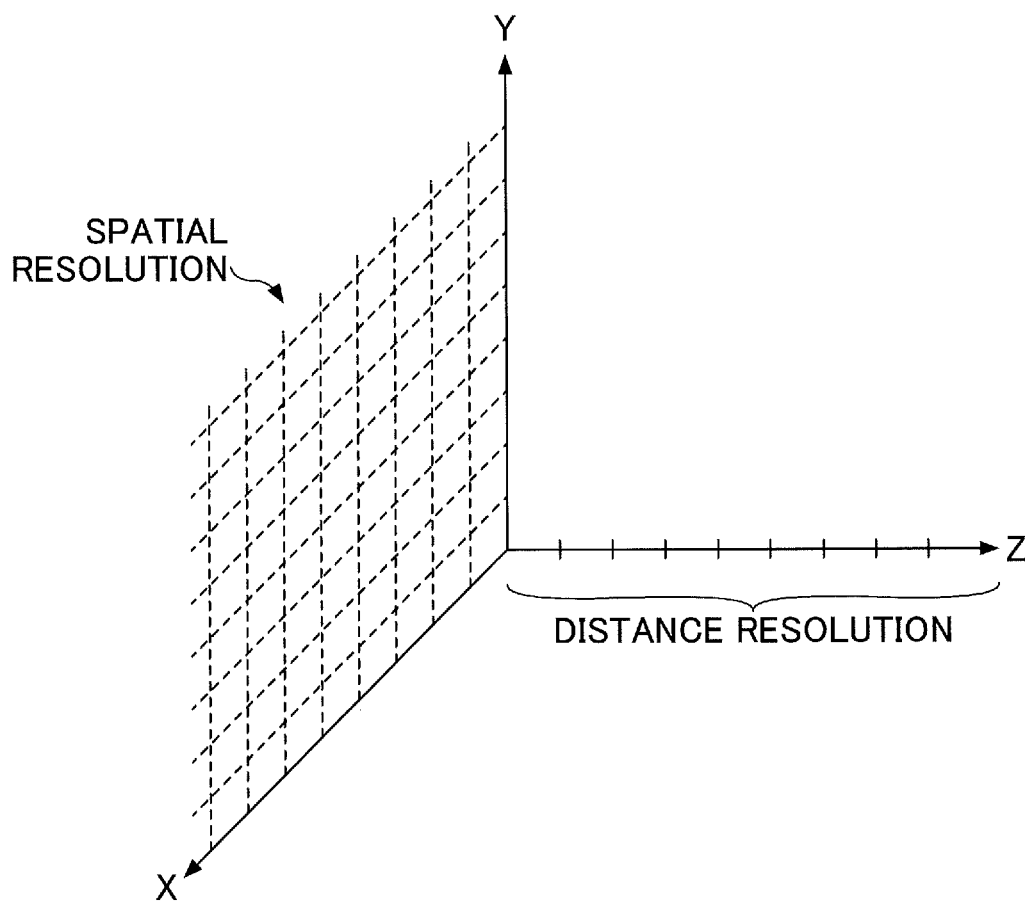
FIG. 2 is a diagram for explaining spatial resolution and distance resolution.

Next, definitions of resolution will be described with reference to FIG. 2. FIG. 2 is a diagram for explaining spatial resolution and distance resolution. Distance resolution is a capability (measure of accuracy) of distinguishing a difference of distance to objects. In a case in which distance resolution (in a Z-direction) is 10 cm, an object that is 12 cm distant from an origin and an object that is 21 cm distant from the origin cannot be distinguished and both of the objects are recognized as a same one (or it is determined that both of the objects are at the same distance).

Spatial resolution is a capability of distinguishing objects that are separate from each other on a two-dimensional space. In a case in which spatial resolution is 5 cm, two objects that are 4 cm distant from each other on an XY-plane cannot be distinguished, and the two objects are recognized as a single object. Spatial resolution may also be referred to as "angle resolution".

Measurement direction means a direction when a distance to an object is measured, and means a direction where the object is positioned. A pixel specified by a measurement direction includes not only the pixel but also surrounding pixels of the pixel.

A distance evaluation value with respect to distance information represents an evaluation value (cost) determined in accordance with uncertainty of distance to a pixel (or surrounding pixels) specified with an emitting direction of an electromagnetic wave. In the present embodiment, the distance cost may be referred to as LIDAR cost $C_{LI}(p, Z)$. A matching evaluation value represents a degree of matching measured by block matching. In the present embodiment, the matching evaluation value may be referred to as stereo matching cost $C_{ST}(p, Z)$.

<Overview of Distance Measurement System>

Figure 3:
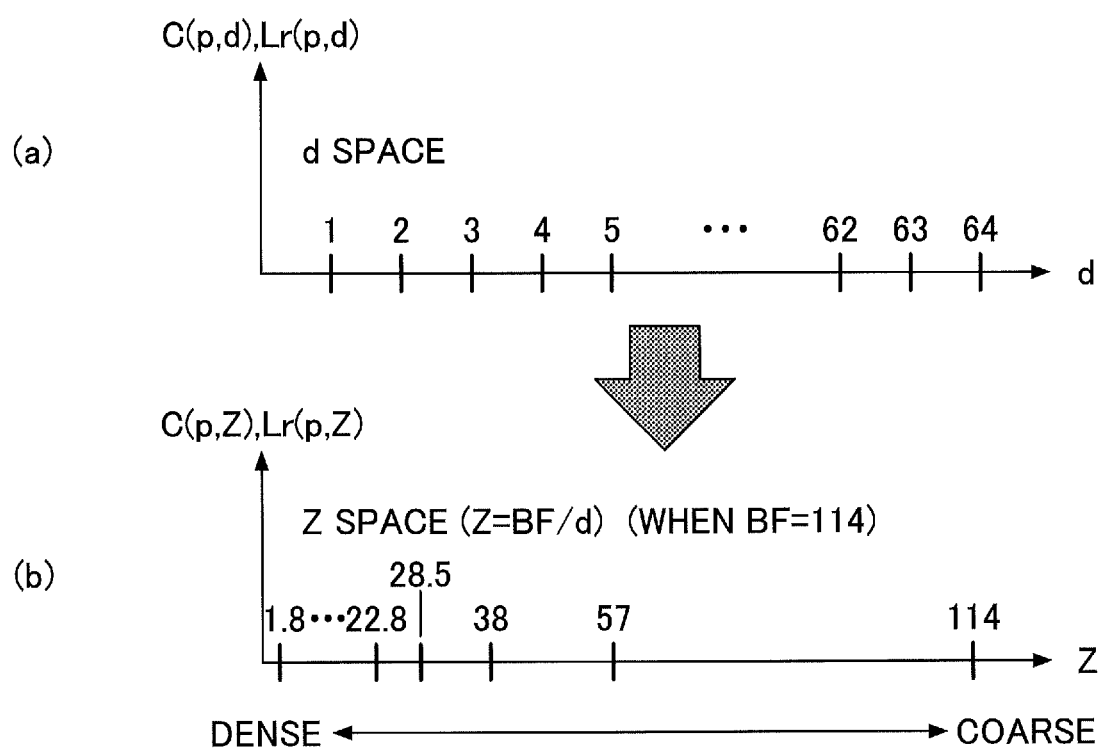
FIG. 3 is a diagram for explaining a distance Z that is obtained by using a general parallax space.

FIG. 3 is a diagram for explaining a distance Z that is obtained by using a general parallax space. A graph (a) of FIG. 3 is for illustrating a cost C(p, d) or a propagation cost $L_r(p, d)$ by using a block matching and an SGM algorithm, and a horizontal axis of the graph (a) represents a shift amount (to be described below). The graph (a) of FIG. 3 is an example in which a search range is 64 pixels. A variable p represents a pixel under consideration (may also be referred to as a "target pixel"), and a variable d represents a shift amount (searched parallax) between a reference image and a comparison image. The smallest cost C(p, d) or the smallest propagation cost $L_r(p, d)$ in the search range of 64-pixel is adopted as a parallax (integer parallax) of the target pixel p.

A graph (b) of FIG. 3 illustrates a cost C(p, Z) or a propagation cost $L_r(p, Z)$ in Z-space. Note that the distance Z is obtained from the parallax d in the graph (a) by using the following formula (1).

$$Z = BF/d \qquad (1)$$

In the above formula (1), B represents a distance between optical axes of a left camera and a right camera for a stereocamera, and F represents focal length of the left and right cameras. As illustrated in the graph (b), in the Z-space, density of the distances Z's with respect to which the cost C(p, Z) or the propagation cost $L_r(p, Z)$ is obtained is not constant. This is because a variable d is included in a denominator of the formula (1) used for calculating the distance Z. That is, the distance Z is inversely proportional to the variable d, and the distance Z greatly varies in a case in which a value of the variable d is close to 0.

Accordingly, in a general block matching method, it is equivalent that coarse cost propagation is performed with respect to a remote region. Thus, it is difficult to perform highly accurate distance measurement with respect to a remote region.

Figure 4:
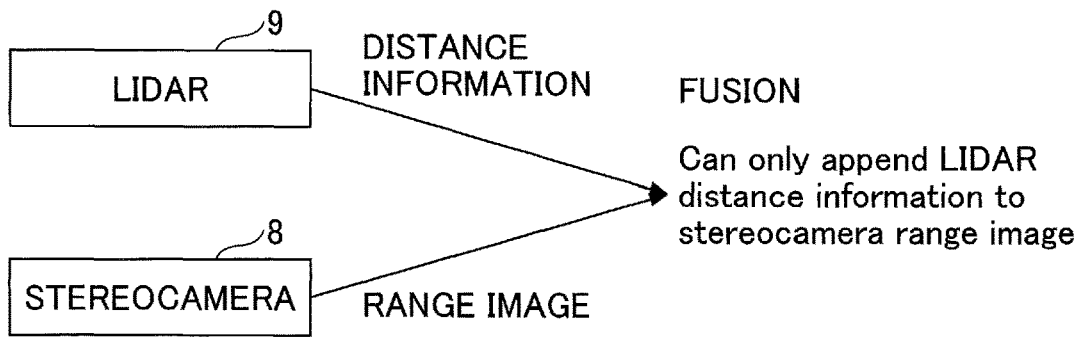
FIG. 4 is a diagram illustrating an example of a conventional integration method of distance information of LIDAR and a range image of a stereocamera.

FIG. 4 is a diagram illustrating an example of a conventional integration (fusion) method of distance information of a LIDAR 9 and a range image of a stereocamera 8. In a general conventional integration method, after the stereocamera 8 outputs a range image by performing the block matching, the LIDAR 9 added distance information measured by the LIDAR 9 to the range image. In this method, as described above with reference to FIG. 3, because error in the range image output from the stereocamera 8 is large, improvement of accuracy was limited even if the distance information obtained from the LIDAR 9 was added.

Figure 5A:
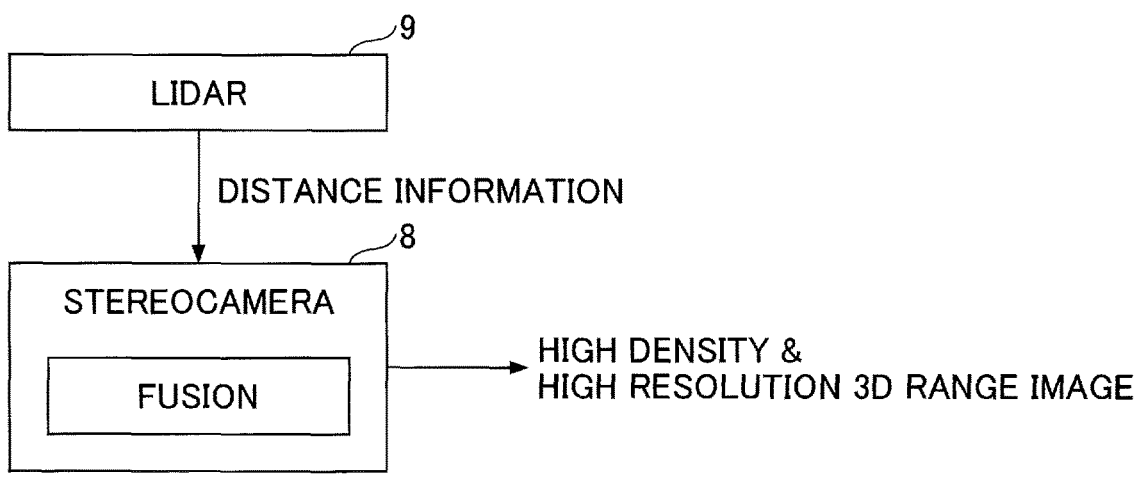
FIGS. 5A and 5B are diagrams illustrating an example of an integration method of distance information of LIDAR and a range image of a stereocamera according to an embodiment.

In the present embodiment, as illustrated in FIG. 5A, distance information measured by the LIDAR 9 is integrated before the stereocamera 8 outputs a range image generated by the block matching or the like. FIG. 5A is a diagram illustrating an example of an integration method of distance information of the LIDAR 9 and a range image of the stereocamera 8. Before the stereocamera 8 outputs a range image, the stereocamera 8 integrates distance information measured by the LIDAR 9 with cost $C(p, Z)$.

Figure 5B:
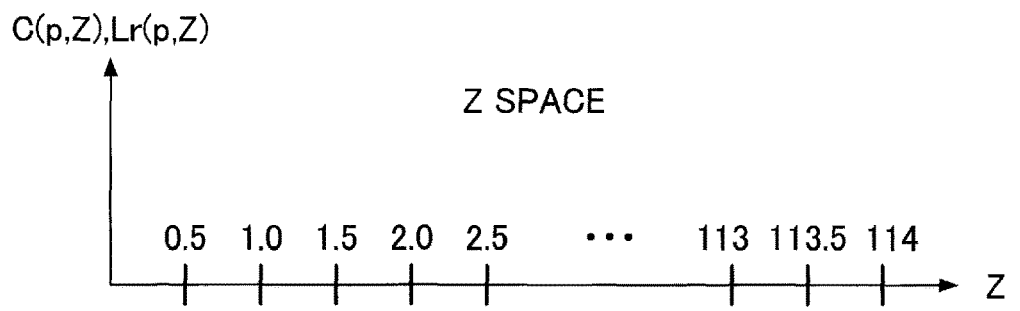

As illustrated in FIG. 5B, when integrating distance information, the stereocamera 8 calculates cost $C(p, Z)$ in the Z-space. FIG. 5B illustrates cost $C(p, Z)$ or propagation cost $L_r(p, Z)$ in the Z-space. Z-space having uniform density of the distances is prepared in advance, and in the Z-space, LIDAR cost is added to the cost $C(p, Z)$ calculated by the stereocamera 8. As propagation of cost by the SGM algorithm is also performed in the Z-space, a distance Z having the smallest cost can be identified, and a range image of excellent distance resolution can be obtained. Further, as spatial resolution of a range image is fundamentally excellent, a high-quality and high-resolution range image can be obtained.

As described above, in the distance measurement system according to the present embodiment, because integration of distance information measured by LIDAR is performed in Z-space before a stereocamera outputs a range image generated by the block matching or the like, a high-quality and high-resolution range image can be obtained.

<Application Example of Distance Measurement System>

Figure 6:
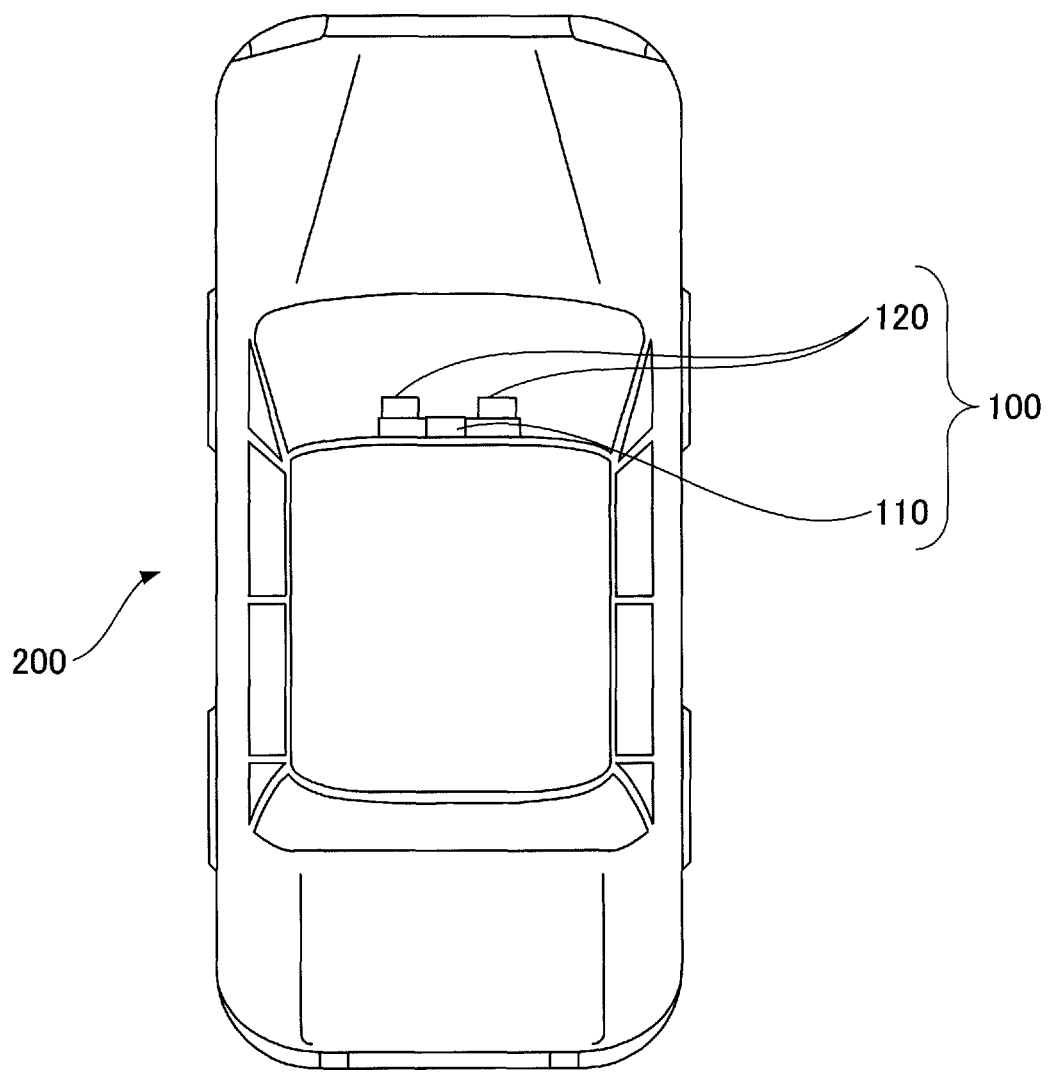
FIG. 6 is a diagram illustrating a distance measurement system installed in an automobile which is an example of a moving body.

An example of application of the distance measurement system 100 will be described with reference to FIG. 6. FIG. 6 is a diagram illustrating the distance measurement system 100 installed in an automobile 200 which is an example of a moving body (in the following, the automobile 200 may also be referred to as a "moving body 200"). In FIG. 6, the distance measurement system 100 is fitted to a central position of a windshield, inside the moving body 200. The distance measurement system 100 includes a laser radar distance measurement unit 110 and a stereogram processing unit 120. Both the laser radar distance measurement unit 110 and the stereogram processing unit 120 are disposed such that a region ahead of the moving body 200 is a region of which a distance is measured. Note that the present embodiment describes a case in which the laser radar distance measurement unit 110 is disposed between two camera units (image capturing units, or may also be referred to as a capturing means) of a stereocamera in the stereogram processing unit 120.

Laser radar may also be referred to as the above mentioned LIDAR (Light Detection and Ranging, or Laser Imaging Detection and Ranging). In the present embodiment, laser radar and LIDAR are not distinguished. Laser radar or LIDAR emits pulses of light in a range out of human vision, and measures time until the emitted light returns, to calculate a distance. When light is emitted to a certain direction and the light returns, the laser radar distance measurement unit 110 records the direction of the light and a measured distance as a point in a 3-D map in which the laser radar distance measurement unit 110 is centered.

Although FIG. 6 illustrates a distance measurement system 100 in which the laser radar distance measurement unit 110 and the stereogram processing unit 120 are unified, the laser radar distance measurement unit 110 and the stereogram processing unit 120 may be separated.

Figure 7:
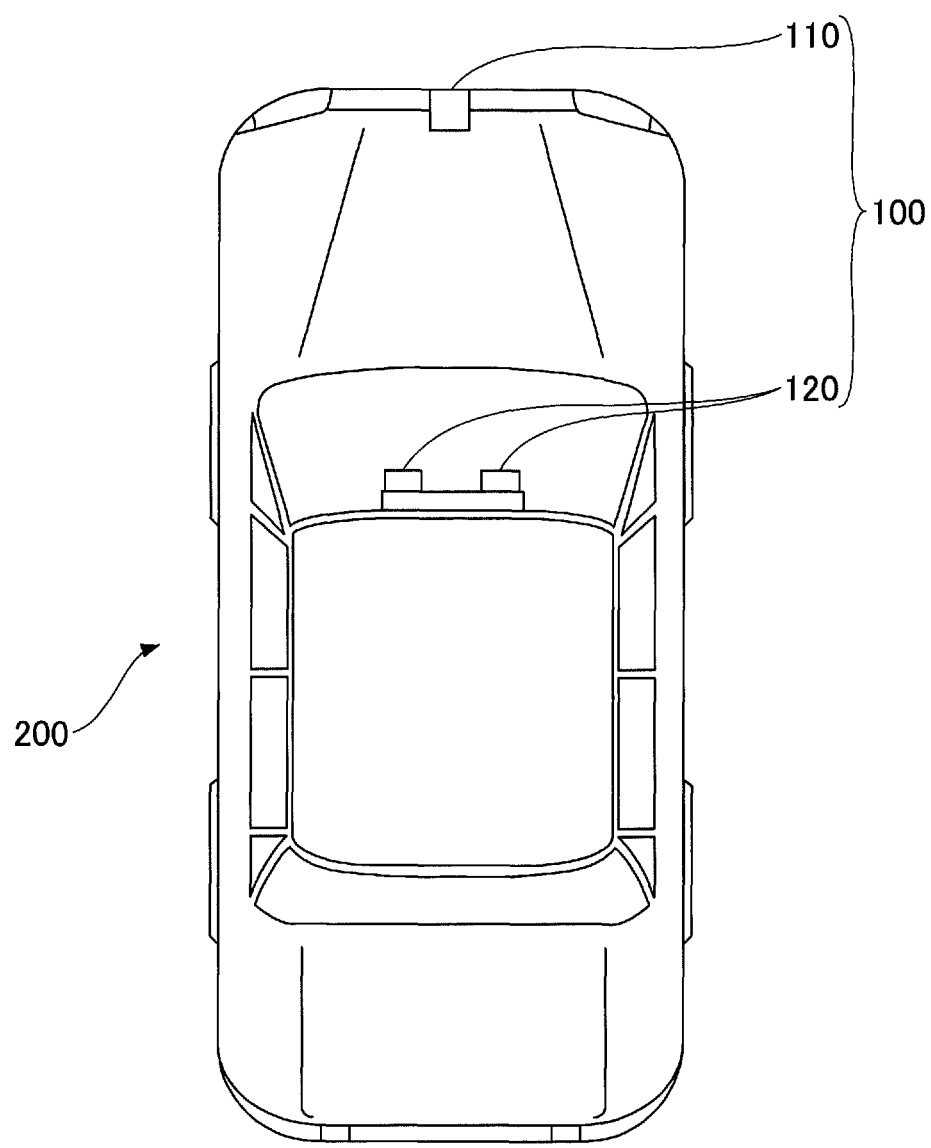
FIG. 7 is a diagram illustrating an example of a distance measurement system in which a laser radar distance measurement unit and a stereogram processing unit are separated.

FIG. 7 is a diagram illustrating an example of a distance measurement system 100 in which the laser radar distance measurement unit 110 and the stereogram processing unit 120 are separated. In FIG. 7, the laser radar distance measurement unit 110 is installed inside a front grille, and the stereogram processing unit 120 is disposed at the front side in a cabin (such as in a vicinity of a back side of a rear-view mirror). In the present embodiment, a configuration of a distance measurement system 100 is not limited to that illustrated in FIG. 6 or FIG. 7, and any configuration may be adopted as long as distance information output from a laser radar distance measurement unit 110 can be integrated with distance information measured by a stereogram processing unit 120.

<Laser Emitting Range of Laser Radar Distance Measurement Unit>

Figure 8A:
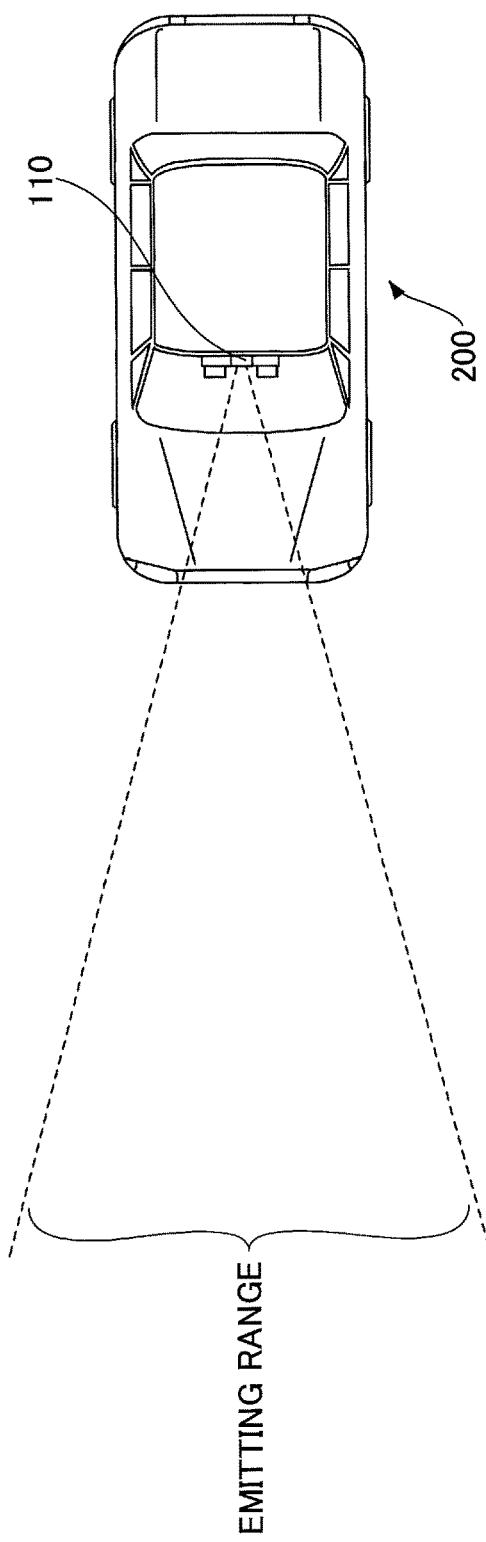
FIGS. 8A and 8B are exemplary diagrams illustrating a range to which the laser radar distance measurement unit emits laser light.
Figure 8B:
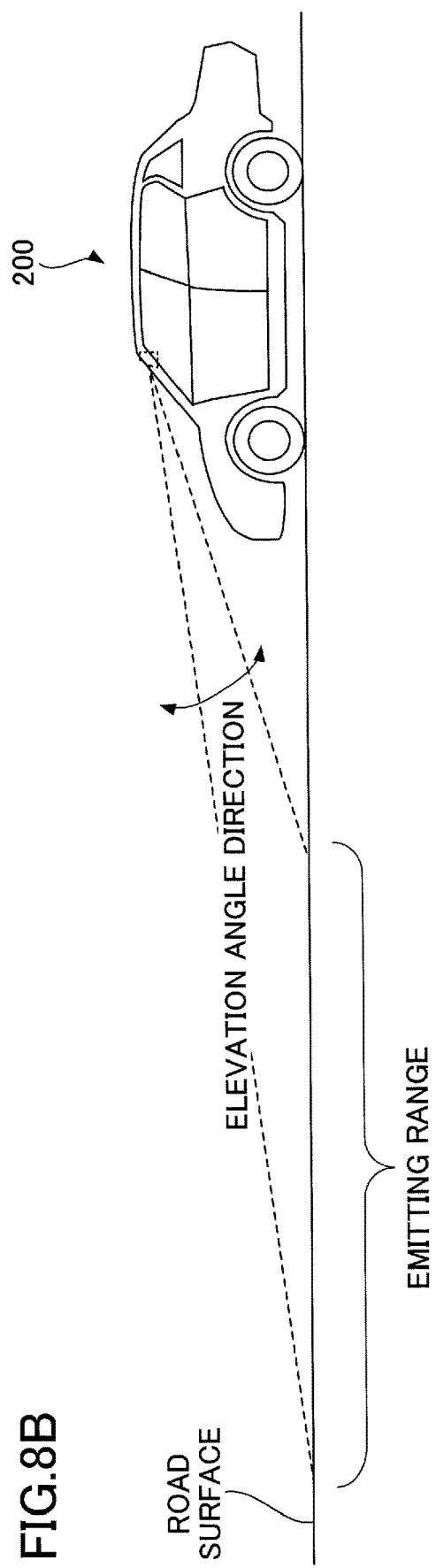

FIGS. 8A and 8B are exemplary diagrams illustrating a range to which the laser radar distance measurement unit 110 emits laser light. FIG. 8A is a top view of the moving body 200, and FIG. 8B is a side view of the moving body 200.

As illustrated in FIG. 8A, the laser radar distance measurement unit 110 emits laser light by scanning horizontally in a predetermined range ahead of an advancing direction of the moving body 200. The laser light may be regarded as light, or may be regarded as electromagnetic wave.

Also, as illustrated in FIG. 8B, the laser radar distance measurement unit 110 emits laser light to a predetermined range ahead of an advancing direction of the moving body 200. The laser radar distance measurement unit 110 can measure distance to a target located approximately up to hundreds of meters ahead, although a distance that the laser light can reach depends on power of the laser radar distance measurement unit 110. With respect to a distance to a target closely located, a distance to a target located less than 1 meter ahead can be measured. However, as there is little need to measure distance to such a target, a range of distance that the laser radar distance measurement unit 110 can measure may be determined in advance.

The laser radar distance measurement unit 110 is configured to scan horizontally while changing a direction of laser light emitted in an elevation angle direction. Accordingly, the laser radar distance measurement unit 110 can emit light over a range from a location close to an installed position of the laser radar distance measurement unit 110 to a location away from the installed position of the laser radar distance measurement unit 110.

<Capturing Range of Stereogram Processing Unit>

Figure 9A:
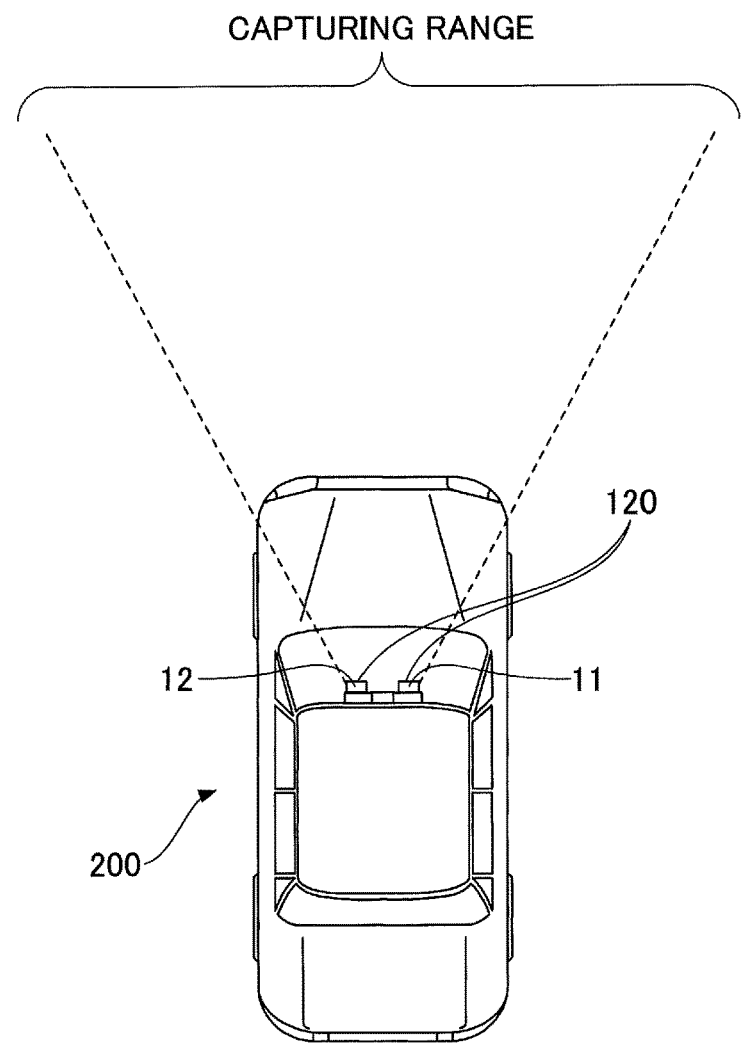
FIGS. 9A to 9C are exemplary diagrams illustrating a range to which the stereogram processing unit can capture an image.
Figure 9B:
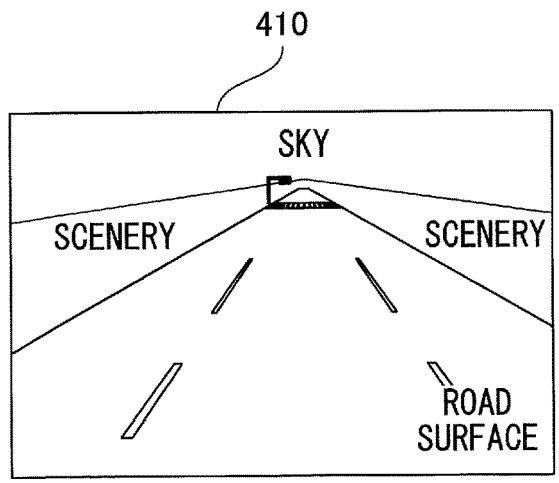
Figure 9C:
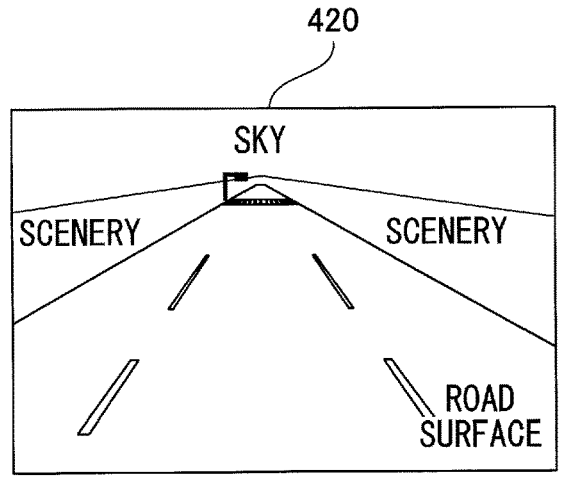

FIGS. 9A to 9C are exemplary diagrams illustrating a range to which the stereogram processing unit 120 can capture an image. A set of a reference image and a comparison image is referred to as a stereogram. FIG. 9A is a top view of the moving body 200. The stereogram processing unit 120 includes two image capturing units (a right camera 11 and a left camera 12) whose optical axes are directed ahead of an advancing direction of the moving body 200 (a set of the right camera 11 and the left camera 12 corresponds to the stereocamera mentioned above), and captures images of a predetermined range in the advancing direction. A part of a range irradiated with laser light overlaps with at least a part of a range captured by the stereocamera.

FIGS. 9B and 9C illustrate images each captured by the right camera 11 and the left camera 12 respectively. In the present embodiment, the image captured by the right camera 11 is referred to as a reference image, and the image captured by the left camera 12 is referred to as a comparison image. The right camera 11 and the left camera 12 are disposed at the same horizontal level, and are spaced from each other at a predetermined distance. Thus, the reference image overlaps the comparison image, but an object in the reference image is located in the comparison image at a position shifted horizontally.

The stereogram processing unit 120 calculates a shift amount (which is parallax) of an object in the comparison image from the object in the reference image, to generate and output a range image. The stereogram processing unit 120 also associates distance information with a pixel of a stereogram.

In another embodiment, either the right camera 11 or the left camera 12 may be omitted. That is, a stereogram can be obtained by using a monocular camera. In the following, a method of generating a stereogram by using a monocular camera will be described with reference to FIGS. 10A and 10B.

Figure 10A:
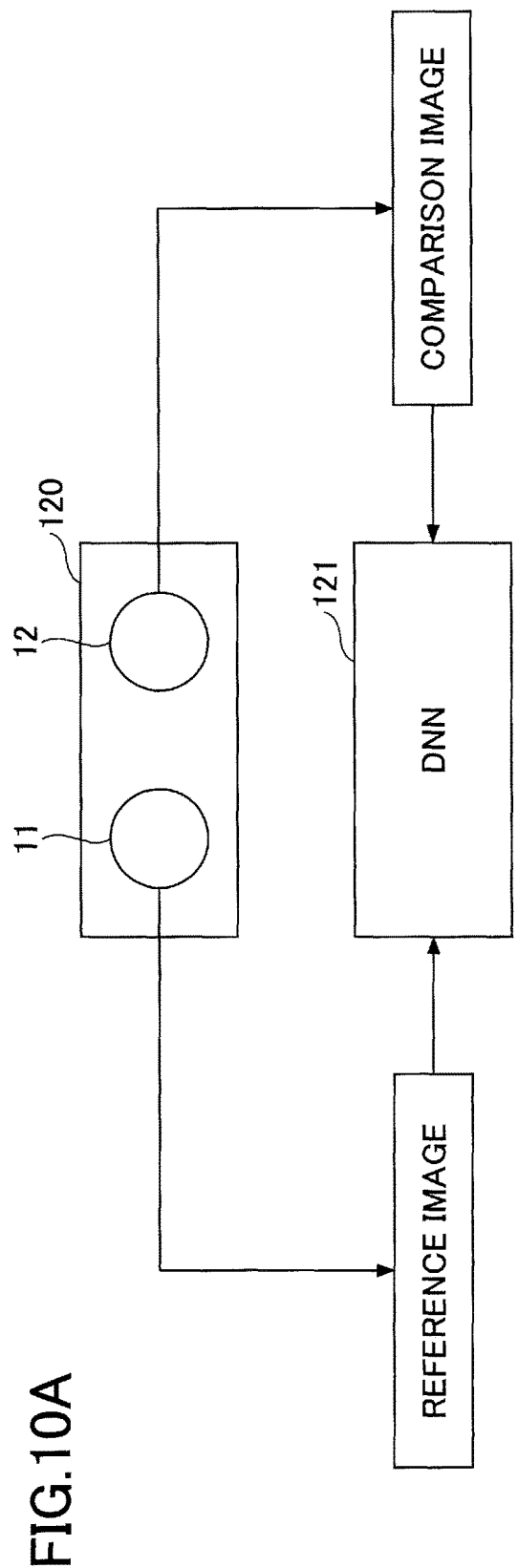
FIGS. 10A and 10B are diagrams illustrating a method of generating a stereogram by using a monocular camera.

FIG. 10A illustrates an example in which the stereogram processing unit 120 has both a right camera 11 and a left camera 12. First, a large number of sets of a reference image and a comparison image are prepared (by using the stereogram processing unit 120 in FIG. 10A), and learning of a comparison image corresponding to a reference image is performed using deep learning (alternatively, learning of a reference image corresponding to a comparison image may be performed). In the following description, a case in which learning of a comparison image corresponding to a reference image is performed will be described.

Each pixel value of a reference image is input to an input layer of a DNN (Deep Neural Network) 121. The DNN 121 also includes an intermediate layer and an output layer. The intermediate layer is formed by combining at least one convolutional layer, at least one pooling layer, a neural network, and an encoder-decoder network, and the intermediate layer is expressed as a set of coefficients of a two-dimensional filter. The output layer outputs each pixel value of an estimated comparison image. Based on a difference between a pixel value output from the output layer and a pixel value of an actual comparison image, coefficients of the two-dimensional filter are adjusted using backpropagation. The adjustment of the coefficients of the two-dimensional filter using a sufficient number of sets of a reference image and a comparison image corresponds to the learning of the DNN 121. Note that initial values of the two-dimensional filter may be obtained by using an autoencoder.

Figure 10B:
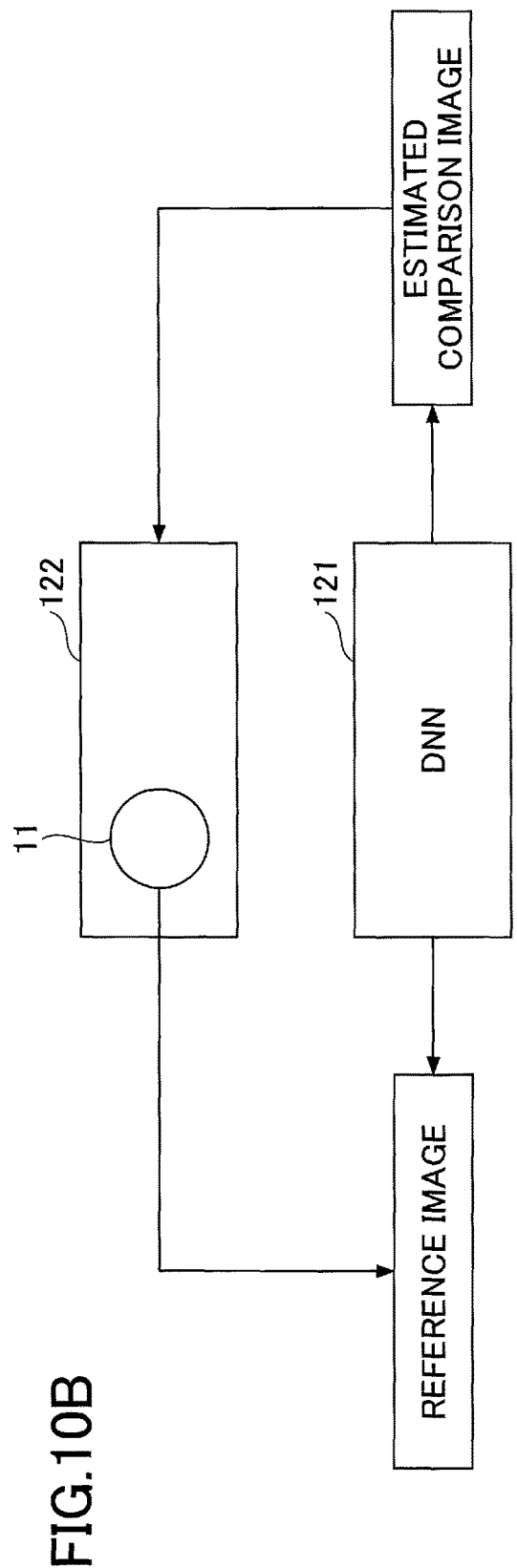

FIG. 10B illustrates an example of a set of a monocular camera processing unit 122 and the DNN 121, which are installed on the moving body 200 after learning process has been completed. When the set of the monocular camera processing unit 122 and the DNN 121 starts working, the monocular camera processing unit 122 outputs a reference image only. The DNN 121 serves as an output unit for outputting a comparison image. When the reference is input to the DNN 121, the DNN 121 outputs an estimated comparison image. Although the estimated comparison image obtained by the set of the monocular camera processing unit 122 and the DNN 121 is not equal to a comparison image captured by a left camera 12, it is confirmed that the estimated comparison image has a quality enough to generate a range image. The monocular camera processing unit 122 performs block matching using the reference image and the estimated comparison image.

Therefore, in the present embodiment, a stereogram can be obtained by using either the right camera 11 or the left camera 12. It is not necessary to have a stereocamera. In other words, a stereogram is necessary in the present embodiment, but a means or method for generating a stereogram is not limited to a specific one.

<Relationship between Laser Light Emitting Position and Stereogram Pixel Position>

Figure 11A:
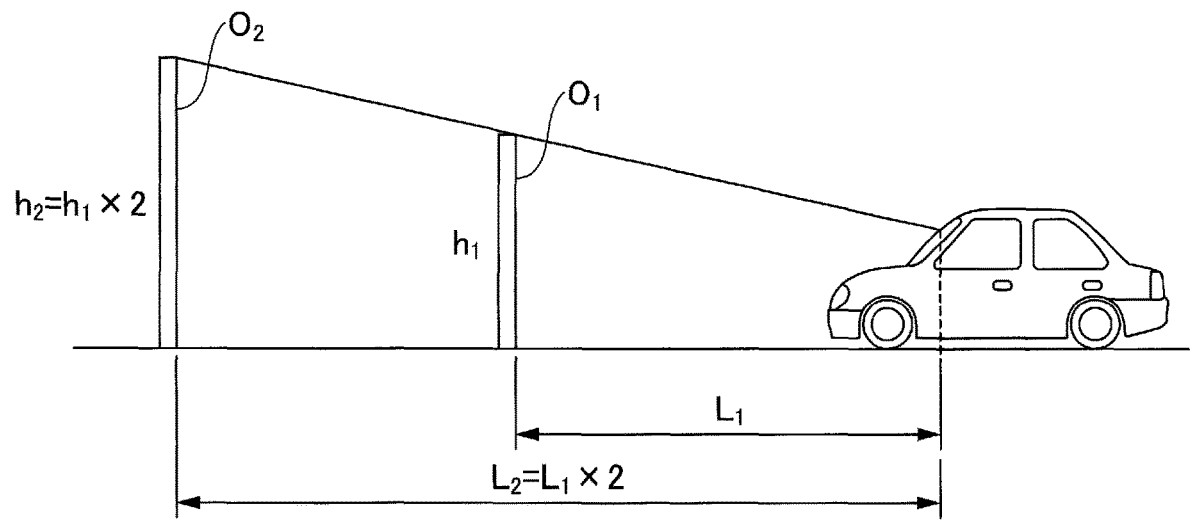
Figure 11B:
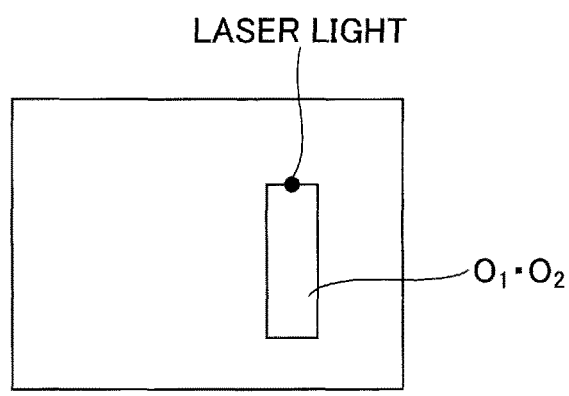

Next, Relationship between a position to which laser light is emitted by the laser radar distance measurement unit 110 and a position of a pixel of a reference image of a stereogram captured by the stereogram processing unit 120 will be described with reference to FIGS. 11A to 11C. FIG. 11A is an exemplary diagram illustrating a relationship between a position to which laser light is emitted and a position of a pixel of a reference image of a stereogram.

A direction to which laser light is emitted by the laser radar distance measurement unit 110 (which may also be referred to as an "emitting direction (of laser)" in the present embodiment) can be correlated with a position of a pixel of a reference image in advance. In FIG. 11A, two objects $O_1$ and $O_2$ seen from a side view, and an example of a reference image on which the objects $O_1$ and $O_2$ are captured is illustrated in FIG. 11B. As the objects $O_1$ and $O_2$ are positioned on a same line passing through the object $O_1$ (or $O_2$) and the laser radar distance measurement unit 110 or the right camera 11, the object $O_1$ is layered on the object $O_2$ in the reference image.

Suppose a case in which a height $h_2$ of the object $O_2$ is double a height $h_1$ of the object $O_1$, and a distance $L_2$ from the moving body 200 to the object $O_2$ is double a distance $L_1$ from the moving body 200 to the object $O_1$ because a height of the laser radar distance measurement unit 110 from a road surface is much smaller than a distance $L_1$ from the moving body 200 to an object $O_1$. As a ratio of height $(h_1)$ to distance $(L_1)$ with respect to the object $O_1$ is the same as a ratio of height $(h_2)$ to distance $(L_2)$ with respect to the object $O_2$, the objects $O_1$ and $O_2$ appear on the reference image in the same size. Also, because of a positional relationship among the objects $O_1$ and $O_2$ and the moving body 200, the object $O_1$ is layered on the object $O_2$ in the reference image. Therefore, if laser light passed on the top end of the objects $O_1$ and $O_2$, the laser light would appear on the top end of the objects $O_1$ and $O_2$ in the reference image captured by the stereogram processing unit 120 (note that the laser light does not actually appear on the reference image visually because the laser light is not visible light). As described above, as there is a one-to-one correspondence between a laser light emitting direction and a pixel position of a reference image, they can be correlated with each other in advance.

In FIG. 11C, emitting directions corresponding to pixels P1 to P4 in a reference image are illustrated. For example, a pixel of coordinates P1 (x1, y1) corresponds to an emitting direction of θ1 in a horizontal angle direction and Φ1 in an elevation angle direction, a pixel of coordinates P2 (x2, y2) corresponds to an emitting direction of θ2 in the horizontal angle direction and Φ2 in the elevation angle direction, a pixel of coordinates P3 (x3, y3) corresponds to an emitting direction of θ3 in the horizontal angle direction and Φ3 in the elevation angle direction, and a pixel of coordinates P4 (x4, y4) corresponds to an emitting direction of θ4 in the horizontal angle direction and Φ4 in the elevation angle direction.

Therefore, when the laser radar distance measurement unit 110 outputs an emitting direction and distance information, the stereogram processing unit 120 can correlate the measured distance information with a pixel.

<Functional Configuration of Laser Radar Distance Measurement Unit>

Figure 12:
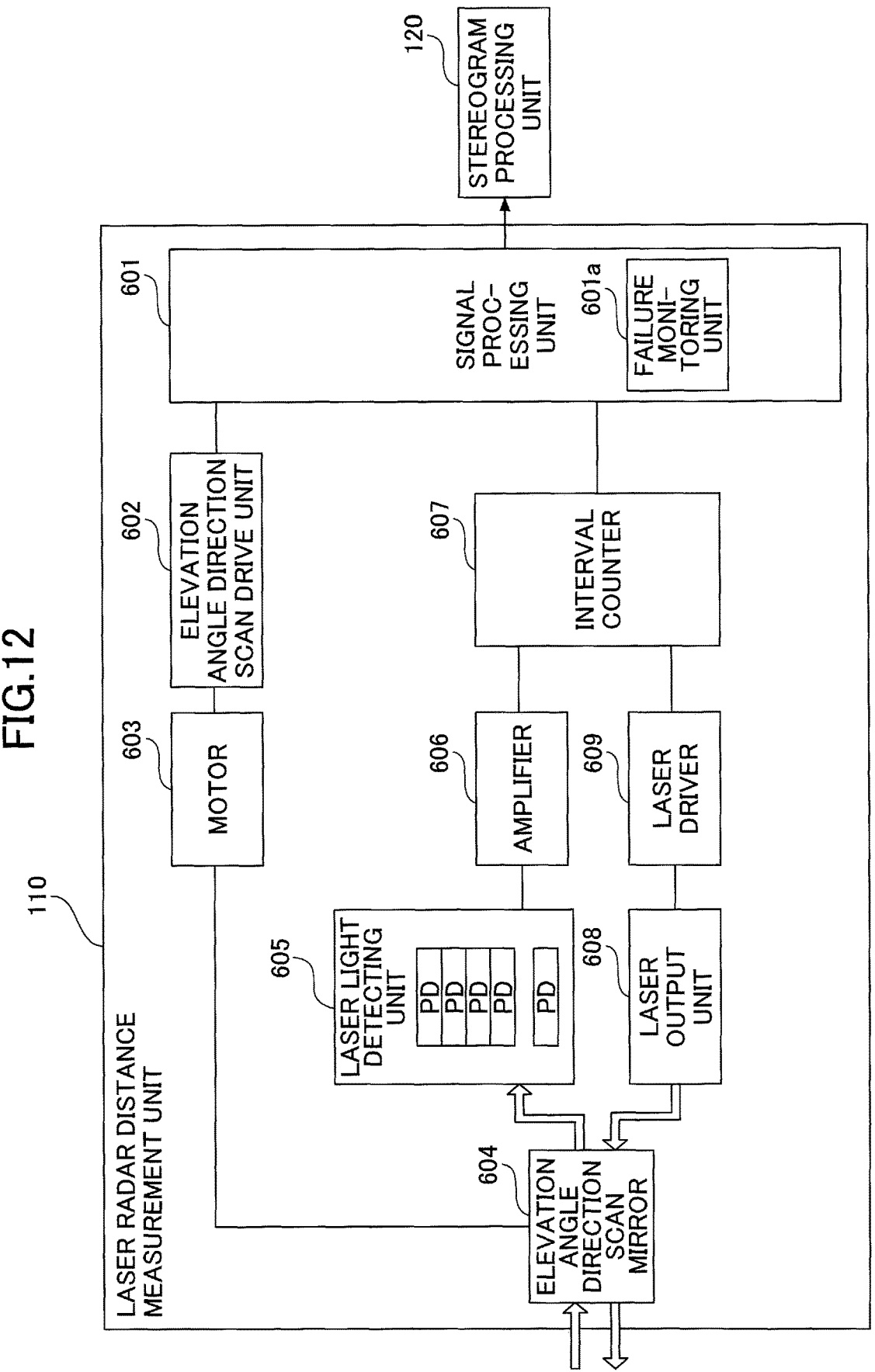
FIG. 12 illustrates an example of a functional block diagram of the laser radar distance measurement unit.

FIG. 12 illustrates an example of a functional block diagram of the laser radar distance measurement unit 110. The laser radar distance measurement unit 110 includes a signal processing unit 601, an elevation angle direction scan drive unit 602, a motor 603, an elevation angle direction scan mirror 604, a laser light detecting unit 605, an amplifier 606, an interval counter 607, a laser output unit 608, and a laser driver 609.

Based on an instruction from the signal processing unit 601, the elevation angle direction scan drive unit 602 actuates the motor 603 to rotate the elevation angle direction scan mirror 604 in the elevation angle direction. By the operation being performed, the elevation angle direction scan mirror 604 rotates in the elevation angle direction.

Further, based on an instruction from the signal processing unit 601, the laser driver 609 is activated, and the laser output unit 608 emits laser light. At this time, information of a time (may also be referred to as "output timing") when the laser light is temporarily emitted is retained in the interval counter 607. As the laser light emitted by the laser output unit 608 is output via the elevation angle direction scan mirror 604, a predetermined range is irradiated with the laser light.

The output laser light is reflected by an object located in an emitting direction, and the reflected light is received by the laser light detecting unit 605 via the elevation, angle direction scan mirror 604. The laser light detecting unit 605 includes multiple photodetectors (PD's) which are arranged vertically. The laser light that has entered the laser light detecting unit 605 is received by one of the photodetectors, and is converted to an electrical signal.

The electrical signal generated by the laser light detecting unit 605 is amplified at the amplifier 606, and is input to the interval counter 607. Based on the output timing of the laser light emitted by the laser output unit 608 and a time (may also be referred to as reception timing) when the reflected laser light is received at the laser light detecting unit 605, the interval counter 607 calculates a time interval.

The time interval calculated by the interval counter 607 is converted to distance information at the signal processing unit 601, and the distance information is output to the stereogram processing unit 120, with information indicating the emitting direction.

The signal processing unit 601 also includes a failure monitoring unit 601a. The failure monitoring unit 601a monitors whether or not failure has occurred in the laser radar distance measurement unit 110. For example, in a case in which a time interval calculated by the interval counter 607 (or distance information calculated by the signal processing unit 601) does not vary for a certain period of time, the failure monitoring unit 601a determines that failure has occurred. Alternatively, if a state of distance information being out of range specified by a specification has continued for a certain period of time, or if the signal processing unit 601 has reached a temperature more than a regulated temperature, the failure monitoring unit 601a may determine that failure has occurred. When failure has been detected, the laser radar distance measurement unit 110 sends, to the stereogram processing unit 120, a notification that failure has occurred.

The stereogram processing unit 120 monitors an entirety of the laser radar distance measurement unit 110. For example, the stereogram processing unit 120 detects that no response is received from the laser radar distance measurement unit 110, that communication with the laser radar distance measurement unit 110 has failed, and that a predetermined magnitude of voltage is not entered from the laser radar distance measurement unit 110 (power-off).

<Functional Configuration of Stereogram Processing Unit>

Figure 13:
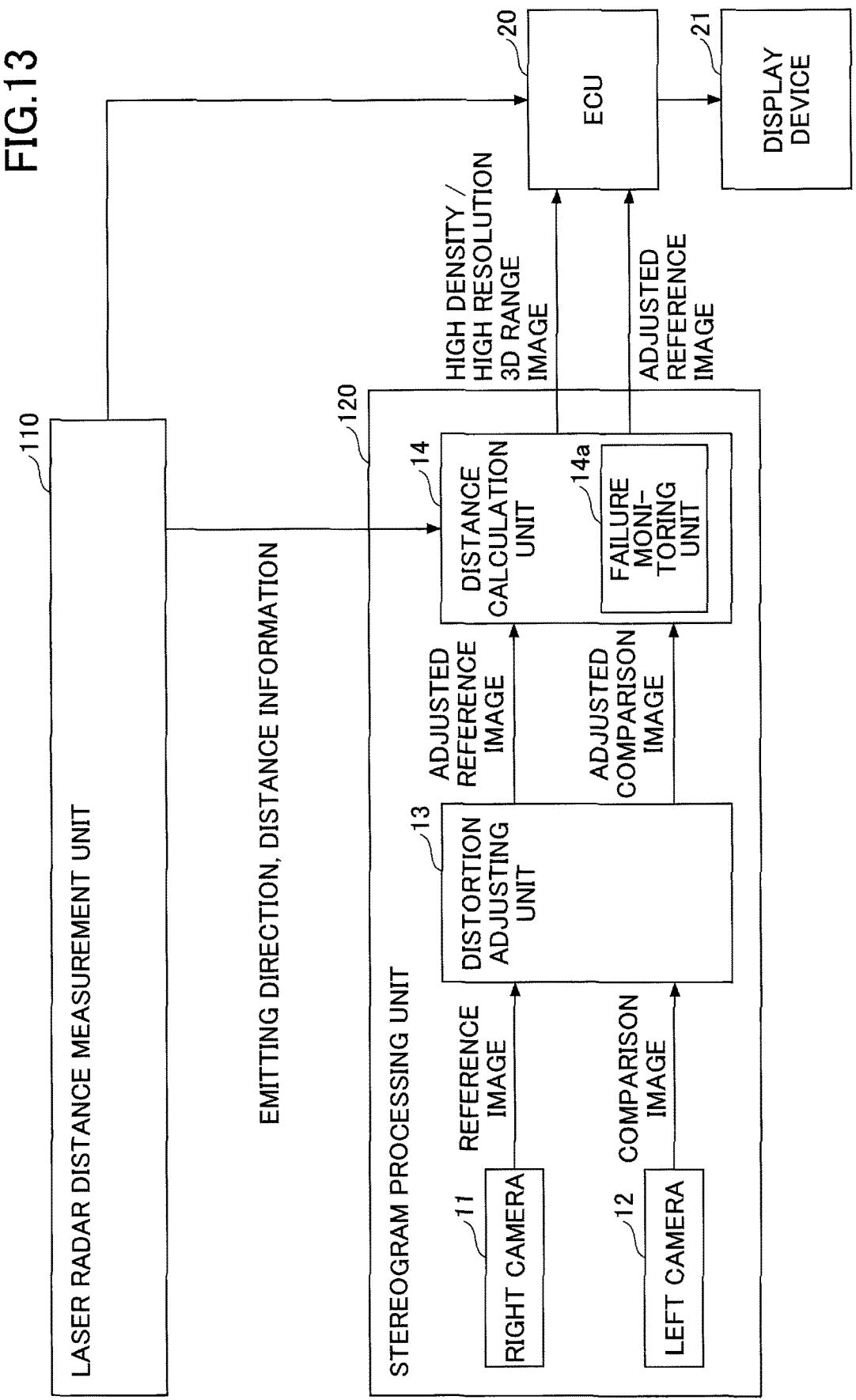
FIG. 13 is a diagram illustrating each function of the stereogram processing unit as a block.

FIG. 13 is a schematic diagram of the distance measurement system 100. FIG. 13 also illustrates each function of the stereogram processing unit 120 as a block. As the distance measurement system 100 is a device for measuring distance, it can also be referred to as a distance measurement device. The distance measurement system 100 may also be referred to as other names, such as a distance measurement unit.

As illustrated in FIG. 13, the stereogram processing unit 120 includes the right camera 11, the left camera 12, a distortion adjusting unit 13, and a distance calculation unit 14. The stereocamera is formed by the right camera 11 and the left camera 12.

The distortion adjusting unit 13, the distance calculation unit 14, or a combination of the distortion adjusting unit 13 and the distance calculation unit 14 may be implemented by dedicated electronic circuitry. Alternatively, the distortion adjusting unit 13 and/or the distance calculation unit 14 may be implemented by software, by executing programs embodying the distortion adjusting unit 13 and/or the distance calculation unit 14 on a computer (central processing unit (CPU)). Thus, the stereogram processing unit 120 has a function of an information processing device (apparatus). Further, as the stereogram processing unit 120 performs image processing, the stereogram processing unit 120 may also be regarded as an image processing device (apparatus).

The distortion adjusting unit 13 applies a general distortion adjustment to a reference image and a comparison image. When the adjustment is applied to a reference image and a comparison image, the reference image and the comparison image are adjusted such that no differences other than parallax are contained with respect to each other. The adjustment of an image becomes available by performing calibration in advance. For example, before installation of the left camera 12 and the right camera 11, an object for calibration (such as a checkered chart) is captured by the left camera 12 and the right camera 11. By comparing the captured images, a geometrical conversion look-up table (LUT) for converting image data (data of the captured images) is generated, in order to minimize a difference of the captured images caused by hardware-level allowable error such as distortion of lens, deviation of an optical axis, a difference of focal length, and distortion of image capturing element. The distortion adjusting unit 13 performs adjustment of an image with reference to such a LUT.

The distance calculation unit 14 calculates parallax by applying a specific algorithm, such as the block matching algorithm or the SGM algorithm, to a reference image and a comparison image. Also, before the distance calculation unit 14 outputs a range image, the distance calculation unit 14 integrates (fuses) LIDAR cost $C_{LI}$ (p, Z) with stereo matching cost $C_{ST}$(p, Z) with respect to distance information output by the laser radar distance measurement unit 110. A process regarding the integration performed by the distance calculation unit 14 is referred to as an "integration process". The stereo matching cost $C_{ST}$ (p, Z) is an example of the matching evaluation value, and the LIDAR cost $C_{LI}(p, Z)$ is an example of the distance evaluation value.

The distance calculation unit 14 also includes a failure monitoring unit 14a. The failure monitoring unit 14a monitors whether or not failure has occurred in the stereogram processing unit 120. For example, in a case in which pixel values of a reference image or a comparison image remain unchanged for a certain period of time, the failure monitoring unit 14a determines that failure has occurred. Alternatively, if a state of pixel values being out of range specified by a specification has continued for a certain period of time, or if the distance calculation unit 14 has reached a temperature more than a regulated temperature, the failure monitoring unit 14a may determine that failure has occurred. When failure has been detected, the stereogram processing unit 120 sends a notification that failure has occurred, to an electronic control unit (ECU) 20. The stereogram processing unit 120 also sends a notification to the ECU 20 when a notification that failure has occurred has been received from the laser radar distance measurement unit 110, or when detecting failure in the laser radar distance measurement unit 110.

The ECU 20 monitors an entirety of the stereogram processing unit 120. For example, the ECU 20 detects that no response is received from the stereogram processing unit 120, that communication with the stereogram processing unit 120 has failed, and that a predetermined magnitude of voltage is not entered from the stereogram processing unit 120 (power-off).

In FIG. 13, an example in which a range image and a reference image are sent out to the ECU 20 is described. The ECU 20 is a control unit for a moving body such as a vehicle. In a case in which the distance measurement system 100 is installed in a moving body, the distance measurement system 100 may be referred to as an on-board device. The ECU 20 performs various driver-assistance by using the range image and the reference image output by the distance measurement system 100. The reference image is used for recognizing a preceding vehicle, a pedestrian, a lane marking, a state of a traffic signal, and the like, by applying various pattern matchings.

Functions of the driver-assistance differ depending on vehicles. An example of the functions of the driver-assistance includes an alarming function or a braking function. In the alarming function or braking function, when a horizontal position of an object in the reference image is overlapped with a width of a moving body in which the ECU 20 is installed, an alarm is output or braking is performed in accordance with a time to collision (TTC) calculated based on a distance and relative velocity. Further, if it is difficult to stop the moving body until collision occurs, a steering operation is performed to avoid collision.

The ECU 20 also performs control of a space between the moving body and a preceding vehicle while the moving body is moving, such that the space is changed in accordance with speed of the moving body. The ECU 20 stops the moving body when the preceding vehicle stops, and the ECU 20 also starts the moving body when the preceding vehicle starts moving. In a case in which the ECU 20 is configured to recognize a lane marking, the ECU 20 can perform lane keeping control in which the moving body is steered such that the moving body runs in a middle of a lane, or the ECU 20 can perform lane departure avoidance control in which, when the moving body starts to deviate from a current lane, a driving direction of the moving body is changed such that the moving body remains in the current lane.

Further, when the moving body is started, if an obstacle is present in a driving direction of the moving body, the ECU 20 can prevent an abrupt starting of the moving body. For example, if an obstacle is found in a driving direction which is determined by a position of a gearshift, and if an amount of operation of a gas pedal is large, the ECU 20 can relieve damage by limiting engine power or warning a driver.

The ECU 20 is connected to a display device 21. Examples of the display device 21 include a flat panel display (such as an LCD or an organic EL display) fitted to a center console or a dashboard. The display device 21 may also be a head-up display (HUD). When failure occurred in the laser radar distance measurement unit 110 or the stereogram processing unit 120, the ECU 20 displays information on the display device 21 indicating that the laser radar distance measurement unit 110 or the stereogram processing unit 120 has failed. Displayed examples will be described in a third embodiment.

Note that the configuration illustrated in FIG. 13 is merely an example. For example, the laser radar distance measurement unit 110 and the stereogram processing unit 120 may be integrated. Alternatively, the ECU 20 may have a function of the stereogram processing unit 120.

<Calculating Integer Parallax using Block Matching>

Figure 14:
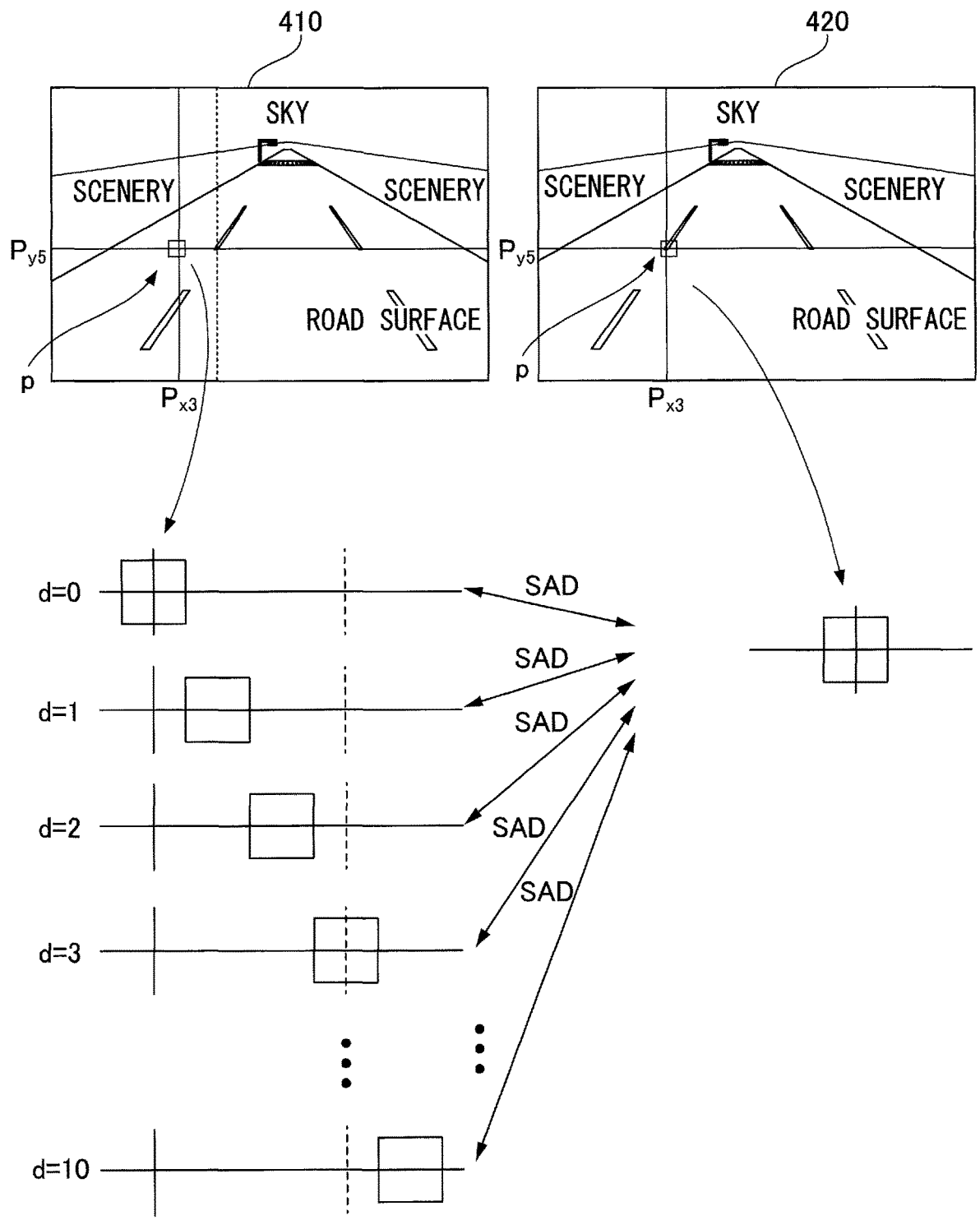
FIG. 14 is a diagram illustrating an example of calculating SAD as a cost of a pixel $p=(P_{x3}, P_{y5})$ of which a cost is to be calculated, with respect to a reference image captured by a right camera and a comparison image captured by a left camera.

A calculation method of integer parallax using the block matching algorithm will be described with reference to FIG. 14. FIG. 14 is a diagram illustrating an example of calculating SAD (Sum of Absolute Difference) as a cost of a pixel $p=(P_{x3}, P_{y5})$ of which a cost is to be calculated, with respect to a reference image 420 captured by the right camera 11 and a comparison image 410 captured by the left camera 12. Note that, in the present embodiment, a pixel of which a cost is to be calculated may be referred to as a "pixel of interest". In the example of FIG. 14, the pixel $p=(P_{x3}, P_{y5})$ is a pixel of interest. Also, a mathematical expression of SAD will be described below.

Because the reference image 420 and the comparison image 410 have been captured from different locations, an object corresponding to the pixel $p=(P_{x3}, P_{y5})$ in the reference image 420 is different from an object corresponding to the pixel $p=(P_{x3}, P_{y5})$ in the comparison image 410, although coordinates of the two pixels are the same. The pixel $p=(P_{x3}, P_{y5})$ in the comparison image 410 corresponds to an object shifted in a horizontal direction from a location of an object corresponding to the pixel $p=(P_{x3}, P_{y5})$ in the reference image 420. Thus, a difference between luma of the pixel of interest $p=(P_{x3}, P_{y5})$ in the reference image 420 and luma of the pixel of interest $p=(P_{x3}, P_{y5})$ in the comparison image 410, which is the SAD when a block size is 1×1 pixel, becomes large.

Next, a pixel of interest in the comparison image 410 of which the SAD is to be calculated is changed (shifted) in a right direction by one pixel. That is, the SAD when parallax is assumed to be 1 (shift amount d=1) is calculated. Specifically, a difference between luma of the pixel of interest $p=(P_{x3}+1, P_{y5})$ in the comparison image 410 and luma of the pixel of interest $p=(P_{x3}, P_{y5})$ in the reference image 420 is calculated. In the example of FIG. 14, the SAD also becomes large when d is 1.

Subsequently, the shift amount d is changed gradually (such as d=2, 3, . . . ) and the SAD is calculated for each value of the shift amount d. In the example of FIG. 14, when the parallax is assumed to be 3 (when d=3), an object corresponding to the pixel $p=(P_{x3}, P_{y5})$ in the reference image 420 coincides with an object corresponding to the pixel $p=(P_{x3}+3, P_{y5})$ in the comparison image 410. Accordingly, the SAD when d=3 becomes smaller than SAD of other cases (the cases in which d is not 3).

Figure 15A:
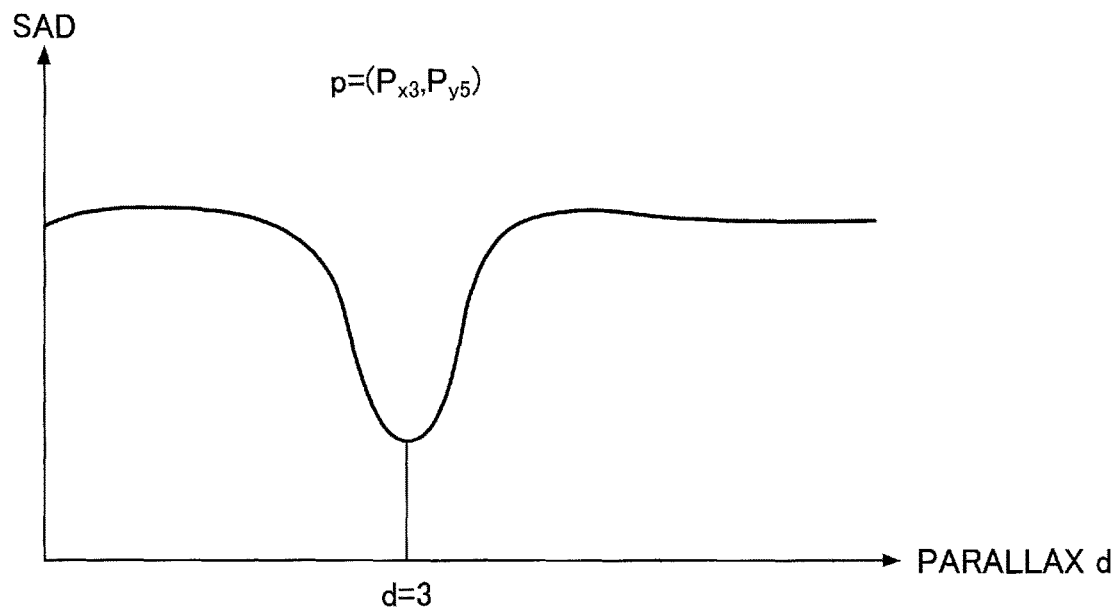
FIGS. 15A and 15B are examples of cost C (p, d) with respect to pixels of interest obtained by varying a shift amount d.

FIG. 15A illustrates an example of a calculation result of SAD with respect to a certain pixel of interest (p=($P_{x3}$, $P_{y5}$)) by varying the shift amount d. The SAD is an example of cost C (p, d). Regarding the pixel (p=($P_{x3}$, $P_{y5}$)), as the SAD becomes smallest when d=3, the parallax (d) is determined as 3.

Figure 15B:
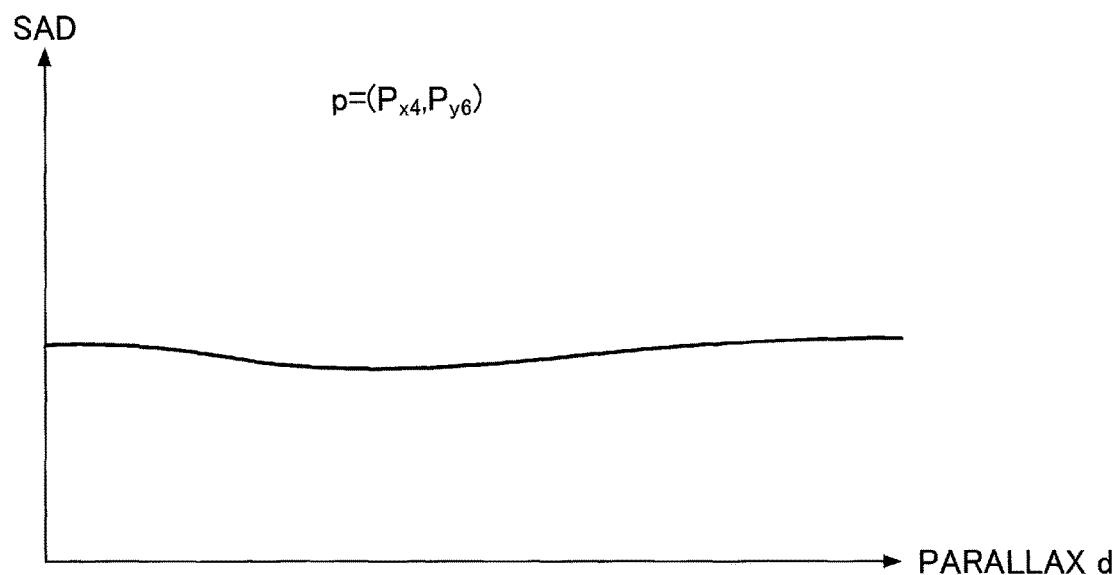

FIG. 15B illustrates an example of a calculation result of SAD with respect to another pixel of interest (p=($P_{x4}$, $P_{y6}$)) by varying the shift amount d. In the example of FIG. 15B, because a variation of the SAD is small in accordance with change of the shift amount d, the distance calculation unit 14 cannot determine the parallax. As described here, because there may exist a pixel whose parallax cannot be detected only by using the block matching, the distance calculation unit 14 performs an energy calculation processing (SGM algorithm) to make parallax apparent.

When the SAD for each shift amount d (cost C (p, d)) as illustrated in FIG. 15A or FIG. 15B has been calculated, it is preferable that fractional part of parallax is calculated. Examples of method for obtaining fractional part of parallax include a high-degree (sixth-degree) polynomial fitting, a high-degree (fourth-degree) polynomial fitting, and a parabola fitting.

The SAD is expressed as the following mathematical expression:

$$SAD = \sum_y \sum_x |A(x, y) - B(x, y)|$$

As can be seen from the above expression, the SAD is obtained by calculating an absolute value of a luma difference for each pixel and calculating a sum of the absolute values. The SAD becomes smaller as pixels resemble each other.

Further, measures other than the SAD, such as SSD (Sum of Squared Difference), NCC (Normalized Cross Correlation), or ZNCC (Zero-mean Normalized Cross Correlation), may be used for block matching. The SSD is expressed as the following mathematical expression:

$$SSD = \sum_y \sum_x (A(x, y) - B(x, y))^2$$

The SSD is obtained by calculating a square of a luma difference for each pixel and calculating a sum of the absolute values. The SSD becomes smaller as pixels resemble each other.

The NCC is expressed as the following mathematical expression:

$$NCC = \frac{\sum_y \sum_x A(x, y)B(x, y)}{\sqrt{\sum_y \sum_x A(u, v)^2 \sum_y \sum_x B(x, y)^2}}$$

A numerator of the NCC represents a sum of a scalar product of lumas of pixels. The scalar product becomes larger as pixels resemble each other. An expression in a denominator of the NCC is for normalizing the numerator, and the denominator becomes larger as pixels resemble each other. A maximum of the NCC is 1, and a minimum of the NCC is 0.

The ZNCC is expressed as the following mathematical expression:

$$ZNCC = \frac{\sum_y \sum_x (A(x, y) - \overline{A})(B(x, y) - \overline{B})}{\sqrt{\sum_y \sum_x (A(x, y) - \overline{A})^2 \sum_y \sum_x (B(x, y) - \overline{B})^2}}$$

$$\overline{A} = \frac{1}{MN} \sum_y \sum_x A(x, y), \overline{B} = \frac{1}{MN} \sum_y \sum_x B(x, y)$$

The ZNCC corresponds to a normalized cross correlation after subtracting a mean value. The subtracting operation corresponds to a removal of DC (Direct Current) component of a signal, and the NCC is effective for comparing images each having different brightness. In the above expression of the ZNCC, M represents the number of pixels in a horizontal direction, and N represents the number of pixels in a vertical direction.

Other than the above mentioned measures, ZSAD (Zero-mean Sum of Absolute Difference) or ZSSD (Zero-mean Sum of Squared Difference) may be used. The ZSAD corresponds to a sum of absolute difference after subtracting a mean value. The ZSSD corresponds to a sum of squared difference after subtracting a mean value.

<SGM Algorithm>

The distance calculation unit 14 calculates a propagation cost $L_r$ by using an algorithm called SGM, and calculates an energy cost S(p, d) of a pixel of interest p by using the propagation cost $L_r$. Note that the SGM algorithm is a form of a dense matching algorithm.

First, a process for calculating propagation cost (may also be referred to as "propagation cost function") $L_r$ by using the SGM algorithm is described. FIG. 16 is a schematic diagram illustrating the process for calculating propagation cost $L_r$ by using, the SGM algorithm.

FIG. 16 illustrates a case in which propagation costs $L_r$ of four directions are calculated with respect to a pixel of interest 1100. Specifically, with respect to the pixel 1100, a propagation cost $L_1$ in a direction of an arrow 1111, a propagation cost $L_2$ in a direction of an arrow 1112, a propagation cost $L_3$ in a direction of an arrow 1113, and a propagation cost $L_4$ in a direction of an arrow 1114 are calculated. Note that directions (r) of the propagation cost to be calculated with respect to the pixel 1100 are not limited to the above mentioned four directions. For example, propagation costs of eight directions or propagation costs of two directions may be calculated.

As illustrated in FIG. 16, the propagation cost $L_1$ in the direction of the arrow 1111 can be obtained based on the following formula (2).

$L_1(p,d)=C(p,d)+\min\{L_1(p-1,d),L_1(p-1,d-1)+P_1,L_1(p-1,d+1)+P_1,\min L_1(p-1,i)+P_2\}$ (2)

Note that variable p and d in the above formula (2) respectively represent coordinates of the pixel p 1100 and a parallax. Also, in the above formula (2), (p−1) represents coordinates of a pixel located left of the pixel p 1100 by one pixel, and (p+1) represents coordinates of a pixel located right of the pixel p 1100 by one pixel (hereinafter, the pixel located left of the pixel p 1100 by n pixels is referred to as a "pixel (p−n)", and the pixel located right of the pixel p 1100 by n pixels is referred to as a "pixel (p+n)"). Further, $P_1$ and $P_2$ are predetermined constants. As described here, the propagation cost $L_1(p, d)$ can be calculated based on the cost C(p, d) of the pixel 1100, and propagation costs of the pixel (p−1) corresponding to different parallax (such as d−1, d, or d+1). That is, the propagation cost in the direction of the arrow 1111 is calculated sequentially from left to right. Note that a propagation interval of cost, when the propagation cost is to be calculated from left to right, is not limited to one pixel. That is, the propagation cost $L_1(p, d)$ may be calculated by using propagation costs of a pixel (p−a) ("a" is natural number) corresponding to different parallax.

Similarly, the propagation cost $L_2$ in the direction of the arrow 1112 is calculated sequentially from top to bottom. Also, the propagation cost $L_3$ in the direction of the arrow 1113 is calculated sequentially from right to left, and the propagation cost $L_4$ in the direction of the arrow 1114 is calculated sequentially from bottom to top.

Next, a process for calculating an energy cost S(p, d) of a pixel of interest p by using the propagation cost $L_r$ will be described.

The energy cost S(p, d) of each pixel is calculated in accordance with the following formula (3), based on the propagation costs of various directions.

$$S(p, d) = \sum_r L_r(p, d) \qquad (3)$$

Thus, in the example of FIG. 16, S(p, d) can be obtained by calculating S(p, =$L_1$(p, d)+$L_2$(p, d)+$L_3$(p, d)+$L_4$(p, d).

<Distance Calculation Method According to the Present Embodiment>

Figure 17:
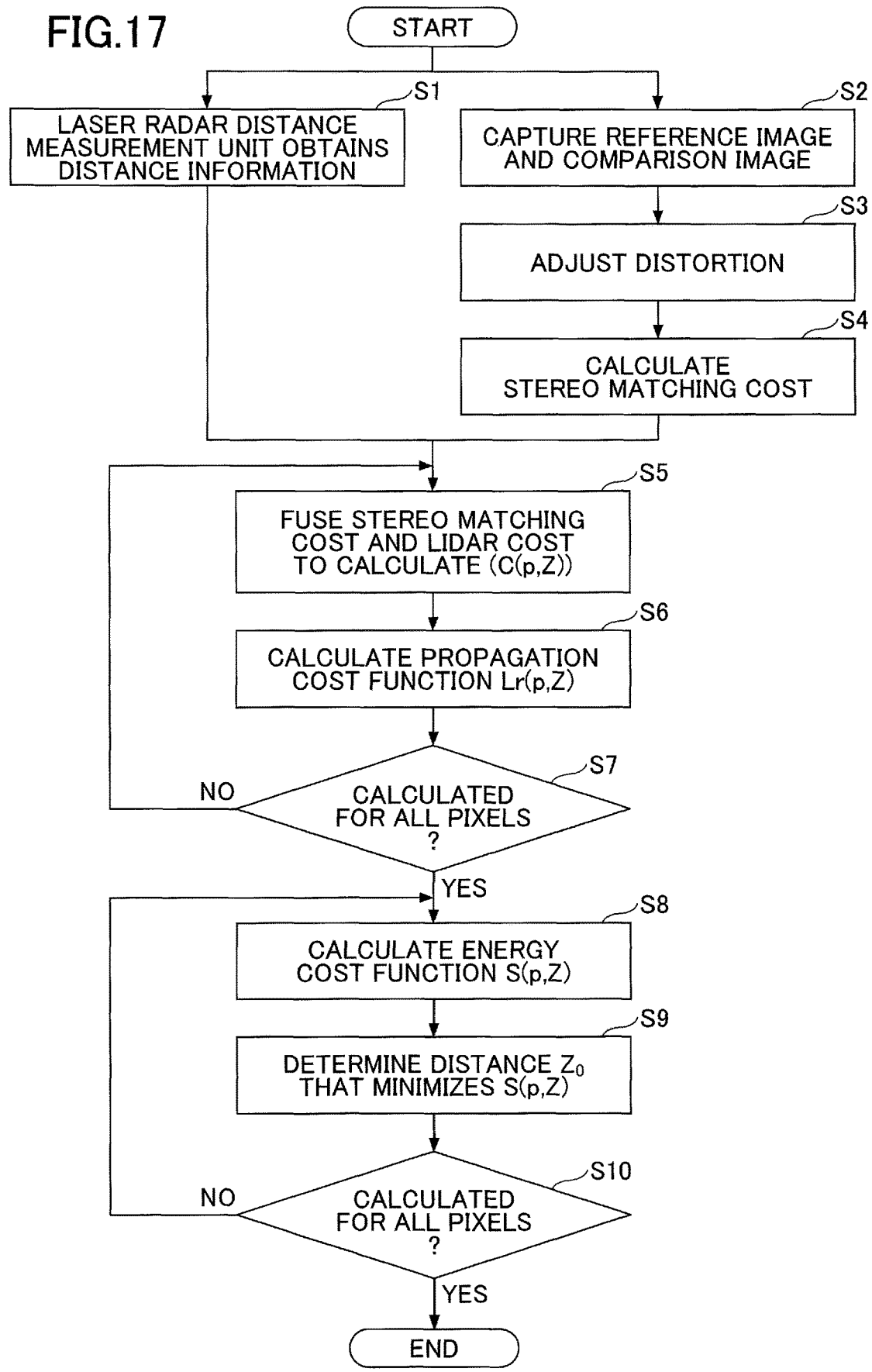
FIG. 17 is an exemplary flowchart illustrating a process of the distance measurement system.

Next, a process for calculating a distance of each pixel performed by the distance measurement system 100 will be described with reference to FIG. 17. FIG. 17 is an exemplary flowchart illustrating a process of the distance measurement system 100.

(Steps S1 to S4)

At step S1, the laser radar distance measurement unit 110 acquires distance information. In parallel with step S1, in the stereogram processing unit 120, the right camera 11 captures a reference image and the left camera 12 captures a comparison image (step S2). The distortion adjusting unit 13 applies a distortion adjustment to each of the reference image and the comparison image such that no differences other than parallax are contained (step S3). Subsequently, the stereogram processing unit 120 calculates stereo matching cost $C_{ST}(p, Z)$ (step S4).

Steps S2 to S4 may be executed synchronously or asynchronously with step S1. In a case in which steps S2 to S4 are executed asynchronously with Step S1, the stereogram processing unit 120 may use the latest distance information obtained from the laser radar distance measurement unit 110.

Figure 18:
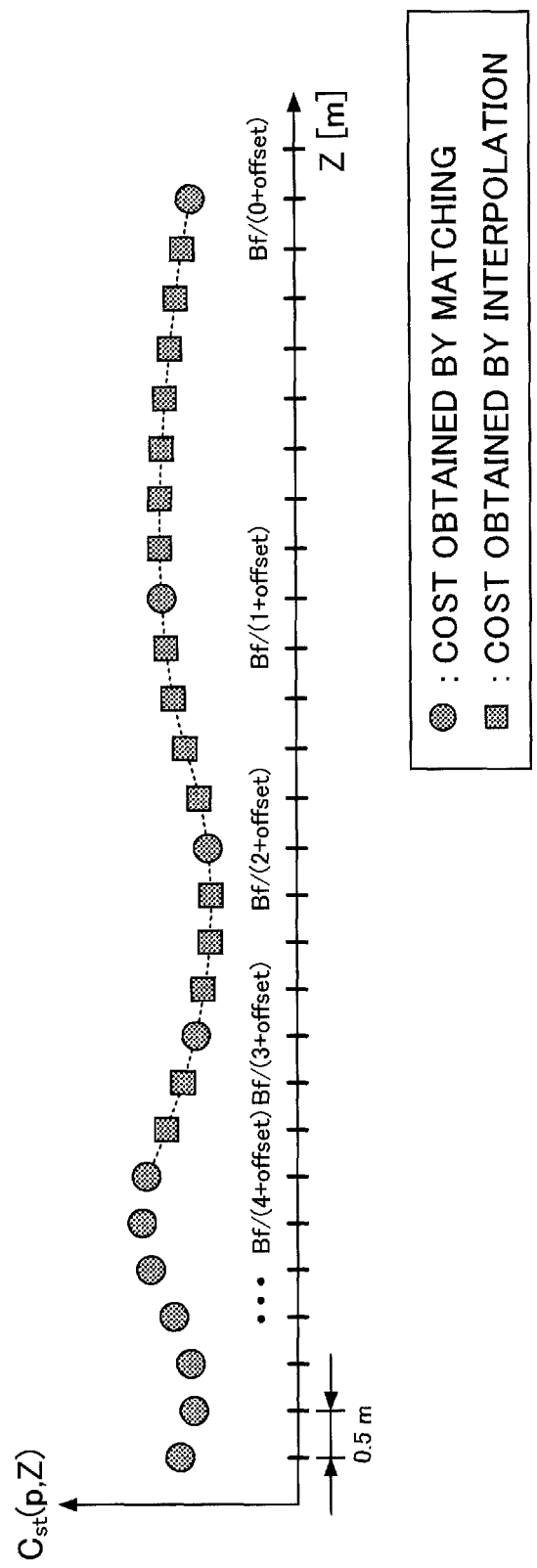
FIG. 18 is a diagram illustrating an example of stereo matching cost $C_{ST}(p, Z)$.

FIG. 18 is a diagram illustrating an example of the stereo matching cost $C_{ST}(p, Z)$. FIG. 18 illustrates a state in which cost in a parallax space (which is a coordinate space in which a horizontal axis corresponds to a parallax and a vertical axis corresponds to cost) obtained by stereo matching is converted to the stereo matching cost $C_{ST}(p, Z)$ in Z-space (which is a coordinate space in which a horizontal axis corresponds to the distance Z and a vertical axis corresponds to cost). If cost in a parallax space obtained by stereo matching is simply converted to the stereo matching cost in Z-space, the stereo matching cost $C_{ST}(p, Z)$ at regular intervals cannot be obtained. Thus, the distance calculation unit 14 interpolates the cost obtained by stereo matching. In FIG. 18, circles represent costs obtained by stereo matching, and squares represent costs obtained by interpolation. Any interpolation appropriate to curve fitting may be used, such as parabola fitting, a high-degree polynomial interpolation, and a spline interpolation. In the example of FIG. 18, the stereo matching cost $C_{ST}(p, Z)$ is calculated at every 0.5 meters. Note that a variable offset illustrated in FIG. 18 represents a fraction to obtain the distance Z every 0.5 meters (by converting d into Z).

(Step S5)

Figure 19:
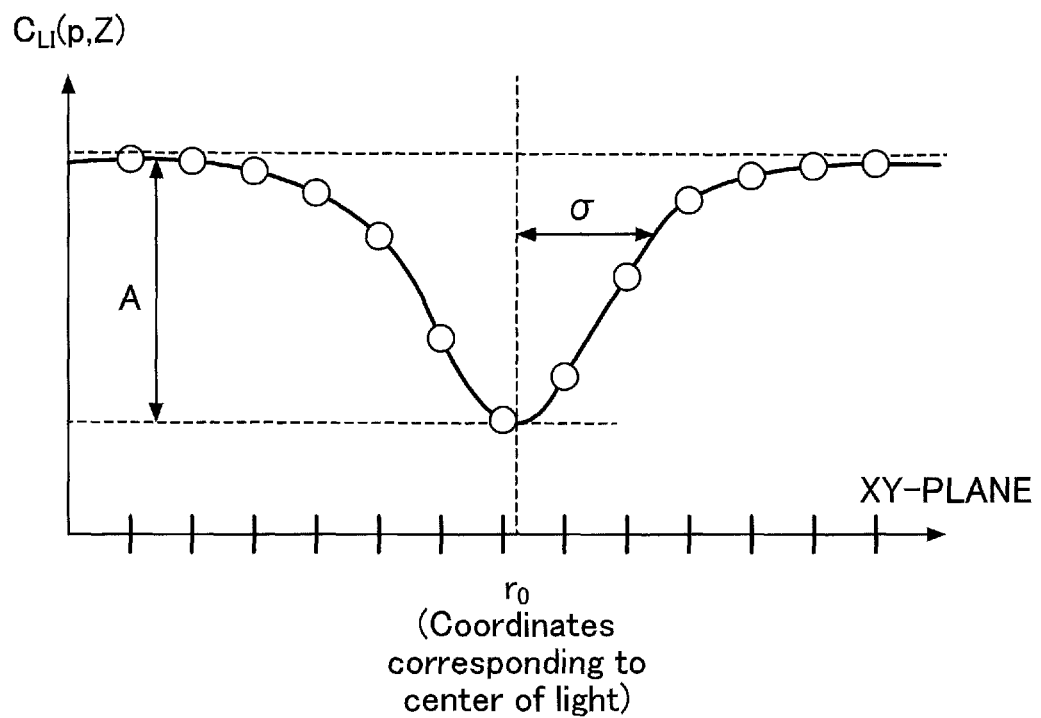
FIG. 19 is a diagram illustrating an example of LIDAR cost $C_{LI}(p, Z)$.
Figure 20:
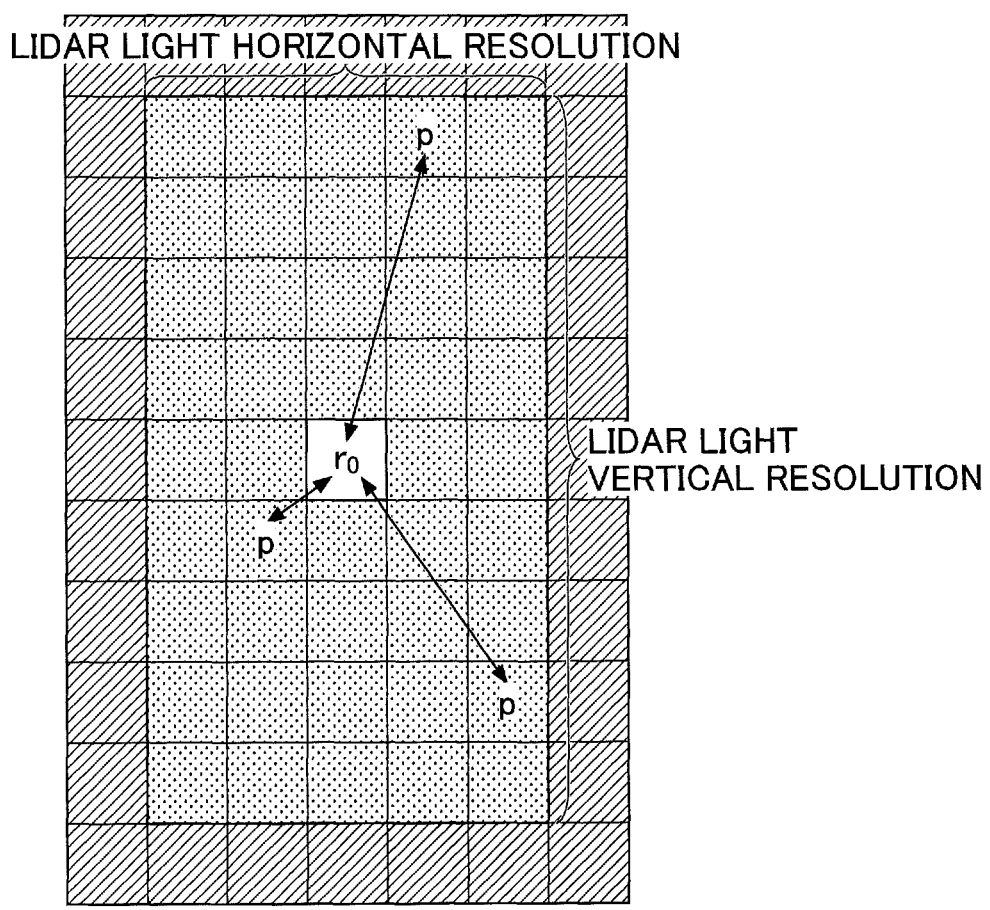
FIG. 20 is a diagram for explaining the LIDAR cost $C_{LI}(p, Z)$ supplementarily.

At step S5, the distance calculation unit 14 calculates the cost C(p, Z) by fusing (integrating) LIDAR cost $C_{LI}(p, Z)$ with the stereo matching cost $C_{ST}(p, Z)$. The fusion is performed in accordance with the following formula (4).

$$C(p,Z) = EST \times C_{ST}(p,Z) + ELI \times C_{LI}(p,Z) \qquad (4)$$

where
EST: coefficient (weight) of stereo matching cost
ELI: coefficient (weight) of LIDAR cost First, the LIDAR cost $C_{LI}(p, Z)$ will be described with reference to FIGS. 19 and 20. FIG. 19 is a diagram illustrating an example of the LIDAR cost $C_{LI}(p, Z)$, and FIG. 20 is a diagram for explaining the LIDAR cost $C_{LI}(p, Z)$ supplementarily. Also, a function in the formula (5) described below represents an example of the LIDAR cost $C_{LI}(p, Z)$.

$$C_{LI}(p, Z) = \left(1 - A \exp \frac{-|p - r_0|^2}{2\sigma^2}\right) \qquad (5)$$

where
$r_0$: a pixel corresponding to an emitting direction of laser
p: pixel of interest (specifically, p represents a pixel surrounding the pixel $r_0$ (p may also be $r_0$))
$|p-r_0|$: length (distance in the XY-plane) between the pixel $r_0$ and the pixel p
σ: a parameter affecting width of the LIDAR cost $C_{LI}(p, Z)$
A: a parameter (0 to 1) affecting depth of the LIDAR cost $C_{LI}(p, Z)$ In order to integrate distance information obtained from the laser radar distance measurement unit 110 with the stereo matching cost $C_{ST}(p, Z)$, the inventors of the present application have defined the LIDAR cost $C_{LI}(p, Z)$ anew. As illustrated in FIG. 19, the LIDAR cost $C_{LI}(p, Z)$ takes the minimum when p is equal to $r_0$ (a pixel corresponding to a center of emitted laser light), and the LIDAR cost $C_{LI}(p, Z)$ becomes larger as p becomes apart from $r_0$. As is apparent from the formula (5), in a case in which A is 1, the LIDAR cost $C_{LI}(p, Z)$ of a pixel $r_0$ is 0 (the LIDAR cost $C_{LI}(p, Z)$ when p=$r_0$ is 0). Conversely, the LIDAR cost $C_{LI}(p, Z)$ of a pixel distant from $r_0$ is 1.

Each rectangle illustrated in FIG. 20 represents a pixel, and a pixel $r_0$ is illustrated in the center of a group of pixels in FIG. 20. Also, a horizontal resolution and a vertical resolution of a pulse of laser light are expressed in pixels. A horizontal range in which a pulse of laser light is spread horizontally is referred to as a horizontal resolution, and a vertical range in which a pulse of laser light is spread vertically is referred to as a vertical resolution. In the example of FIG. 20, a horizontal resolution is 5 pixels and a vertical resolution is 9 pixels. A pulse of laser light spreads wider as the laser light travels further. However, an area (number of pixels) captured by a stereocamera is substantially constant regardless of distance (the reason will be described below). Thus, regardless of the distance Z with respect to the pixel $r_0$ measured by the laser radar distance measurement unit 110, the LIDAR cost $C_{LI}(p, Z)$ may be calculated with respect to pixels (p) within a range determined by the horizontal resolution and the vertical resolution.

Figure 21:
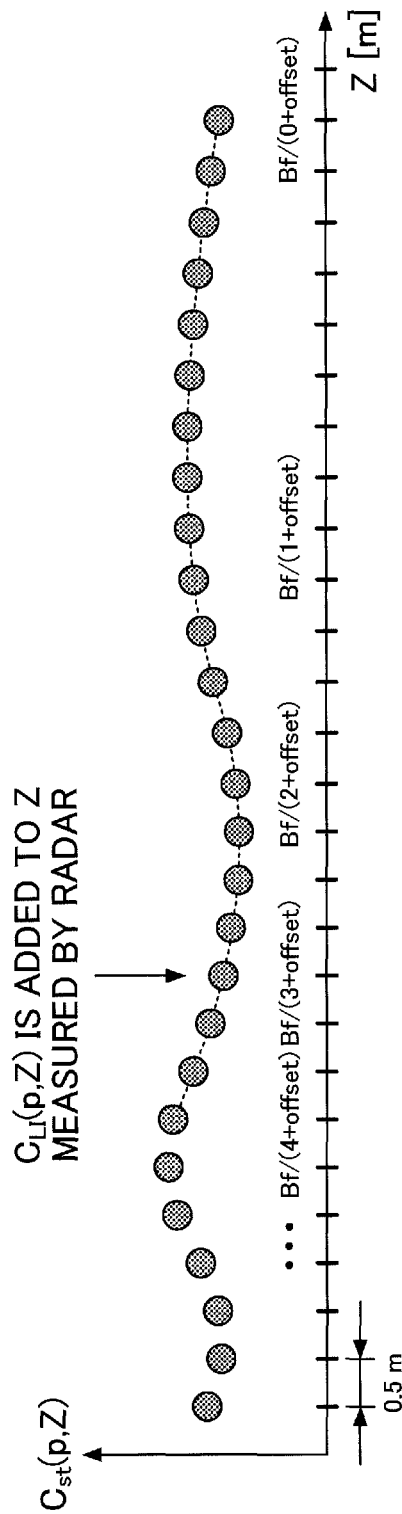
FIG. 21 is an exemplary diagram illustrating a voting of the LIDAR cost $C_{LI}(p, Z)$ to the stereo matching cost $C_{ST}(p, Z)$.

When the LIDAR cost $C_{LI}(p, Z)$ has been calculated in accordance with the formula (5), the distance calculation unit 14 performs a voting of the LIDAR cost $C_{LI}(p, Z)$ to the stereo matching cost $C_{ST}(p, Z)$. FIG. 21 is an exemplary diagram illustrating a voting of the LIDAR cost $C_{LI}(p, Z)$ to the stereo matching cost $C_{ST}(p, Z)$. As the distance Z of the pixel $r_0$ corresponding to an emitting direction of laser has been obtained by the laser radar distance measurement unit 110, a voting of the LIDAR cost $C_{LI}(p, Z)$ is performed to the stereo matching cost $C_{ST}(p, Z)$ specified by the pixel $r_0$ and the distance Z. Note that the voting in the present embodiment means an action of adding a value. The LIDAR cost $C_{LI}(p, Z)$ with respect to the pixel $r_0$ is 1-A, and if A is 1, the LIDAR cost is 0.

To each pixel p included in a region specified by the pixel $r_0$, the horizontal resolution and the vertical resolution (which is a rectangular region illustrated in FIG. 20 having a width of the horizontal resolution and a height of the vertical resolution, in the center of which the pixel $r_0$ is positioned), the distance calculation unit 14 performs the above mentioned voting (adding the LIDAR cost $C_{LI}(p, Z)$). Magnitude of the LIDAR cost $C_{LI}(p, Z)$ added to the stereo matching cost $C_{ST}(p, Z)$ corresponding to each pixel is a value calculated in accordance with the function of the formula (5), by using a length between the pixel $r_0$ and the pixel p.

As described above, in the present embodiment, the stereo matching cost $C_{ST}(p, Z)$ and the LIDAR cost $C_{LI}(p, Z)$ can be fused on the Z-space. Also, cost of the pixel $r_0$ corresponding to an emitting direction of laser becomes the smallest, and cost of surrounding pixels of the pixel $r_0$ becomes larger.

Note that a shape of a graph of the LIDAR cost $C_{LI}(p, Z)$ illustrated in FIG. 19 is merely an example. For example, the shape may be of rectangular shape, such that cost in a predetermined range from the pixel $r_0$ takes minimal value. Alternatively, the shape may be of reverse triangle shape, similar to FIG. 19. Further, according to the formula (4) described above, cost is calculated by adding the stereo matching cost $C_{ST}(p, Z)$ and the LIDAR cost $C_{LI}(p, Z)$. However, cost may be calculated by subtracting the LIDAR cost $C_{LI}(p, Z)$ from the stereo matching cost $C_{ST}(p, Z)$. Further, the LIDAR cost $C_{LI}(p, Z)$ may be a negative value.

Next, regarding a process at step S5, supplemental explanation will be made with reference to FIGS. 22A, 22B, 23, 24, 25A, and 25B. In the following, degradation of accuracy of distance information, with respect to pixels surrounding a pixel corresponding to a center of emitted laser light, will be described. Even for the pixels within a horizontal resolution range and a vertical resolution range, accuracy of the distance information with respect to the pixels degrades if the pixels are apart from the pixel corresponding to a center of emitted laser.

Figure 22A:
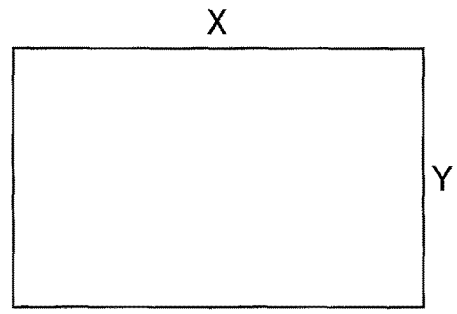
FIGS. 22A and 22B are exemplary diagrams illustrating the number of pixels on an object surface.
Figure 22B:
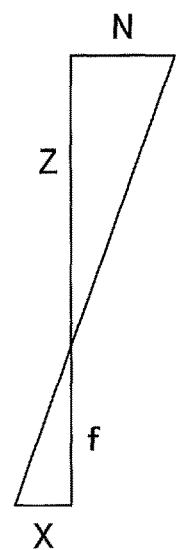

FIGS. 22A and 22B are exemplary diagrams illustrating the number of pixels on an object surface (note that an object surface means an area that an object occupies in image data). FIG. 22A represents the number of pixels of a certain object, and FIG. 22B represents a relation between a size of the object and the number of pixels of an object surface.

Suppose a case in which an object having a width of N [m] and a height of M [m] is located at a point distant from the distance measurement system 100 by Z [m]. By using a focal length f, the number of horizontal pixels X and the number of vertical pixels Y occupied by an image of the object in image data (captured by the stereocamera) can be calculated based on the following formulas.

$$X = f \cdot N / (Z \cdot pt)$$

$$Y = f \cdot M / (Z \cdot pt)$$

where pt is pixel pitch in the above formulas.

Figure 23:
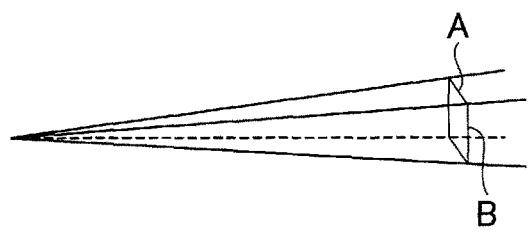
FIG. 23 is an exemplary diagram illustrating the number of pixels (xL and yL) in image data that are occupied by emitted laser light, in a case in which laser light is emitted on an object located at a point distant from the distance measurement system by Z [m]

FIG. 23 is an exemplary diagram illustrating the number of pixels (xL and yL) in image data (captured by the stereocamera) that are occupied by emitted laser light, in a case in which laser light is emitted on an object located at a point distant from the distance measurement system 100 by Z [m]. Let a width of the laser light emitted on the object be A, and let a height of the laser light emitted on the object be B. Also, let a horizontal resolution of laser light be θx [deg], and let a vertical resolution of laser light be θy [deg]. The width A and the height B of the laser light are expressed as the following formulas.

$$A = Z \cdot \tan(\theta x/2) \times 2$$

$$B = Z \cdot \tan(\theta y/2) \times 2$$

Further, let the number of pixels in a horizontal direction in image data corresponding to an area irradiated with the laser light be xL, and let the number of pixels in a vertical direction in image data corresponding to the area irradiated with the laser light be yL. The number of pixels xL and yL are expressed as the following formulas.

$$xL = f \cdot A/(Z \cdot pt) = f \cdot Z \cdot \tan(\theta x/2) \times 2/(Z \cdot pt) = 2(f/pt)\tan(\theta x/2) \text{ [pixels]}$$

$$yL = f \cdot B/(Z \cdot pt) = f \cdot Z \cdot \tan(\theta y/2) \times 2/(Z \cdot pt) = 2(f/pt)\tan(\theta y/2) \text{ [pixels]}$$

As is apparent from the above formulas, an area of a surface of an object irradiated with laser light (may also be referred to as an "irradiated surface") becomes larger as the distance Z increases, but the number of pixels occupied by the irradiated surface remains constant, regardless of magnitude of the distance Z (note that the above description is only applicable when a light source of laser light is a point source. If a light source has a certain size, the number of pixels occupied by the irradiated surface becomes larger in a short range (in a case in which the distance Z is small), and the number of pixels converges to a certain value when the distance Z becomes larger).

Figure 24:
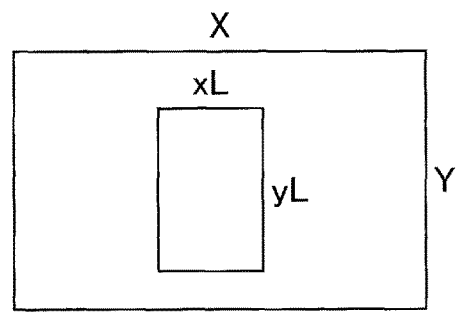
FIG. 24 is an exemplary diagram illustrating a state in which an object surface covers an irradiated surface.

Based on the above formulas, a condition (of the distance Z) that an object surface covers an irradiated surface when laser light is emitted to an object is obtained. FIG. 24 is an exemplary diagram illustrating a state in which an object surface covers an irradiated surface.

The condition in which an object surface covers an irradiated surface can be expressed as "X>xL and Y>yL". The expressions can also be transformed as in the following.

$$f \cdot N/(Z \cdot pt) > 2(f/pt)\tan(\theta x/2)$$

and $$f \cdot M/(Z \cdot pt) > 2(f/pt)\tan(\theta y/2)$$

Thus, the condition of Z in which an object surface covers an irradiated surface can be expressed as "N/(2 tan(θx/2))>Z and M/(2 tan(θy/2))>Z".

When dimensions of an object are "N=M=1.8 m, and δx=θy=0.6 [deg]", such as a vehicle, 171.9>Z.

Also, when a dimension of an object is "N=0.25 m, M=1.6 m, θx=0.1 [deg], and θy=0.6 [deg]", 143.2>Z.

Therefore, in a case in which an object (on which laser light is emitted) is in a close distance (when the distance Z is small), an object surface covers an irradiated surface. Conversely, in a case in which an object is distant (when the distance Z is large), an irradiated surface becomes larger than an object surface.

Figure 25A:
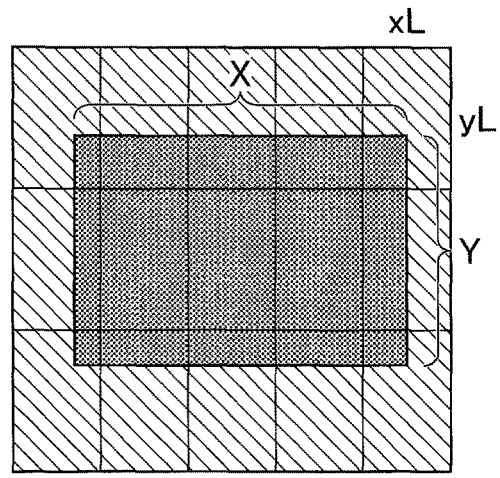
FIG. 25A is a diagram illustrating a relation between an irradiated surface and an object surface state when an object is not distant.
Figure 25B:
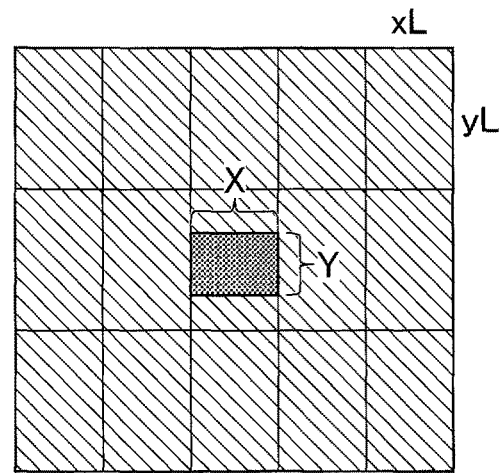
FIG. 25B is a diagram illustrating a relation between an irradiated surface and an object surface state when an object is distant.

FIG. 25A is a diagram illustrating a relation between an irradiated surface and an object surface state when an object is in a close distance. FIG. 25B is a diagram illustrating a relation between an irradiated surface and an object surface state when an object is distant. In FIG. 25A, similar to FIG. 24, an object surface is larger than an irradiated surface. As a size of an irradiated surface is only xL pixels in width and only yL pixels in height, it is uncertain at which point laser light is reflected on an object surface (XY in FIG. 25A). It means that reliability of distance information measured by the laser radar distance measurement unit 110 degrades as a point at which laser light is reflected is close to a periphery of an irradiated surface. Thus, as described above with reference to FIG. 19, it is effective to configure the LIDAR cost $C_{Lf}(p, Z)$ to become larger as p becomes close to a periphery of an irradiated surface.

FIG. 25B indicates that an irradiated surface becomes larger than an object surface when an object is distant. In such a case, as laser light is not necessarily reflected on a surface of an object (XY plane illustrated in FIG. 25B), laser light may travel deeper than a location of the object. This case may also be referred to as "multi-pulse". In a case in which multi-pulse occurs, multiple objects may be detected. Details of multi-pulse case will be described below.

(Step S6)

Next, at step S6, the distance calculation unit 14 calculates propagation cost $L_r(p, Z)$. The propagation cost $L_r(p, Z)$ is expressed as follows (formula (6)).

$$L_r(p, Z) = C(p, Z) + \min\{L_r(p - r, Z), L_r(p - r, Z - 1) + P_1, \qquad (6)$$
$$L_r(p - r, Z + 1) + P_1, \min_i L_r(p - r, i) + P_2\}$$

The first term of the propagation cost $L_r(p, Z)$ is the cost $C(p, Z)$ obtained by fusing LIDAR cost $C_{Lf}(p, Z)$ with the stereo matching cost $C_{ST}(p, Z)$. The second term of the propagation cost $L_r(p, Z)$ is cost obtained by performing the SGM algorithm in the Z-space. The propagation cost $L_r(p, Z)$ is calculated based on the first term and the second term.

However, in the present embodiment, the propagation cost obtained by performing the SGM algorithm in the Z-space is not necessarily required. That is, cost calculation by the SGM algorithm may not be performed.

(Step S7)

At step S7, the distance calculation unit 14 determines whether the propagation cost $L_r(p, Z)$ has been calculated in all pixels. Steps S5 and S6 are repeatedly executed until the propagation cost $L_r(p, Z)$ has been calculated in all pixels.

(Step S8)

After the propagation cost $L_r(p, Z)$ has been calculated in all pixels, the distance calculation unit 14 calculates energy cost function S(p, Z) at step S8 (S(p, Z) may also be referred to as "energy cost S (p, Z)").

$$S(p,Z)=\Sigma L_r(p,Z) \qquad (7)$$

Figure 26:
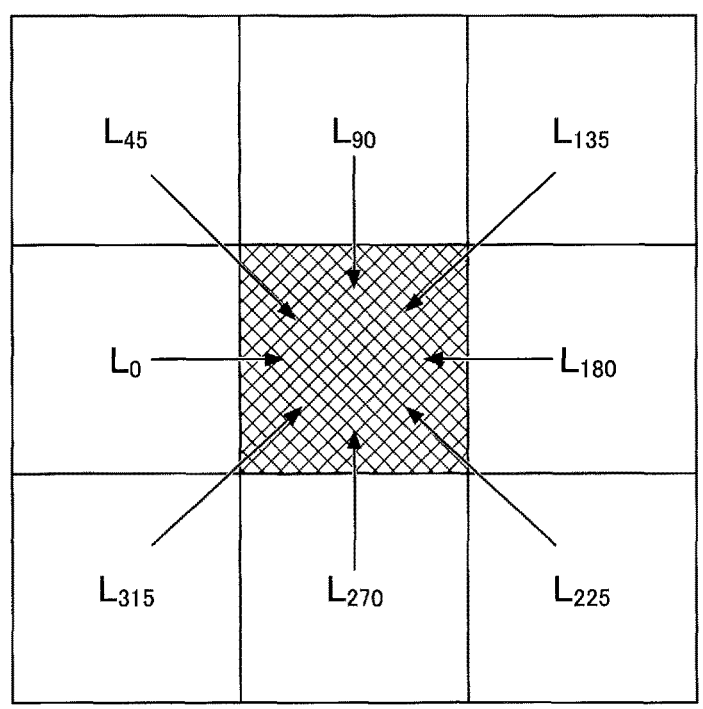
FIG. 26 is an example of a diagram illustrating a method of calculating energy cost S(p, Z)

FIG. 26 is an example of a diagram illustrating a method of calculating the energy cost S(p, Z). It is considered that cost of a pixel is related to cost of surrounding pixels. Thus, when obtaining the propagation cost $L_r(p, Z)$ of a certain pixel (may also be referred to as a "target pixel"), by adding the propagation cost $L_r(p, Z)$ of surrounding pixels of the target pixel, the propagation cost $L_r(p, Z)$ of the target pixel is calculated more accurately.

FIG. 26 illustrates a case in which the propagation cost $L_r(p, Z)$ of eight surrounding pixels of the target pixel is added. That is, the energy cost of the target pixel S(p, Z) is expressed as the following formula (8).

$$S(p,Z)=L_0(p,Z)+L_{45}(p,Z)+L_{90}(P,Z)+L_{135}(p,Z)+L_{180}(p,Z)+L_{225}(p,Z)+L_{270}(p,Z)+L_{315}(p,Z) \qquad (8)$$

Figure 27:
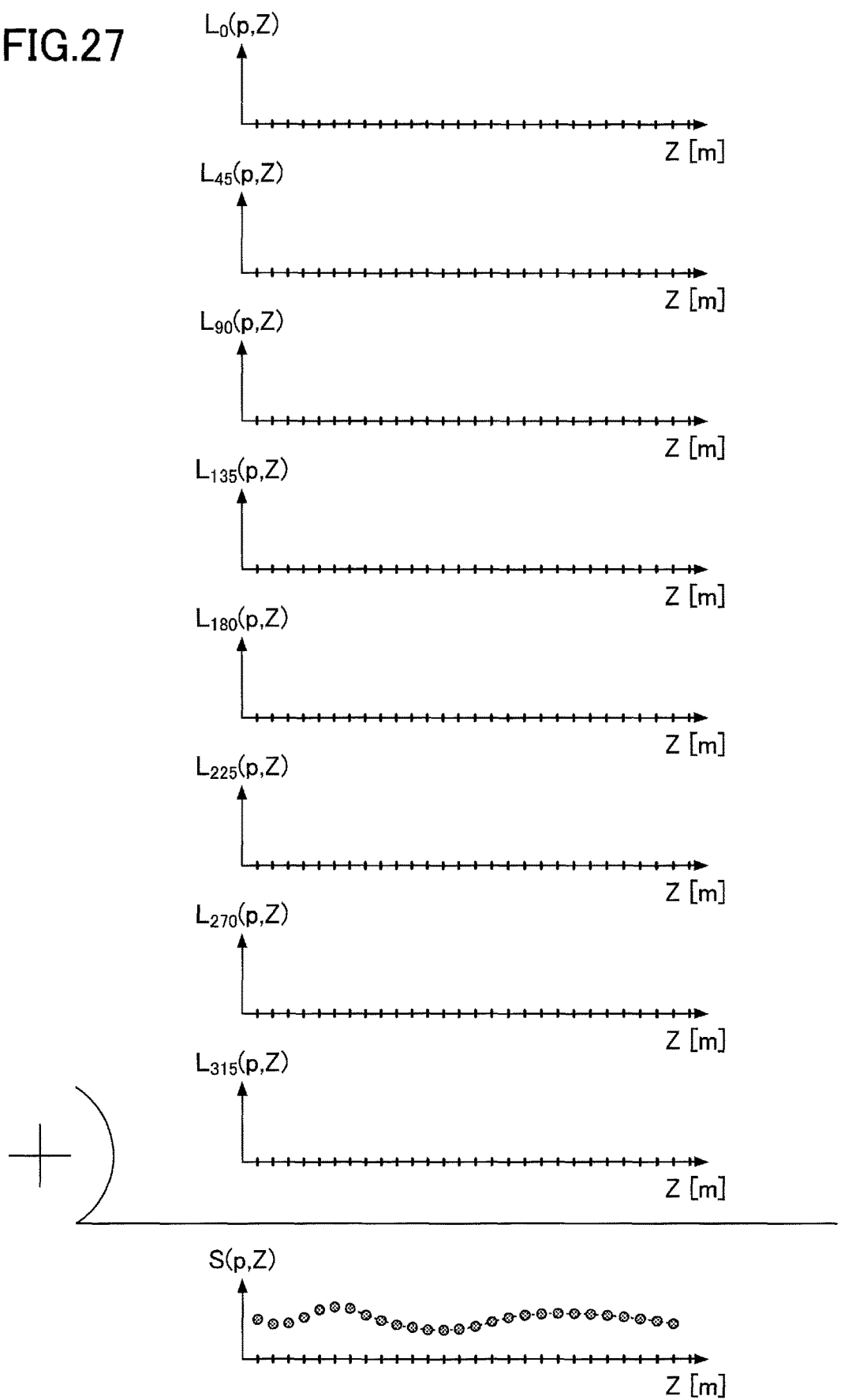
FIG. 27 is a schematic diagram illustrating a method of calculating the energy cost S(p, Z)

FIG. 27 is a schematic diagram illustrating a method of calculating the energy cost S(p, Z). As expressed in the formula (8), the propagation cost $L_r(p, Z)$ of eight surrounding pixels of the target pixel is added in the Z-space. By performing this calculation, the energy cost S(p, Z) of the target pixel is obtained.

The above mentioned calculation of adding the propagation cost $L_r(p, Z)$ of eight surrounding pixels is merely an example. The number of the propagation cost $L_r(p, Z)$ terms (in the formula (8)) to be added (such as the propagation cost of four pixels, five pixels, or 16 pixels) may be determined based on a calculation workload and accuracy of calculated distance. Alternatively, the addition of the propagation cost $L_r(p, Z)$ may not be performed.

(Step S9)

At step S9, the distance calculation unit 14 determines distance that minimizes the energy cost S(p, Z) (the distance is denoted by $Z_0$). The distance $Z_0$ is determined as a distance of the target pixel.

Figure 28:
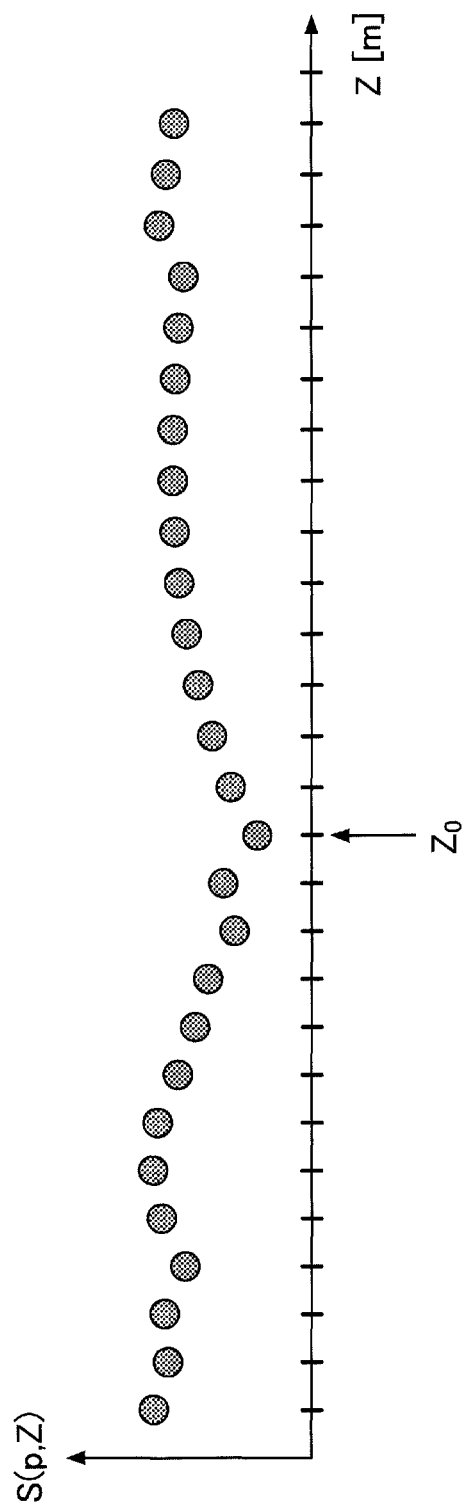
FIG. 28 is a diagram illustrating an example of a method of obtaining a distance $Z_0$ that minimizes the energy cost S(p, Z)

FIG. 28 is a diagram illustrating an example of a method of obtaining the distance $Z_0$ that minimizes the energy cost S(p, Z). Distance Z ($Z_0$) that minimizes the energy cost S(p, Z) is assumed to be most probable distance of the target pixel.

Further, in order to calculate fractional part of distance Z, a high-degree (sixth-degree) polynomial fitting, a high-degree (fourth-degree) polynomial fitting, a parabola fitting, and the like, may be used.

(Step S10)

After the distance $Z_0$ (distance minimizing the energy cost S(p, Z)) is determined for all pixels, the process in FIG. 17 terminates.

<Multi-Pulse>

Figure 29:
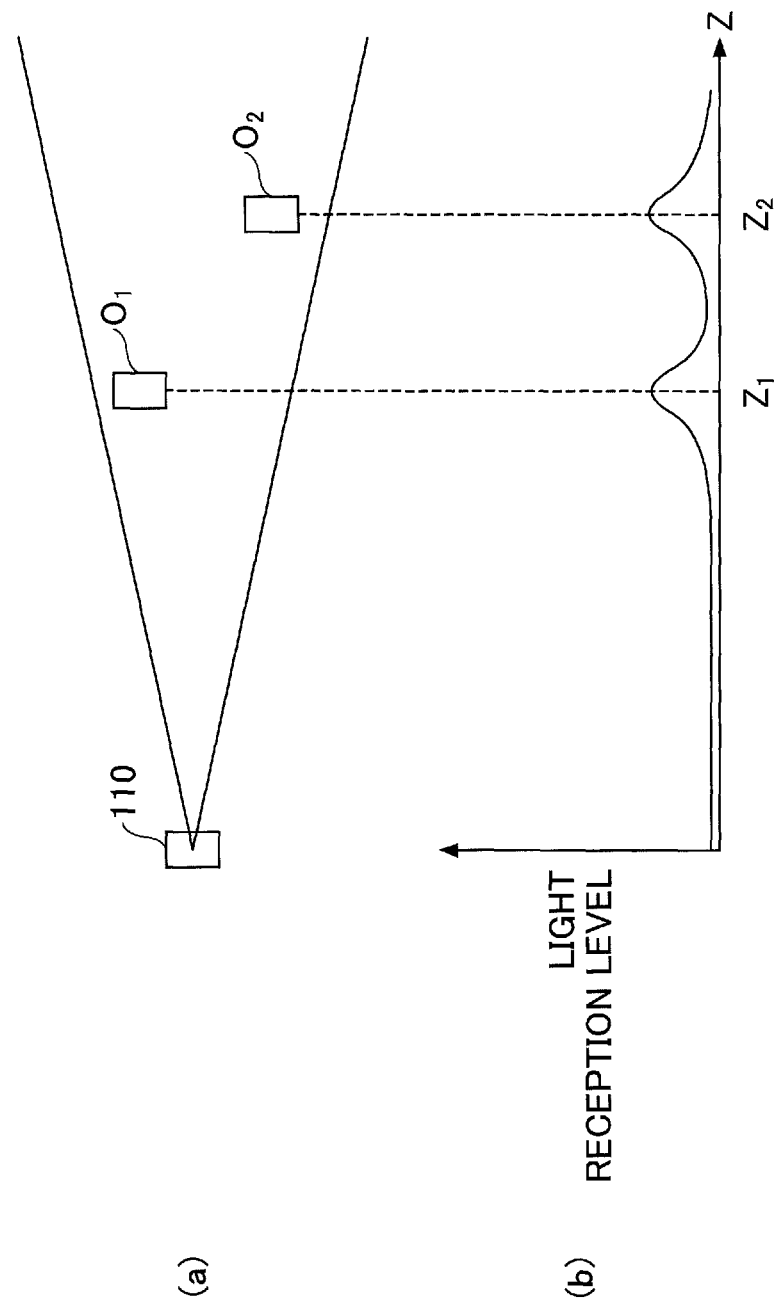
FIG. 29 is an exemplary diagram illustrating a process performed when multi-pulse occurred.

Next, a process performed when multi-pulse has occurred, which has been described above with reference to FIG. 25B, will be described. FIG. 29 is an exemplary diagram illustrating the process performed when multi-pulse has occurred. A diagram (a) of FIG. 29 is a top view of a range in which laser light emitted from the laser radar distance measurement unit 110 is spread, and a diagram (b) of FIG. 29 is an exemplary diagram illustrating a relationship between a light reception level and a distance Z.

As illustrated in the diagram (a) of FIG. 29, in a case in which an irradiated surface becomes larger than an object surface, the laser radar distance measurement unit 110 receives light reflected from multiple objects (objects $O_1$ and $O_2$ in the example of FIG. 29). When a relationship between a power level of light received by the laser radar distance measurement unit 110 (may also be referred to as a "light reception level") and a distance Z is illustrated as a graph, as illustrated in the diagram (b) of FIG. 29, the light reception level becomes larger at points of distances $Z_1$ and $Z_2$ where the objects $O_1$ and $O_2$ are placed. Accordingly, the laser radar distance measurement unit 110 can detect that multiple objects are present. As the laser radar distance measurement unit 110 generally determines that an object is present at a location where the light reception level is larger than a threshold, the laser radar distance measurement unit 110 can detect distances of two objects each placed at a different distance, in a case illustrated in the diagram (b) of FIG. 29.

When distances of two objects each placed at a different distance has been detected with a pulse of light, the distance calculation unit 14 performs integration of the stereo matching cost $C_{ST}(p, Z)$ and the LIDAR cost $C_{LI}(p, Z)$ with respect to two distances of the respective two objects. That is, to the stereo matching cost $C_{ST}(p, Z)$ of a pixel $r_0$ and surrounding pixels corresponding to an emitting direction of laser light with respect to a distance $Z_1$, the LIDAR cost $C_{LI}(p, Z)$ is added. Also, to the stereo matching cost $C_{ST}(p, Z)$ with respect to a distance $Z_2$, the LIDAR cost $C_{LI}(p, Z)$ is added.

In a conventional technique, it is difficult for one pixel to integrate cost with respect to two distances ($Z_1$ and $Z_2$). However, in the present embodiment, because integration is performed on the Z-space, cost with respect to two distances can be appropriately integrated. If the laser radar distance measurement unit 110 detects distances of multiple objects, it means that the detected distance information is ambiguous. Thus, when calculating the LIDAR cost $C_{LI}(p, Z)$ in a case in which distances of multiple objects are detected, the LIDAR cost $C_{LI}(p, Z)$ may be adjusted such that the LIDAR cost $C_{LI}(p, Z)$ becomes larger.

<Other Examples of Distance Measurement Using Radar>

A method of measuring distance performed by the laser radar distance measurement unit 110 described above with reference to FIG. 12 utilizes Time-of-Flight (TOF) principle. However, other methods such as Fast-Chirp Modulation (FCM) or Frequency Modulated Continuous Wave (FMCW) can be used. In the FCM and the FMCW, distance is obtained by converting a frequency of a beat signal caused by a slight frequency difference between a transmitting wave and a receiving wave.

Figure 30:
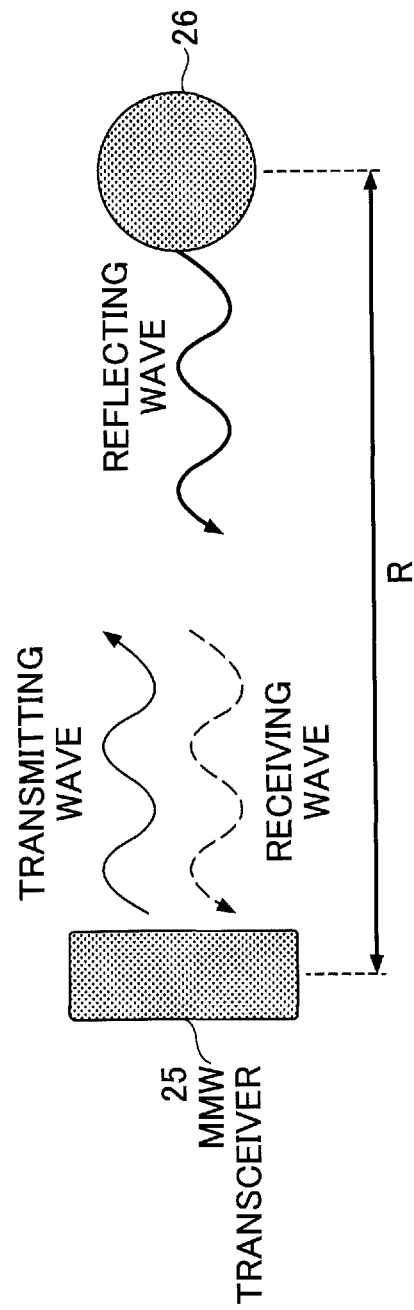
FIG. 30 is a diagram illustrating models of a transmitting wave, receiving wave, and a reflecting wave.

A method of measuring distance by the FCM will be described with reference to FIGS. 30, 31A, 31B, and 31C. Models of a transmitting wave, receiving wave, and a reflecting wave are illustrated in FIG. 30. As illustrated in FIG. 30, a transmitting wave emitted by a millimeter wave transceiver (MMW transceiver) 25 is reflected by an object 26, and a reflecting wave (part of the transmitting wave being reflected by the object 26) is received by the MMW transceiver 25 as a receiving wave. Let a distance between the MMW transceiver 25 and the object 26 be R.

Figure 31B:
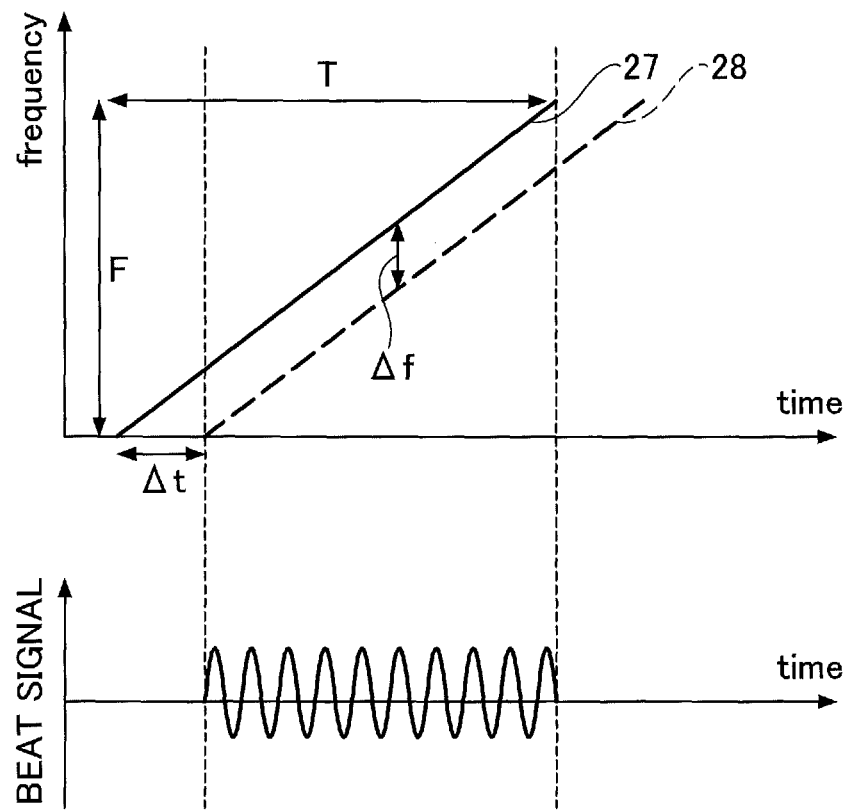
Figure 31C:
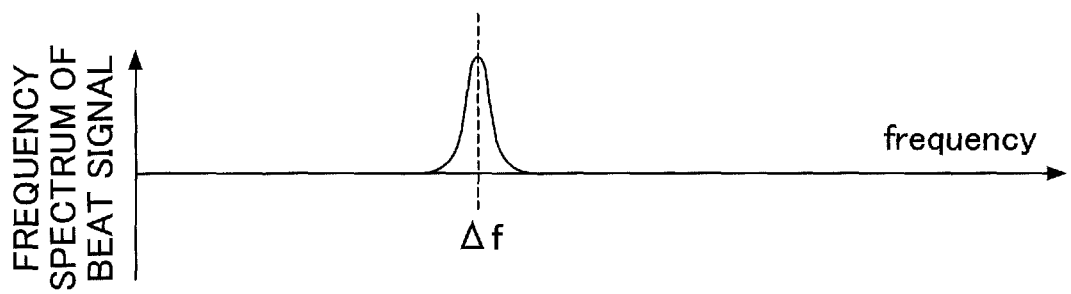

FIGS. 31A to 31C are diagrams for explaining frequencies of the transmitting wave and the receiving wave. In the FCM, a frequency of a signal (transmitting wave) is gradually caused to be increased as time passes. FIG. 31A illustrates a state in which frequencies of the transmitting wave 27 and the receiving wave 28 are increasing gradually. A signal in which a frequency varies with time is referred to as a chirp. As illustrated in FIG. 31A, frequencies of the transmitting wave 27 and the receiving wave 28 are increasing as time passes, while amplitudes of the transmitting wave 27 and the receiving wave 28 are constant. Note that the receiving wave 28 is observed with a delay Δt, which corresponds to a time until the transmitting wave 27 reflected by the object 26 is returned. Thus, because a frequency of the receiving wave 28 is slightly different from a frequency of the transmitting wave 27, a beat signal is generated.

FIG. 31B is a graph illustrating changes of frequency components with time, with respect to the transmitting wave and the receiving wave. The receiving wave 28 is observed after a time Δt has passed from a time when an emission of the transmitting wave 27 was started (hereinafter, the time Δt may be referred to as a "delay"). Note that the frequency of the transmitting wave 27 increases at a constant rate with time. Thus, in a case in which the delay Δt is constant, a frequency difference Δf between the transmitting wave 27 and the receiving wave 28 is also constant. Therefore, if the frequency difference Δf is observed, the delay Δt can be obtained by using the frequency difference Δf. Further, if the delay Δt is obtained, a distance to an object can be calculated by using the delay Δt. Note that a period when a frequency of a signal (transmitting wave) is gradually caused to be increased is denoted as T, and a difference between a maximum frequency of the transmitting wave 27 and a minimum frequency of the transmitting wave 27 is F.

As there is a frequency difference between the transmitting wave 27 and the receiving wave 28, a beat signal is generated when the receiving wave 28 is superimposed on the transmitting wave 27. A beat signal corresponds to an envelope waveform of a superimposed signal, and if Δf is constant, a frequency of the envelope waveform is also constant. Also, it is known that a frequency of a beat signal is equal to Δf.

When Fourier transform (preferably fast Fourier transform) is applied to a beat signal, a frequency spectrum having a peak at a frequency of the beat signal is obtained. Accordingly, a frequency Δf can be detected by applying Fourier transform to a beat signal. FIG. 31C is a schematic diagram illustrating a frequency spectrum obtained by applying Fourier transform.

Next, a method of obtaining the distance R from Δf will be described. The distance R and Δt (the delay) satisfy a relationship expressed by the following formula (9).

$$\Delta t = 2R/C \quad (9)$$

where C represents velocity of light traversed in the air.

Next, as is apparent from FIG. 31B, Δf and Δt have a relationship of "Δt:Δf=T:F", which can be transformed into the following formula (10).

$$\Delta f = F \times \Delta t / T \quad (10)$$

By substituting the formula (9) into the formula (10), the following formula (11) is obtained. The formula (11) can be transformed into a formula (12) below.

$$\Delta f = 2RF/CT \quad (11)$$

$$R = CT \times \Delta f / 2F \quad (12)$$

Therefore, by substituting a frequency of a beat signal obtained by Fourier transform, for Δf in the formula (12), the distance R can be obtained.

Figure 32:
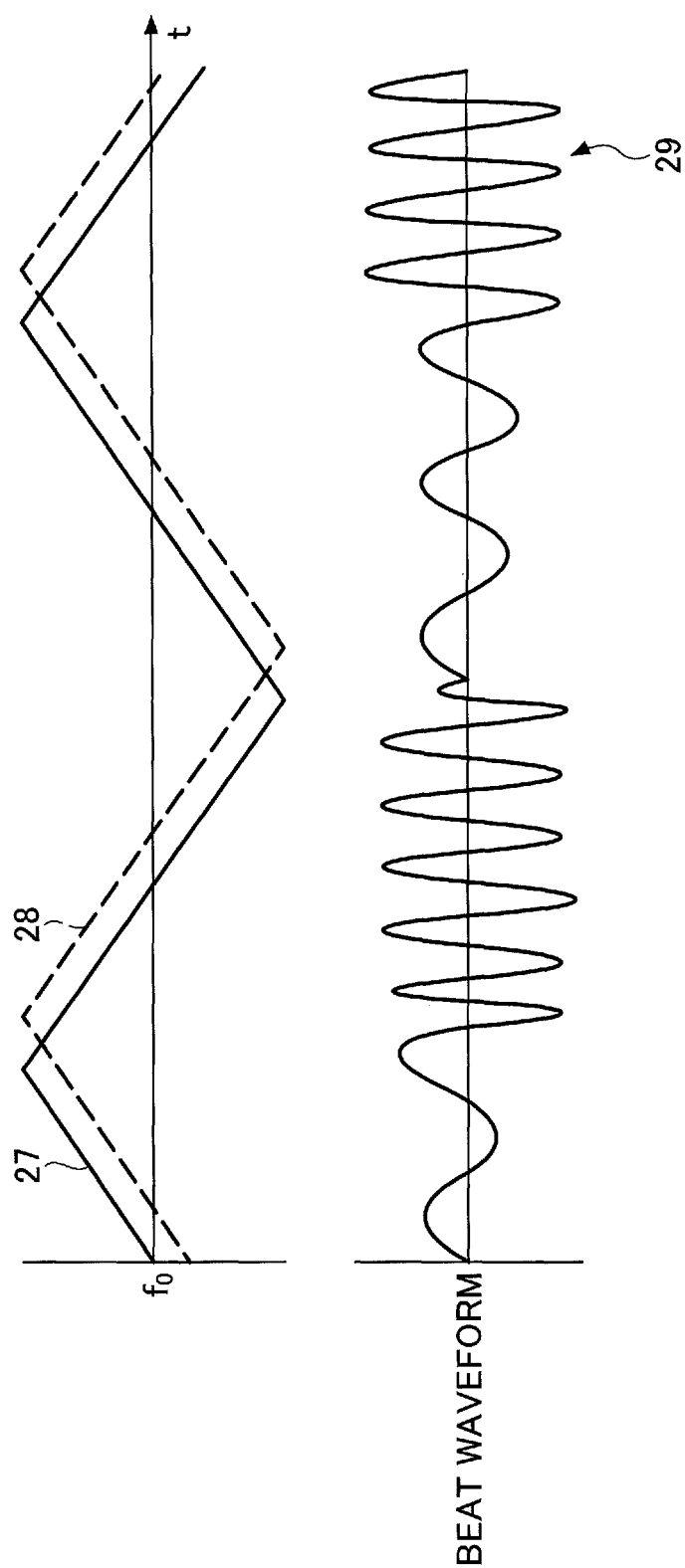
FIG. 32 is a graph illustrating changes of frequencies with time, with respect to a transmitting wave and a receiving wave used in FMCW, and illustrating a beat waveform generated in the FMCW.

The FMCW is a method of performing the FCM continuously, and a principle of the FMCW is the same as that in the FCM. FIG. 32 is a graph illustrating changes of frequencies with time, with respect to a transmitting wave 27 and a receiving wave 28 used in the FMCW, and illustrating a beat waveform 29 generated in the FMCW. In the FMCW, the frequency of the transmitting wave 27 or the receiving wave 28 changes relatively slowly, and the change occurs repeatedly. It is said that the FCM is superior in recognition capability of relative speed and recognition capability of multi-target.

<Detecting Direction of Object by MMW Radar>

Figure 33A:
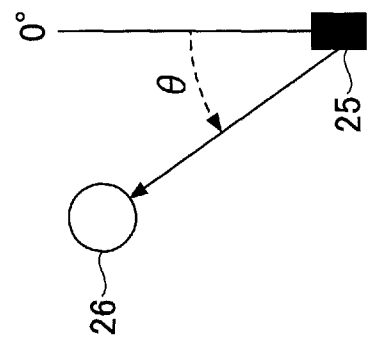
FIGS. 33A and 33B are diagrams illustrating a direction of an object.
Figure 33B:
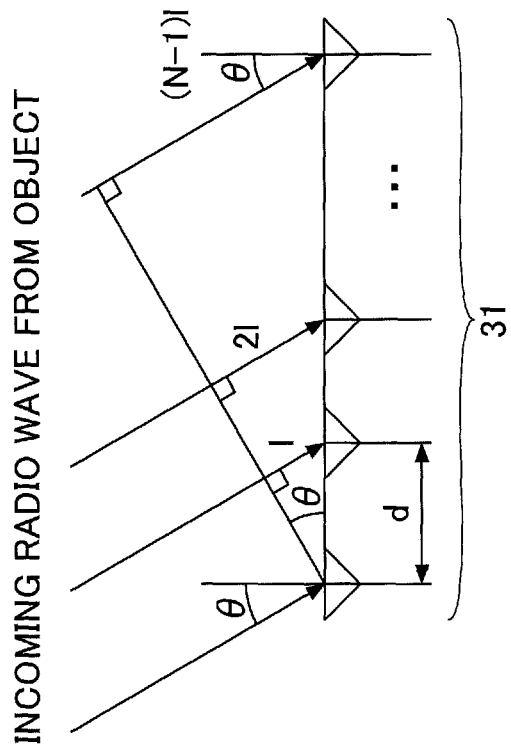

Next, a method of detecting a direction of an object by using the FCM will be described with reference to FIGS. 33A and 33B. FIGS. 33A and 33B are diagrams illustrating a direction of an object. A positional relationship between the MMW transceiver 25 and an object 26 seen from above is illustrated in FIG. 33A. As a receiving wave (part of a transmitting wave being reflected by the object 26) is regarded as a plane wave when the object 26 is apart from the MMW transceiver 25, the FCM detects a direction where the object 26 is located by estimating an incoming direction of the receiving wave (plane wave). In FIG. 33A, let an advancing direction of a moving body in which the MMW transceiver 25 is installed be 0 degrees. Also, suppose a case in which the object 26 is located at θ degrees from the advancing direction. In this case, an incoming direction of the receiving wave is θ.

FIG. 33B is a diagram illustrating a method of estimating the incoming direction θ of the receiving wave. Θ is detected by using an array antenna. FIG. 33B illustrates a case in which N number of receiving antennas 31 are arranged in a line with each spaced at intervals of d. As described above, the receiving wave arriving at the receiving antennas 31 is regarded as a plane wave if the object 26 is apart from the receiving antennas 31. Path differences of receiving waves received by the respective receiving antennas 31 can be expressed as multiples of (d×sin Θ) (in other words, when a path difference of two receiving waves received by two adjacent receiving antennas 31 is denoted as "l", the path difference l can be expressed as "l=d×sin Θ"). The path difference l can be calculated by using a delay r (a difference of time when adjacent two receiving antennas 31 receive the receiving waves). Specifically, l and r have a relationship of "r=l/C", where C represents velocity of light traversed in the air. Thus, if the delay r of the receiving waves received by the adjacent receiving antennas 31 is detected, Θ can be estimated by using the following formula (13).

$$\Theta = \arcsin(r \times C/d) \quad (13)$$

<Effect>

In the following, effect of the distance measurement system 100 according to the present embodiment will be described with reference to experimental results.

<<Experimental Result 1>>

Figure 34:
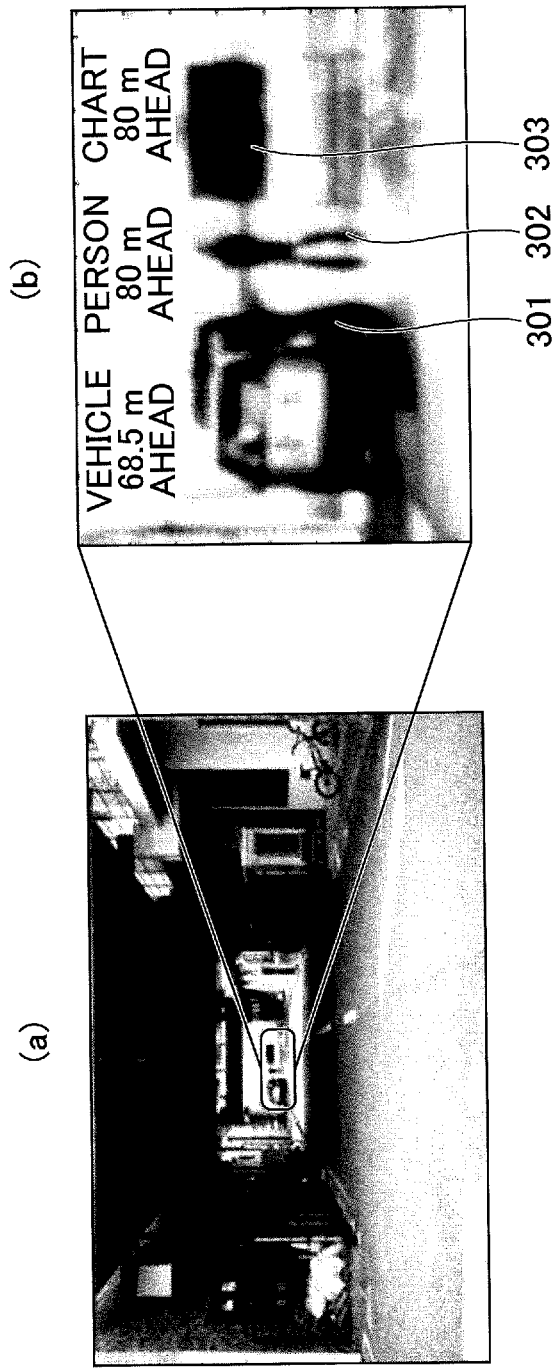
FIG. 34 illustrates a reference image used in a first experiment.

A reference image used in a first experiment is illustrated in FIG. 34. A picture (a) is a reference image, and (b) is an enlarged view of a central region of the picture (a). A moving body 301, a person 302, and a chart (such as a road sign indicating a driving direction) 303 appear in a vicinity of a center of the reference image. Actual distances to these objects (from the distance measurement system 100) are as follows:

moving body: 68.5 m
person: 80 m
chart: 80 m

Figure 35B:
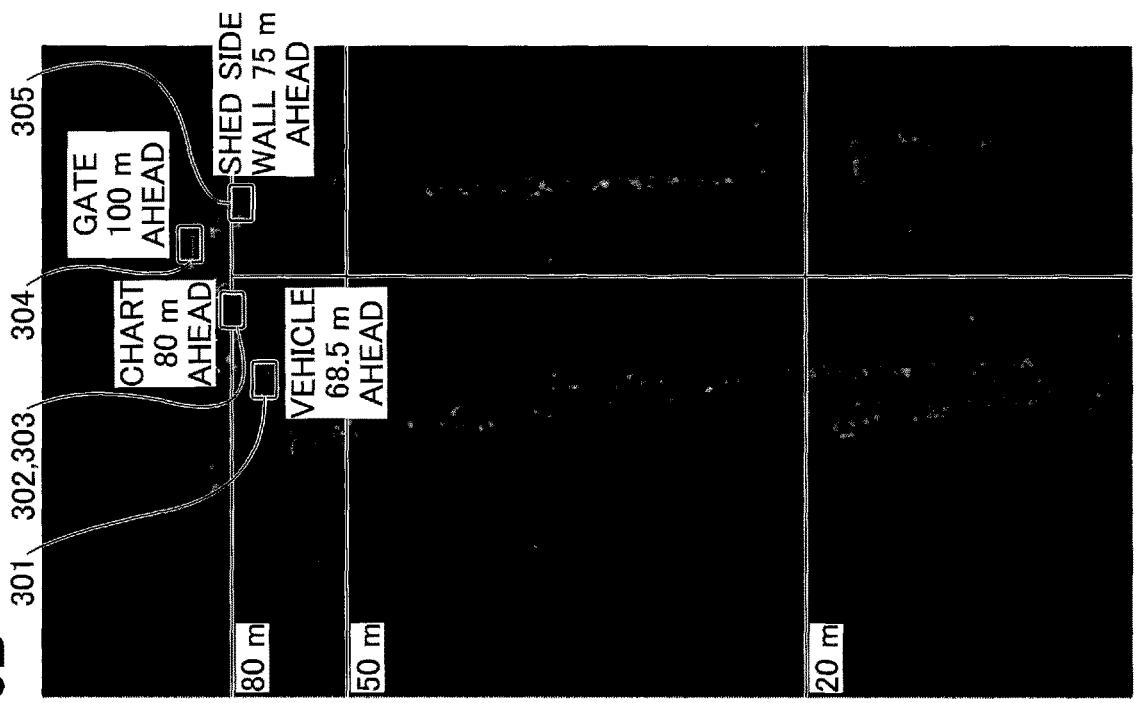
FIGS. 35A and 35B illustrate overhead view maps.
Figure 35A:
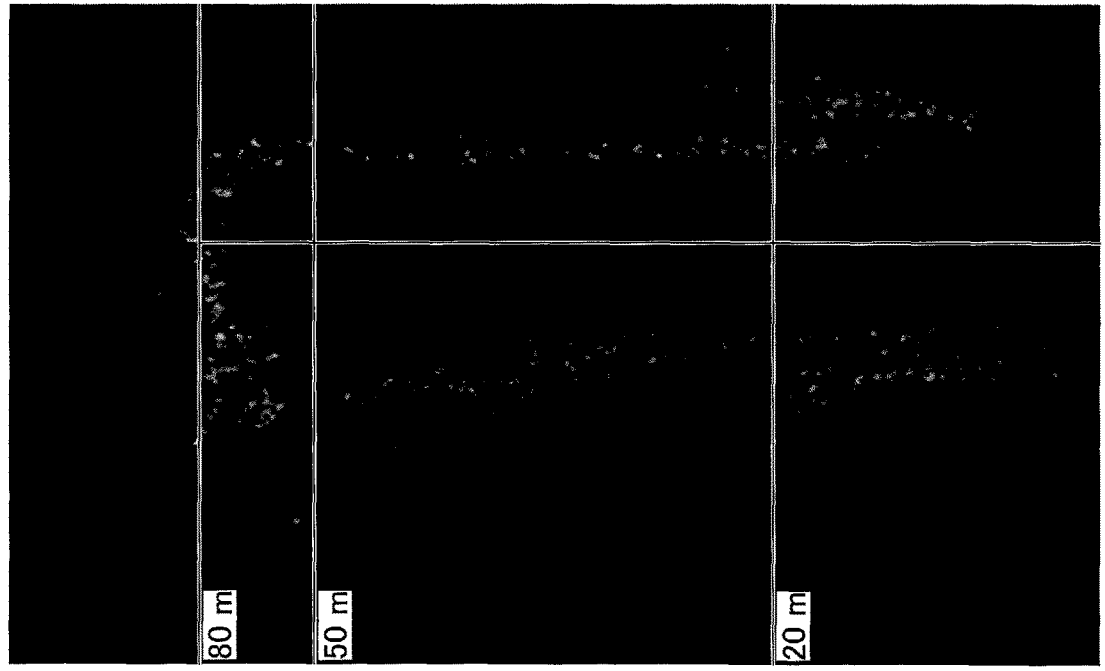

FIGS. 35A and 35B are overhead view maps generated by the first experiment. FIG. 35B is an overhead view map generated based on distance information measured by the distance measurement system 100 according to the present embodiment, and FIG. 35A is a comparative example, which is an overhead view map generated based on distance information obtained by block matching. In the present embodiment (FIG. 35B), because accuracy of distance measurement and resolution performance improve, the moving body 301 can be separated from the chart 303 (or person 302). Also, a gate located 100 m ahead, and a shed located 75 m ahead are separated. However, the chart 303 and the person 302 positioned at the same distance cannot be separated, which is a further task.

Figure 36:
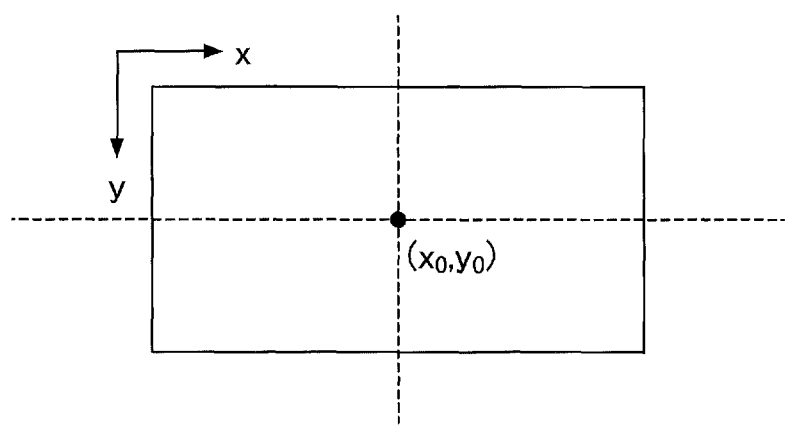
FIG. 36 is a diagram illustrating an example of a method of generating an overhead view map.

Regarding the overhead view map, supplemental description will be made with reference to FIG. 36. FIG. 36 is a diagram an example of a method of generating an overhead view map. FIG. 36 represents a range image. In a case in which a distance of pixel coordinates (x, y) is "z", a parallax d(x, y) of the pixel coordinates (x, y) is expressed as "d(x, y)=B×F/Z".

If coordinates of a center of the range image are $(x_0, y_0)$, coordinates of an actual space (X, Y, Z) are expressed as the following expressions:

$$X = (x - x_0) \times B/d(x, y)$$

$$Y = (y - y_0) \times B/d(x, y)$$

$$Z = B \times F/d(x, y)$$

For each pixel in the range image, the distance calculation unit 14 performs calculations using the above expressions. As the overhead view map in FIG. 36 is a two-dimensional map, by calculating coordinates (X, Z) corresponding to each pixel in the range image, and by adding a value to a mesh space corresponding to an XZ-coordinate space, the overhead view map like FIG. 36 is obtained. Also, by calculating coordinates (X, Y, Z) corresponding to each pixel in the range image, a three-dimensional map is obtained.

<<Experimental Result 2>>

Figure 37:
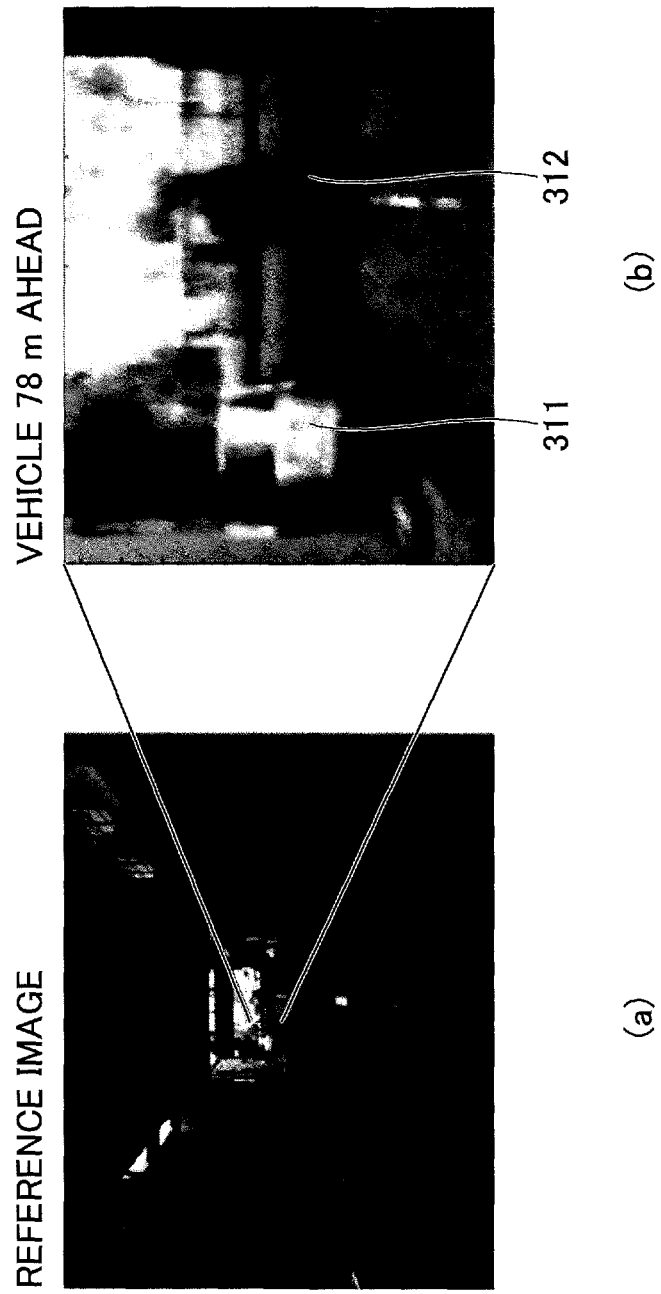
FIG. 37 illustrates a reference image used in a second experiment.

A reference image used in a second experiment is illustrated in FIG. 37. A picture (a) of FIG. 37 is a reference image, and (b) of FIG. 37 is an enlarged view of a central region of the picture (a). Moving bodies 311 and 312 appear in a vicinity of a center of the reference image. Actual distances to these objects (from the distance measurement system 100) are as follows:

moving body 311: 55 m
moving body 312: 78 m

Figure 38:
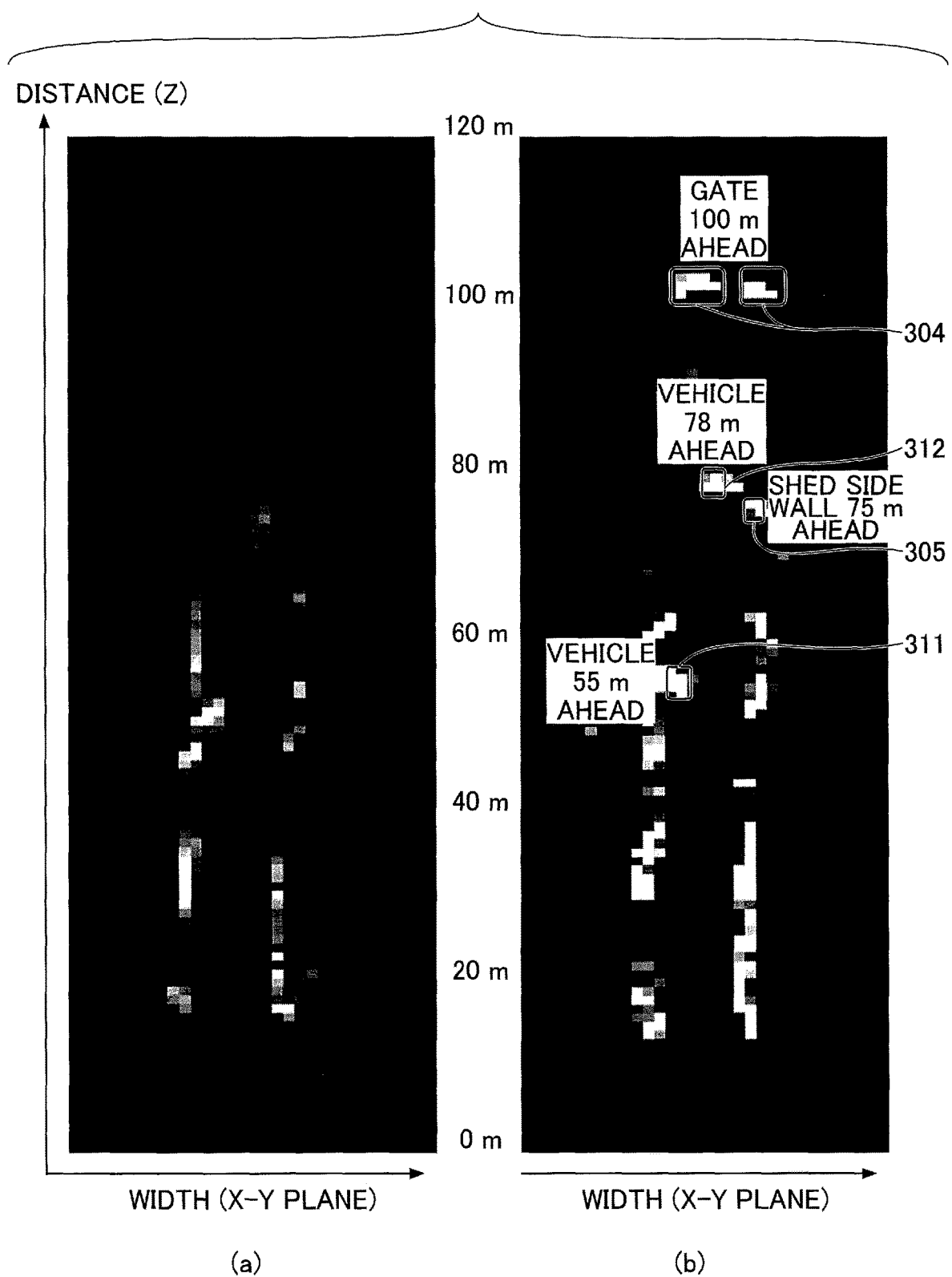
FIG. 38 illustrates overhead view maps.

FIG. 38 illustrates an overhead view map generated by the first experiment and an overhead view map according to a comparative example. A picture (b) of FIG. 38 is an overhead view map generated based on distance information measured by the distance measurement system 100 according to the present embodiment, and a picture (a) of FIG. 38 is the overhead view map according to the comparative example, which is generated based on distance information obtained by block matching. In the present embodiment, because accuracy of distance measurement and resolution performance improve, the moving bodies 311 and 312 can be clearly separated. Also, a gate located 100 m ahead, and a shed located 75 m ahead are separated.

<<Experimental Result 3>>

Figure 39:
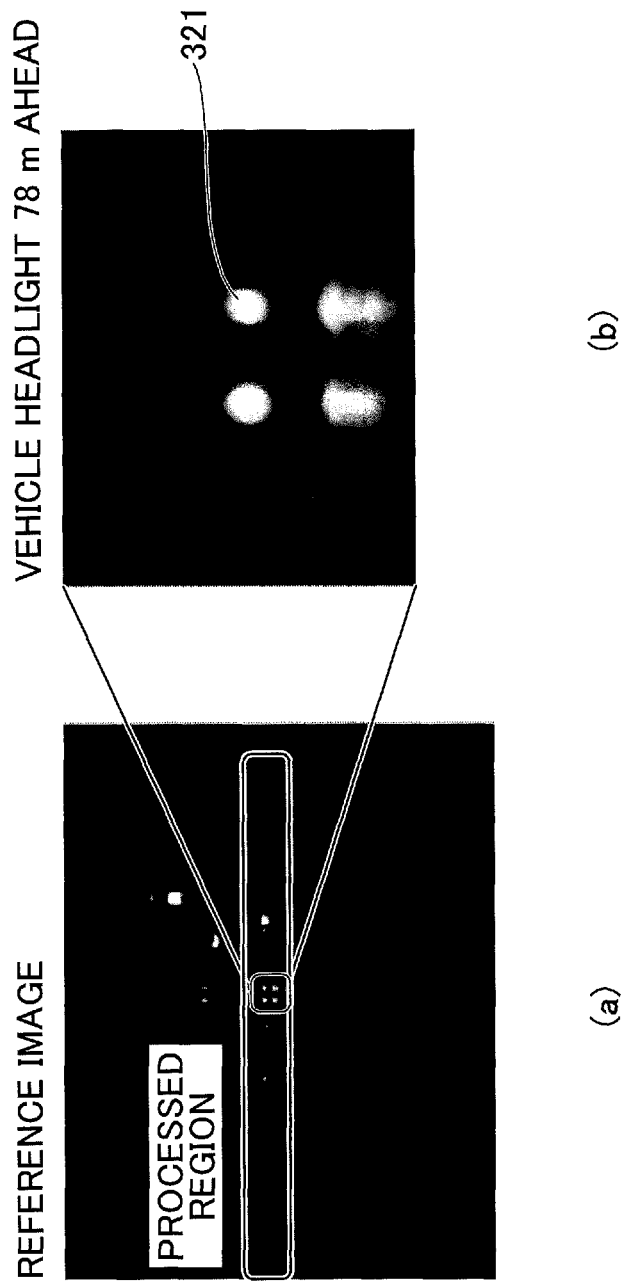
FIG. 39 is a reference image which is an image of a headlight captured at night.

FIG. 39 is a reference image, which is an image of a headlight captured at night. A picture (a) of FIG. 39 is an entire reference image and a region processed by the distance measurement system 100, and (b) of FIG. 37 is an enlarged view of a headlight portion of a moving body 321.

Figure 40:
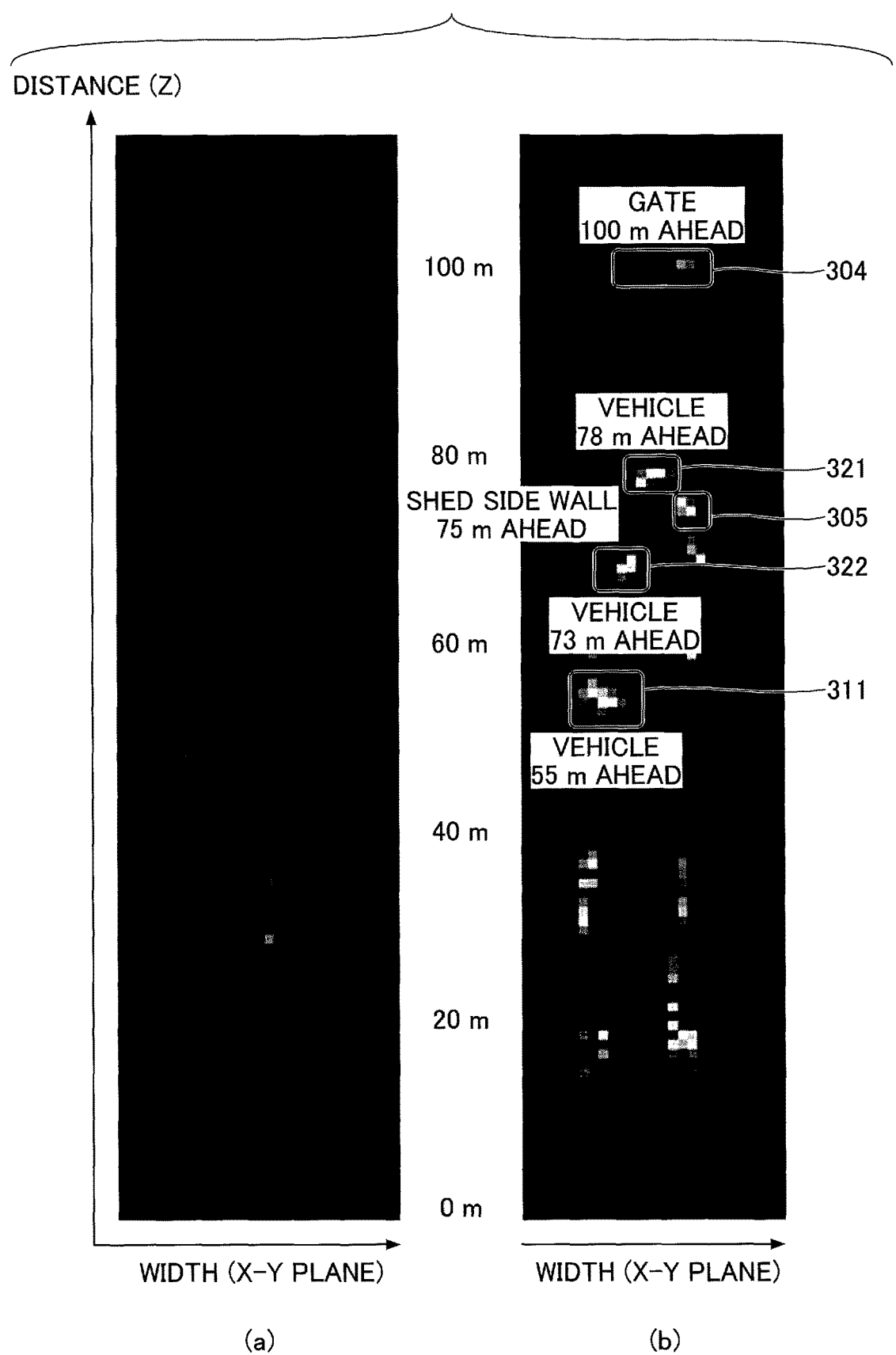
FIG. 40 illustrates overhead view maps.

FIG. 40 illustrates an overhead view map generated by the first experiment and an overhead view map according to a comparative example. A picture (b) of FIG. 40 is an overhead view map generated based on distance information measured by the distance measurement system 100 according to the present embodiment, and a picture (a) of FIG. 40 is the overhead view map according to the comparative example, which is generated based on distance information obtained by block matching. In the overhead view map generated based on distance information obtained by the block matching, locations of objects are unclear. On the other hand, the distance measurement system 100 according to the present embodiment can separately detect three-dimensional objects (moving bodies 311 and 312, a shed 305, and a gate 304) positioned at a remote location 60 meters or more distant.

<<Experimental Result 4>>

Figure 41:
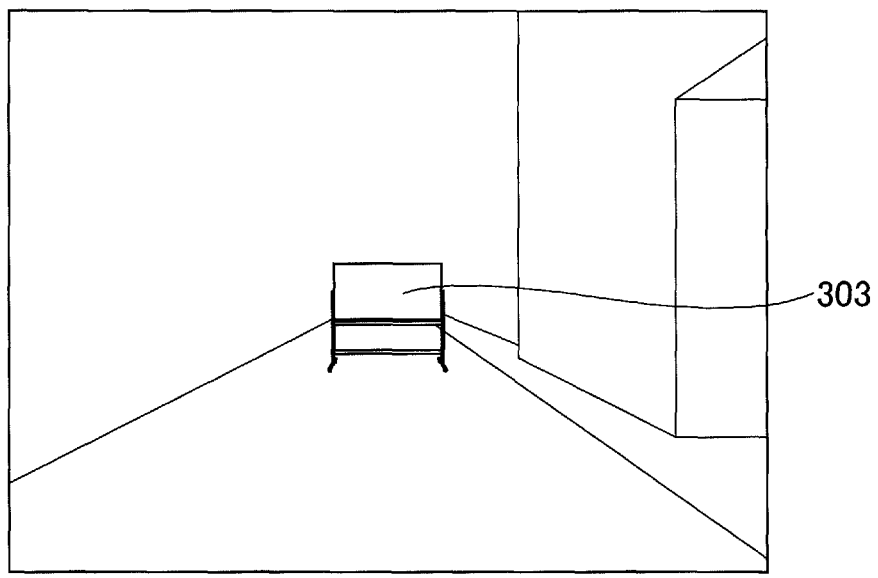
FIG. 41 illustrates a reference image of a chart.

A result of an experiment in which a distance of a chart was measured will be described. In this experiment, a distance of a chart 80 m away and a distance of a chart 30 m away were measured. FIG. 41 is a reference image of a chart. Although colored range images have been actually obtained in this experiment, in the present specification, instead of illustrating the range images, a summary of an evaluation result of accuracy of measured distance will be described in the following table (Table 1). In this experiment, distances to a surface of the chart have been measured. As a result of the measurement, an average, a variance, and a standard deviation of the distances are illustrated in the following table.

TABLE 1

| Distance to Chart | | Average | Variance | Standard deviation |
|---|---|---|---|---|
| 80 m | Present embodiment | 80.2574 m | 0.0608 | 0.2466 m |
| | SGM | 87.8570 m | 36.8302 | 6.0688 m |
| | Block matching | 76.75076 m | 155.6537 | 12.4761 m |
| 30 m | Present embodiment | 30.8856 m | 0.0630 | 0.251 m |
| | SGM | 28.96096 m | 3.124086 | 1.7675 m |
| | Block matching | 26.16256 m | 616.8423 | 24.83631 m |

Results of detecting distances to the chart 303 by the present embodiment, the SGM algorithm, and the block matching are illustrated in Table 1. In both cases in which the chart 303 is 80 m away, and in which the chart 303 is 30 m away, it is found that the distance measurement system 100 according to the present embodiment attains improved accuracy with respect to the average, the variance, and the standard deviation.

<<Experimental Result 5>>

Figure 42A:
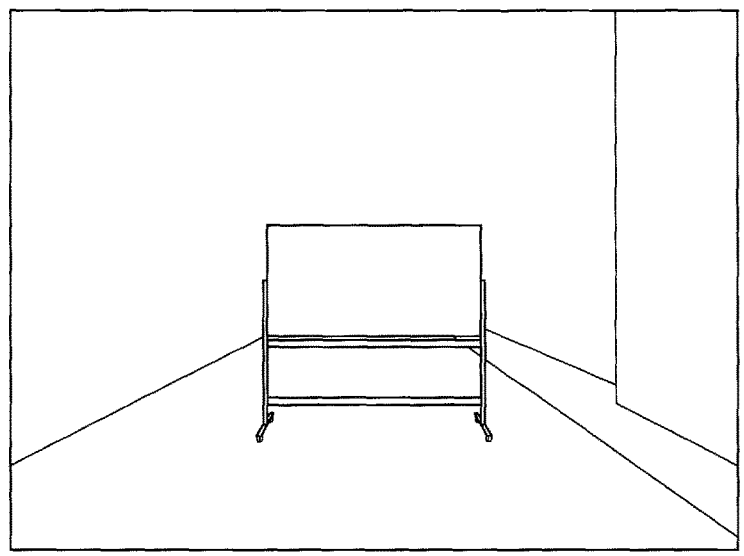
FIGS. 42A to 42C are diagrams for explaining effect for suppressing dilation caused by SGM.
Figure 42B:
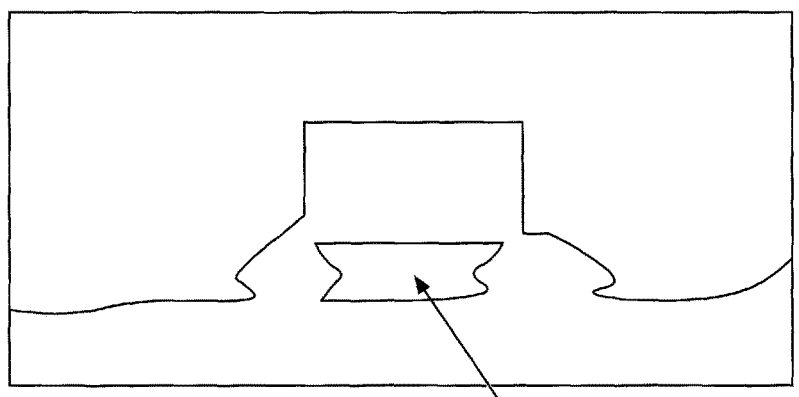
Figure 42C:
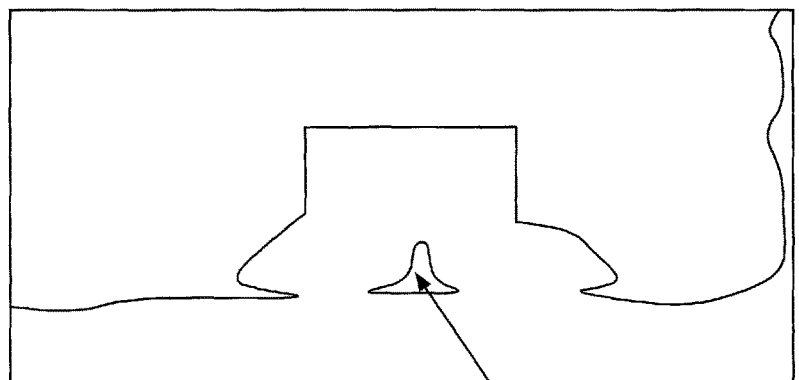

FIGS. 42A to 42C are diagrams for explaining effect for suppressing dilation caused by the SGM. FIG. 42A illustrates a reference image, FIG. 42B illustrates a range image obtained by the distance measurement system 100 according to the present embodiment, and FIG. 42C illustrates a range image obtained by the SGM algorithm. In FIG. 42C, because of dilation, a part of pixels between the posts of a chart, which should correspond to a road surface, are represented as if a distance to the road surface were equal to a distance to a surface of the chart. However, in FIG. 42B (the present embodiment), pixels between posts of a chart are representing a distance to the road surface beyond the chart.

In the experiment of FIGS. 42A to 42C, a multi-layer laser radar distance measurement unit 110, which scans laser light in multiple vertical layers, is used.

<Summary>

As described above, in the distance measurement system 100 according to the present embodiment, because integration of distance information measured by LIDAR is performed in Z-space before a stereocamera outputs a range image generated by the block matching or the like, a high-quality and high-resolution range image can be obtained.

For example, in conventional techniques such as that disclosed in Japanese Unexamined Patent Application Publication No. 2015-143679, distance information measured by LIDAR is integrated with a parallax image obtained by block matching on a parallax space. However, in the present embodiment, integration is performed in a distance space.

In a method of performing integration in a parallax space, despite distance resolution of LIDAR being excellent and accuracy of measured distance being secured, distance resolution with integration degrades especially in a remote location. Further, sub-pixel estimation is performed by using distance information of coarse distance resolution. Thus, accuracy of measured distance cannot be secured, and improving accuracy is not expected.

In the method of performing integration in a distance space, as in the present embodiment, integration of LIDAR with a cost curve is realized while securing high accuracy of distance measured by LIDAR; accordingly, a high-quality and high-resolution range image can be obtained.

Accordingly, in the present embodiment, even in a distance range in which a parallax is close to 0, such as a remote location approximately 100 m away, and in which measurement by a stereocamera is difficult, a range image having accurate distance information and having small variance of distance information with respect to an object surface can be generated. Also, when reconstructing three-dimensional space, a wide area of three-dimensional space can be reconstructed.

That is, as compared to a conventional stereocamera, accuracy of distance measurement improves, and variance of distance to an object surface becomes smaller. Also, as ability of separately detecting objects improves, ability of detecting an object at a remote location improves, and accuracy of distance measurement of an object at a remote location improves. Further, because of integration according to the present embodiment, even for a pixel having unreliable cost, such as due to a repetitive pattern or a low-texture region, a more accurate distance can be measured. Further, even at night, more accurate distance can be measured. Further, it is also effective for suppressing dilation caused by the SGM. Also, as compared to conventional LIDAR, the present embodiment improves spatial resolution.

Second Embodiment

In a distance measurement system 100 which will be described in a second embodiment, integration of stereo matching cost $C_{ST}$ (p, Z) with LIDAR cost $C_{LI}$ (p, Z), considering ambiguity of a distance measured by LIDAR, is performed.

As described in the first embodiment, even within a range of a horizontal resolution and a vertical resolution of laser light, the LIDAR cost $C_{LI}$(p, Z) becomes larger in a peripheral part. To solve the problem, in the first embodiment, cost is adjusted such that cost in a peripheral part becomes larger. The second embodiment solves the problem by considering ambiguity of distance information measured by the laser radar distance measurement unit 110.

That is, the LIDAR cost $C_{LI}$(p, Z) in the first embodiment is calculated based on only accuracy in an xy-plane (may also be referred to as spatial component of LIDAR cost (or spatial component cost)), but the second embodiment considers accuracy in the Z-direction (may also be referred to as distance component of LIDAR cost (or distance component cost)). In the present embodiment, LIDAR cost $C_{LI}$(p, Z) is defined as a function described in the following formula (14).

$$\text{LIDAR cost } C_{LI}(p,Z) \propto \text{spatial component cost} \times \text{distance component cost} \qquad (14)$$

In the following, a method of calculating the LIDAR cost $C_{LI}(p, Z)$ considering distance component cost $C_{LD}(p, Z)$ will be described.

Figure 43:
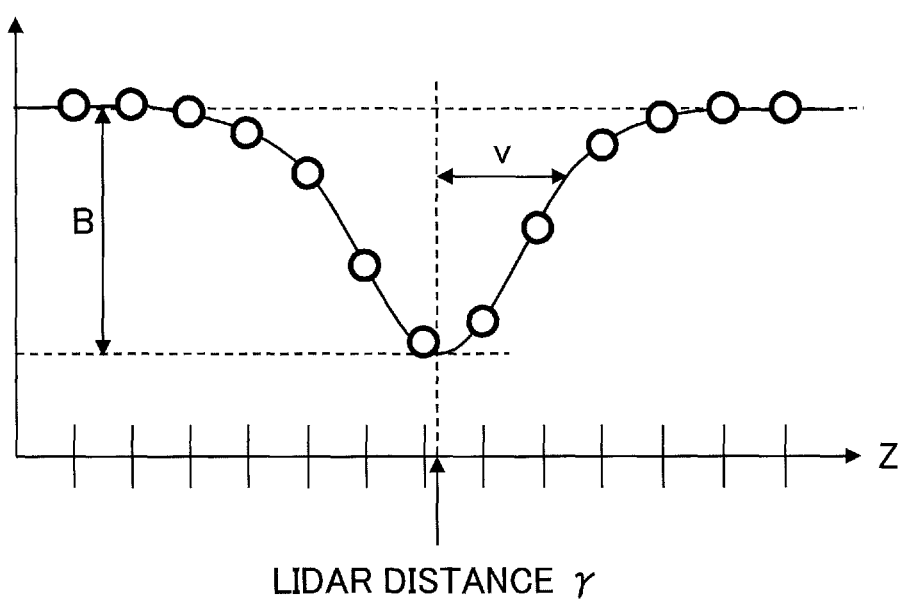
FIG. 43 is a diagram schematically illustrating the distance component cost $C_{LD}(p, Z)$ of LIDAR cost.

An example of the spatial component cost may be defined as the above described formula (5). The distance component cost is defined, for example, as the following formula (15).

$$C_{LD}(p, Z) = 1 - B\exp\frac{-(Z-\gamma)^2}{2v^2} \quad (15)$$

where
$\gamma$: distance measured by LIDAR (LIDAR distance)
$(Z-\gamma)$: deviation from LIDAR distance
$v$: a parameter affecting width of the distance component
$B$: a parameter (0 to 1) affecting depth of the distance component FIG. 43 is a diagram schematically illustrating the distance component cost $C_{LD}(p, Z)$ of the LIDAR cost. As described, the distance component cost $C_{LD}(p, Z)$ takes the minimum at a point equal to a distance measured by LIDAR (may also be referred to as a "LIDAR distance"), and the distance component cost $C_{LD}(p, Z)$ becomes larger as a deviation from a LIDAR distance becomes larger. LIDAR distance may deviate from an actual value depending on an effect of a reflection rate of an object, or depending on a point where laser light is emitted. If LIDAR distance deviates from an actual value, an object surface forming a single surface may be detected as separate objects (this phenomenon may be referred to as "splitting"). By considering such ambiguity of LIDAR distance and including the ambiguity as distance component of the LIDAR cost, as described in the formula (15), occurrence of splitting can be reduced.

Note that a shape of a graph of the distance component cost $C_{LD}(p, Z)$ in FIG. 43 is merely an example. For example, the shape may be of rectangular shape, such that distance component cost in a predetermined range from the LIDAR distance $\gamma$ takes a minimal value. Alternatively, the shape may be of reverse triangle shape, similar to FIG. 43.

Figure 44:
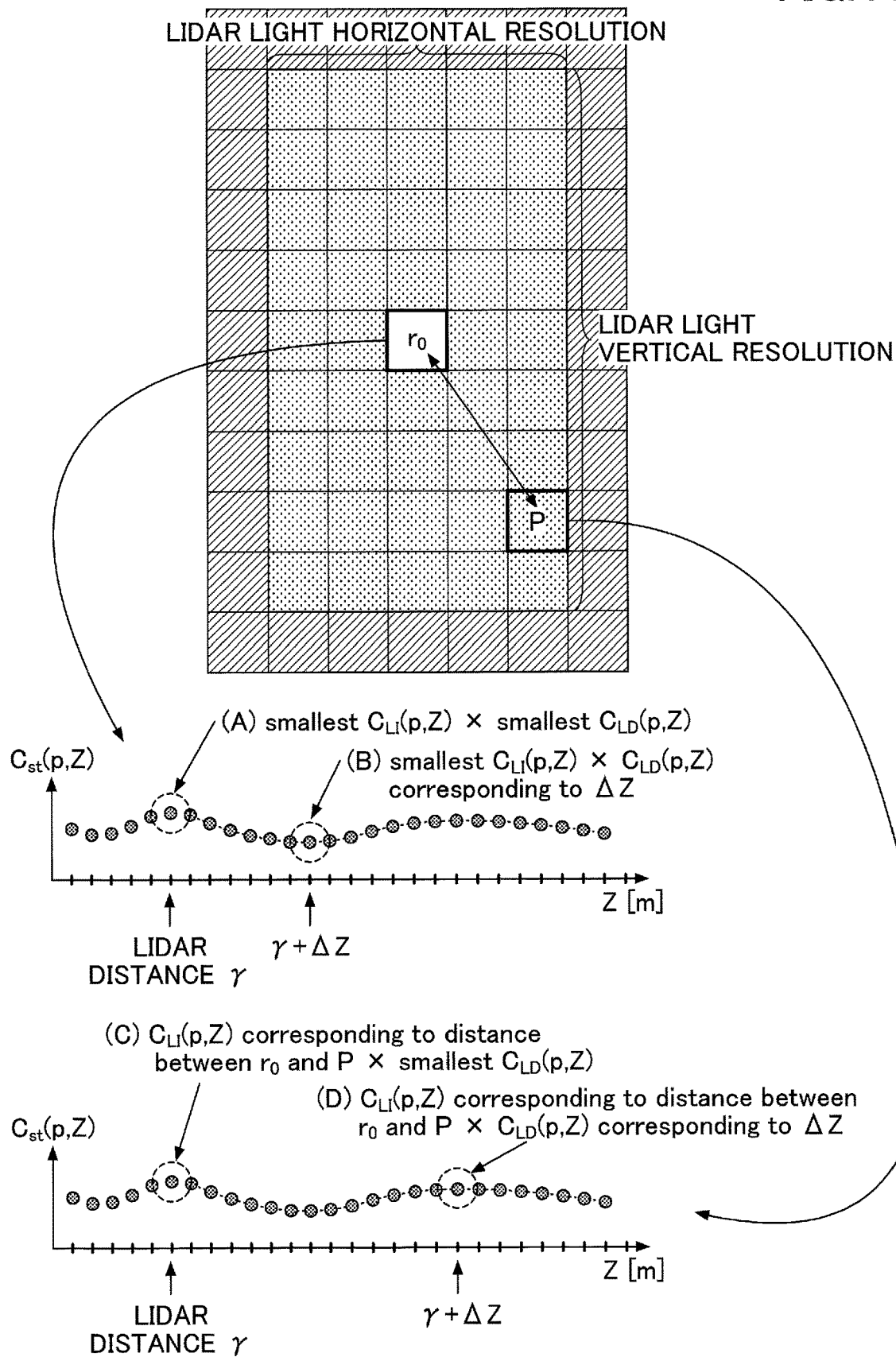
FIG. 44 is a diagram illustrating how the spatial component cost $C_{LI}(p, Z)$ and the distance component cost $C_{LD}(p, Z)$ of the LIDAR cost is integrated with the stereo matching cost $C_{ST}(p, Z)$.

FIG. 44 is a diagram illustrating how the spatial component cost $C_{LI}(p, Z)$ and the distance component cost $C_{LD}(p, Z)$ of the LIDAR cost is integrated with the stereo matching cost $C_{ST}(p, Z)$.

(A) Among the stereo matching cost $C_{ST}(p, Z)$ of a pixel $r_0$ corresponding to an emitting direction of the laser radar distance measurement unit 110, to the stereo matching cost $C_{ST}(p, Z)$ with respect to a LIDAR distance $\gamma$, a product of the smallest spatial component cost $C_{LI}(p, Z)$ and the smallest distance component cost $C_{LD}(p, Z)$ is added.

(B) Among the stereo matching cost $C_{ST}(p, Z)$ of the pixel $r_0$ corresponding to the emitting direction of the laser radar distance measurement unit 110, to the stereo matching cost $C_{ST}(p, Z)$ with respect to a distance Z that is apart from the LIDAR distance $\gamma$ by $\Delta Z$, a product of the smallest spatial component cost $C_{LI}(p, Z)$ and the distance component cost $C_{LD}(p, Z)$ calculated by using the formula (15) (where $Z=\gamma+\Delta Z$) is added.

(C) Among the stereo matching cost $C_{ST}(p, Z)$ of a surrounding pixel P of the pixel $r_0$ corresponding to the emitting direction of the laser radar distance measurement unit 110, to the stereo matching cost $C_{ST}(p, Z)$ with respect to a LIDAR distance $\gamma$, a product of the spatial component cost $C_{LI}(p, Z)$ calculated by using the formula (5) (where p is a length between the surrounding pixel P and the pixel $r_0$) and the smallest distance component cost $C_{LD}(p, Z)$ is added.

(D) Among the stereo matching cost $C_{ST}(p, Z)$ of the surrounding pixel P of the pixel $r_0$ corresponding to the emitting direction of the laser radar distance measurement unit 110, to the stereo matching cost $C_{ST}(p, Z)$ with respect to a LIDAR distance $\gamma$, a product of the spatial component cost $C_{LI}(p, Z)$ calculated by using the formula (5) (where p is a length between the surrounding pixel P and the pixel $r_0$) and the distance component cost $C_{LD}(p, Z)$ calculated by using the formula (15) (where $Z=\gamma+\Delta Z$) is added.

<Summary>

As described above, the distance measurement system 100 according to the second embodiment exhibits an effect for preventing an object surface from splitting, in addition to the effects described in the first embodiment.

Third Embodiment

In a third embodiment, a distance measurement system 100 capable of continuing a process even when failure occurs, and capable of displaying a message (information) indicating that failure has occurred, will be described. As described above with reference to FIGS. 12 and 13, the ECU 20 can detect failure in the laser radar distance measurement unit 110 and the stereogram processing unit 120.

When failure occurs in the laser radar distance measurement unit 110, the laser radar distance measurement unit 110 sends a notification to the stereogram processing unit 120, or the stereogram processing unit 120 detects the failure and sends a notification to the ECU 20. The ECU 20 can continue driver-assistance by using a range image generated by the stereogram processing unit 120.

When failure occurs in the stereogram processing unit 120, the stereogram processing unit 120 sends a notification to the laser radar distance measurement unit 110, or the ECU 20 detects the failure. The ECU 20 can continue driver-assistance by using distance information and an emitting direction output from the laser radar distance measurement unit 110.

However, if communication failure, such that the ECU 20 cannot communicate with the stereogram processing unit 120, occurs, the ECU 20 cannot acquire distance information from the laser radar distance measurement unit 110 via the stereogram processing unit 120. In such a case, the ECU 20 may be configured to acquire an emitting direction and distance information from the laser radar distance measurement unit 110 directly.

Accordingly, if either the laser radar distance measurement unit 110 or the stereogram processing unit 120 is operating normally, the ECU 20 can continue driver-assistance by using a range image or distance information, though fusion is not performed.

Figure 45:
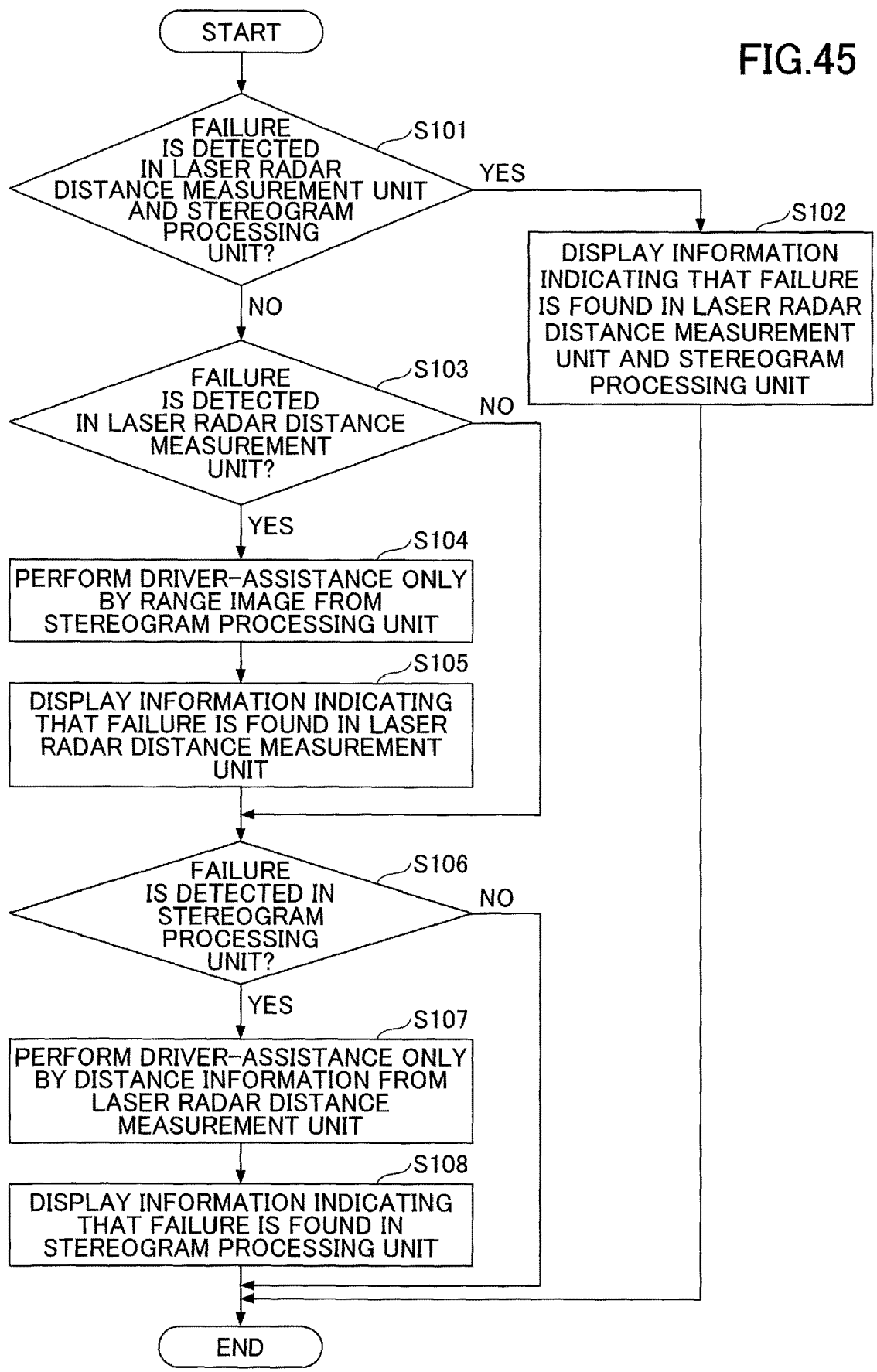
FIG. 45 is an exemplary flowchart illustrating a process of an ECU when failure has occurred in the laser radar distance measurement unit or the stereogram processing unit.

FIG. 45 is an exemplary flowchart illustrating a process of the ECU 20 when failure has occurred in the laser radar distance measurement unit 110 or the stereogram processing unit 120. A process illustrated in FIG. 45 is repeatedly executed while a moving body is running.

First, the ECU 20 determines if failure is detected in both the laser radar distance measurement unit 110 and the stereogram processing unit 120 (S101). The failure may be detected by the laser radar distance measurement unit 110, the stereogram processing unit 120, or the ECU 20.

If the determination at step S101 is positive (S101: YES), the ECU 20 displays information on the display device 21, indicating that the laser radar distance measurement unit 110 and the stereogram processing unit 120 have failed (S102).

Figure 46A:
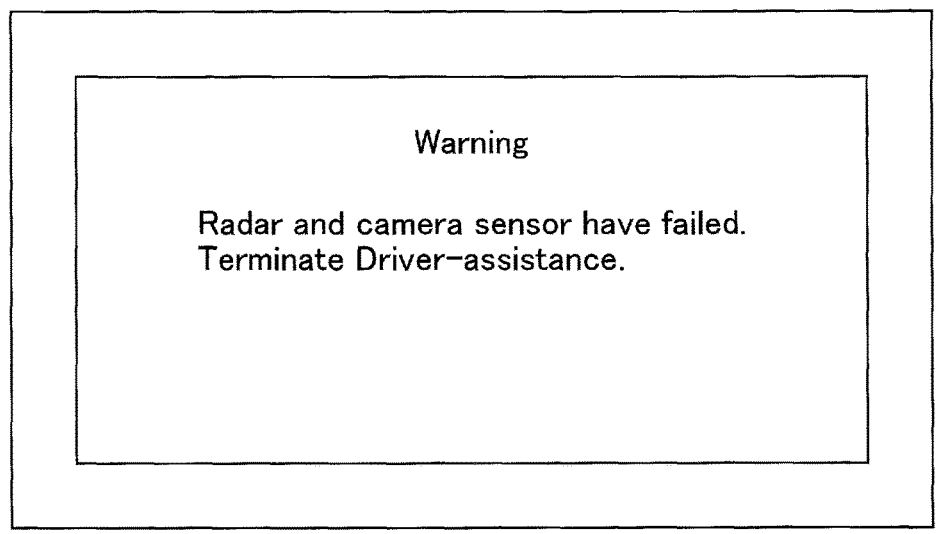
FIGS. 46A to 46C are examples displayed when failure occurs in the laser radar distance measurement unit or the stereogram processing unit.

An example of the information displayed on the display device 21 will be illustrated in FIG. 46A.

If the determination at step S101 is negative (S101: NO), the ECU 20 determines if failure is detected in the laser radar distance measurement unit 110 (S103). The failure may be detected by the laser radar distance measurement unit 110 or the stereogram processing unit 120.

If the determination at step S103 is positive (S103: YES), the ECU 20 performs driver-assistance by only a range image from the stereogram processing unit 120 (S104). As the ECU 20 has been performing driver-assistance by using a range image, a process of the driver-assistance is not changed.

Next, the ECU 20 displays information on the display device 21, indicating that the laser radar distance measurement unit 110 has failed (S105). An example of the information displayed on the display device 21 will be illustrated in FIG. 46B.

Next, the ECU 20 determines if failure is detected in the stereogram processing unit 120 (S103). The failure may be detected by the stereogram processing unit 120 or the ECU 20.

If the determination at step S106 is positive (S106: YES), the ECU 20 performs driver-assistance by only distance information from the laser radar distance measurement unit 110 (S107). That is, the ECU 20 starts driver-assistance based on a location of an object (emitting direction) and a distance, not based on a range image.

Next, the ECU 20 displays information on the display device 21, indicating that the stereogram processing unit 120 has failed (S108). An example of the information displayed on the display device 21 will be illustrated in FIG. 46C.

Accordingly, when the laser radar distance measurement unit 110 fails, or when the stereogram processing unit 120 fails, the ECU 20 can continue driver-assistance.

Figure 46B:
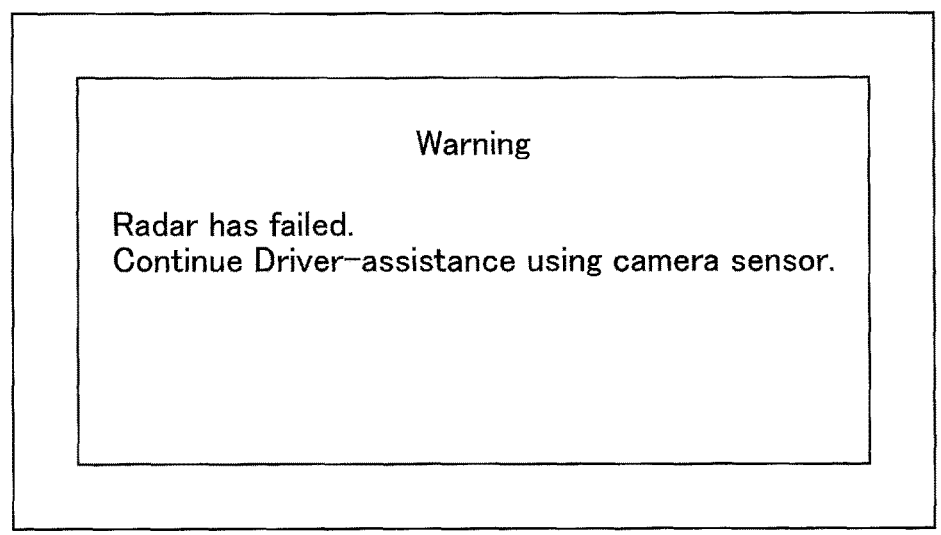
Figure 46C:
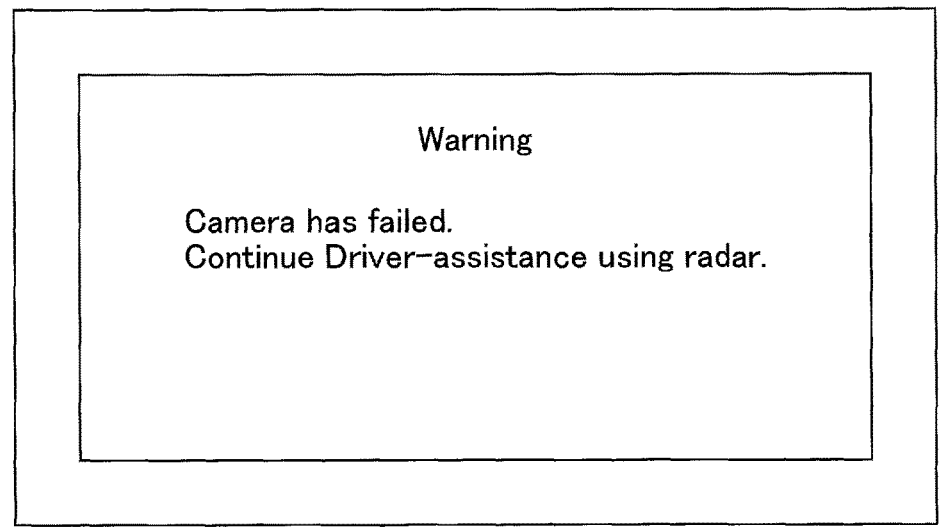

FIGS. 46A to 46C are the examples displayed on the display device 21 when failure occurs in the laser radar distance measurement unit 110 or the stereogram processing unit 120.

The information illustrated in FIG. 46A is displayed on the display device 21 when both the laser radar distance measurement unit 110 and the stereogram processing unit 120 have failed. In FIG. 46A, a message "Warning Radar and camera sensor have failed. Terminate Driver-assistance" is displayed. Based on the message, an occupant in a moving body can recognize that driver-assistance is no longer performed because the laser radar distance measurement unit 110 and the stereogram processing unit 120 are in failure.

The information illustrated in FIG. 46B is displayed on the display device 21 when the laser radar distance measurement unit 110 has failed. In FIG. 46B, a message "Warning Radar has failed. Continue Driver-assistance using camera sensor." is displayed. Based on the message, an occupant in a moving body can recognize that the laser radar distance measurement unit 110 is in failure but that driver-assistance is continued.

The information illustrated in FIG. 46C is displayed on the display device 21 when the stereogram processing unit 120 has failed. In FIG. 46C, a message "Warning Camera has failed. Continue Driver-assistance using radar." is displayed. Based on the message, an occupant in a moving body can recognize that the stereogram processing unit 120 is in failure but that driver-assistance is continued.

Fourth Embodiment

In a fourth embodiment, addition of LIDAR cost $C_{LI}$ (p, Z) to stereo matching cost $C_{ST}$ (p, Z) with LIDAR cost $C_{LI}$ (p, Z) is performed partially. In the first embodiment, as described with reference to FIGS. 20 and 21, LIDAR cost $C_{LI}$(p, Z) is added to the stereo matching cost $C_{ST}$ (p, Z) of the pixel $r_0$ corresponding to the emitting direction of laser light and the stereo matching cost $C_{ST}$(p, Z) of all surrounding pixels of the pixel $r_0$.

Figure 47:
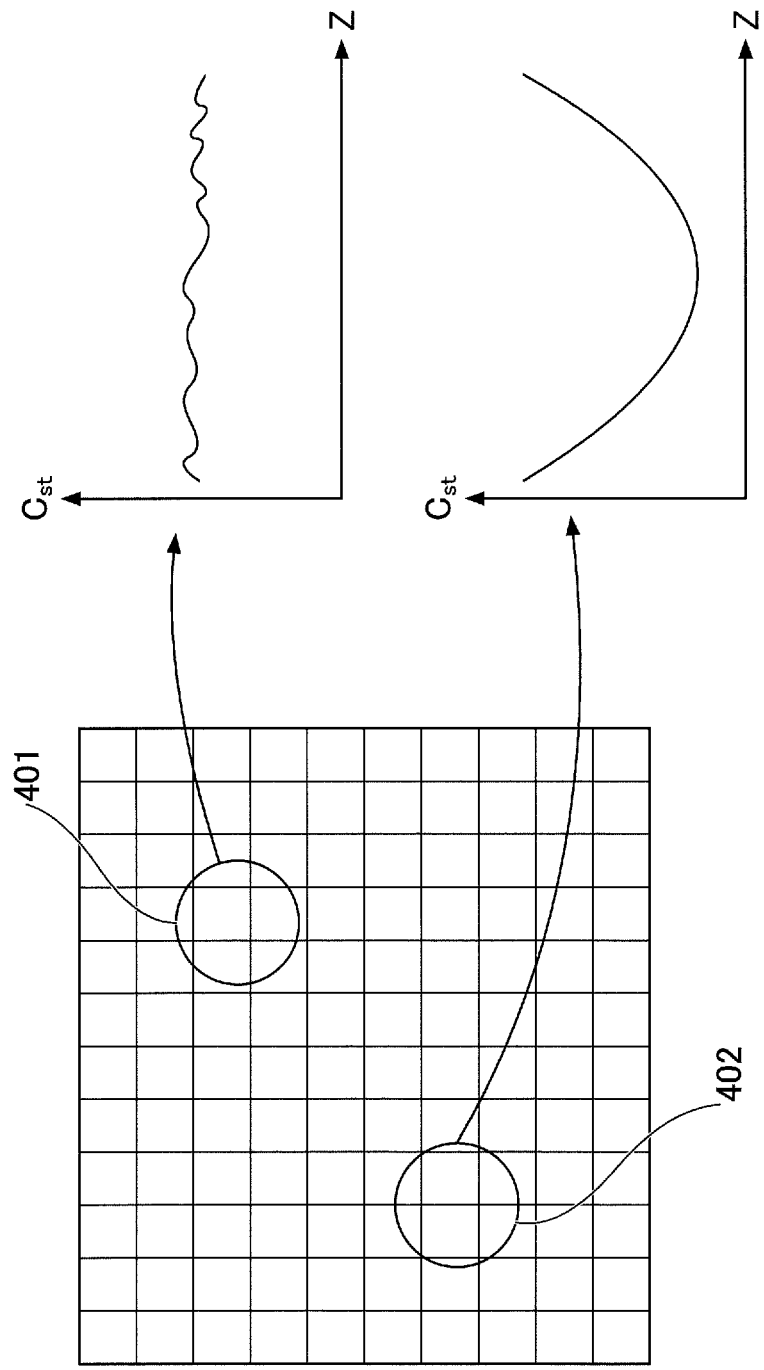
FIG. 47 is a diagram schematically illustrating image data and locations where laser light is emitted.

In the fourth embodiment, as illustrated in FIG. 47, voting (addition) of LIDAR cost $C_{LI}$(p, Z) is not necessarily performed to all of the stereo matching cost $C_{ST}$(p, Z) of the pixel $r_0$ corresponding to the emitting direction of laser light and the surrounding pixels of the pixel $r_0$. The addition is performed in accordance with statuses of the LIDAR cost $C_{LI}$(p, Z) and the stereo matching cost $C_{ST}$(p, Z).

FIG. 47 is a diagram schematically illustrating image data and locations where laser light is emitted (hereinafter, the location may be referred to as an "irradiated location"). Two irradiated locations 401 and 402 are illustrated in FIG. 47. Laser light is spread on part of pixels in the image data. Stereo matching cost $C_{ST}$(p, Z) of the irradiated location 401 is almost flat, and it is difficult to identify an extreme value. Conversely, stereo matching cost $C_{ST}$(p, Z) of the irradiated location 402 is convex downward (that is, an extreme value is clearly present). Thus, it is difficult to find an extreme value of the stereo matching cost $C_{ST}$(p, Z) of the irradiated location 401, but it is easy to find an extreme value of the stereo matching cost $C_{ST}$(p, Z) of the irradiated location 402.

Figure 48B:
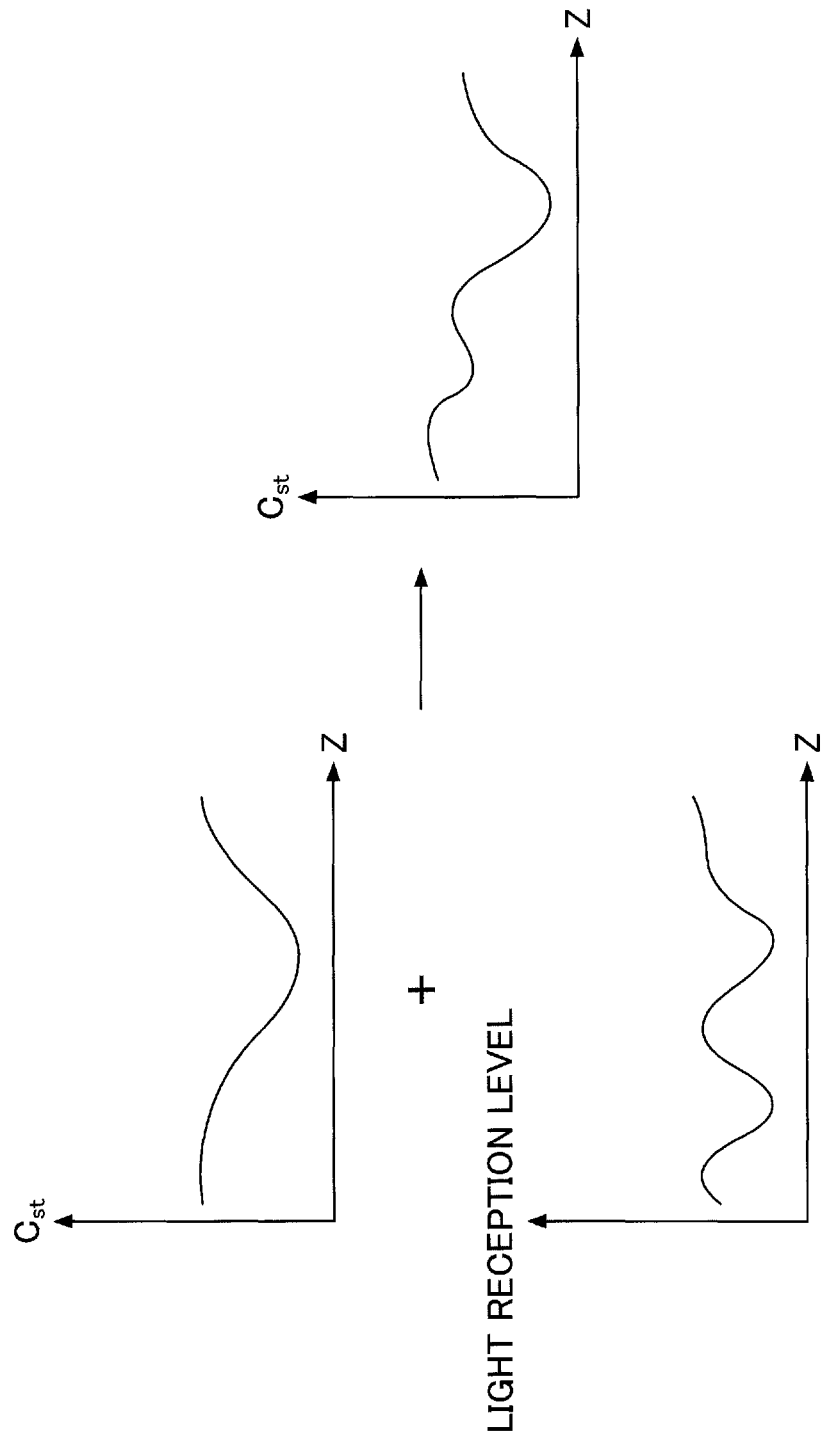

FIGS. 48A and 48B are diagrams illustrating integration of a light reception level associated with distance information with stereo matching cost $C_{ST}$(p, Z). FIG. 48A illustrates an example of integration with respect to the irradiated location 401, and FIG. 48B illustrates an example of integration with respect to the irradiated location 402. In FIG. 48A, a minimum value of the light reception level associated with distance information is clear. Thus, as a result of integrating a light level with stereo matching cost $C_{ST}$(p, Z), a minimum value can be seen clearly.

In a case such as FIG. 48B, integration is effective when multi-pulse occurs in a light receiving level (when multiple pulse-like peaks appear on a graph of a light receiving level). In FIG. 48B, two local minimum values are present on a light receiving level curve. Such a light receiving level curve is obtained when laser light is reflected by multiple objects. As a result of integrating a light level with stereo matching cost $C_{ST}$(p, Z) in FIG. 48B, a minimum value can be seen clearly.

Thus, the stereogram processing unit 120 performs integration of a light reception level with stereo matching cost $C_{ST}$(p, Z) in accordance with the following rules. Note that the integration is performed, similar to the first embodiment, with respect to a pixel $r_0$ corresponding to an emitting direction of laser light and surrounding pixels of the pixel $r_0$.

When stereo matching cost $C_{ST}$(p, Z) does not vary in accordance with change of a distance Z (this state of the stereo matching cost $C_{ST}$(p, Z) may also be referred to as "stereo matching cost $C_{ST}$(p, Z) is flat"), and there is only one minimum value in a light receiving level curve (of LIDAR), integration of a light level with stereo matching cost $C_{ST}$(p, Z) is performed When multi-pulse occurs in a light receiving level, and there is only one minimum value in stereo matching cost $C_{ST}$(p, Z), integration of a light level with stereo matching cost $C_{ST}$(p, Z) is performed In other words, when stereo matching cost $C_{ST}$(p, Z) does not vary in accordance with change of a distance Z and multi-pulse occurs in a light receiving level, integration can be omitted because an effect of integration cannot be obtained sufficiently. Also, when a minimum value of stereo matching cost $C_{ST}(p, Z)$ is clearly determined, and a minimum value of a light receiving level is clearly determined, integration can be omitted because a location of an object can already be determined without performing integration (however, in this case, integration may be performed for confirmation).

Whether or not stereo matching cost $C_{ST}(p, Z)$ is flat can be determined, for example, by comparing a difference of a maximum value and a minimum value with a threshold. If the difference is sufficiently large, a minimum value is clearly determined. Whether or not multi-pulse occurs in a light receiving level can be determined by, for example, determining if the number of local minimum values is more than one.

In the above description regarding FIGS. 48A and 48B, the expression of "integrating a light reception level of LIDAR with stereo matching cost" is used. This is equivalent to integrate LIDAR cost $C_{LI}(p, Z)$ with stereo matching cost $C_{ST}(p, Z)$.

Fifth Embodiment

In a fifth embodiment, a range image provision system including a server apparatus will be described. The server apparatus performs at least a part of the process performed in the above described distance measurement system 100.

FIG. 49 is a schematic diagram of a range image provision system 50. As illustrated in FIG. 49, a distance measurement system 100 installed in a moving body 200 communicates with a server apparatus 51 via a network N (the server apparatus 51 may also be referred to as a "server 51"). To the server 51, the distance measurement system 100 transmits distance information, an emitting direction, a reference image, and a comparison image. When receiving the above mentioned information, the server 51 generates a range image by performing the process described in the first, second, third, or fourth embodiment, and returns the range image to the distance measurement system 100.

Figure 50:
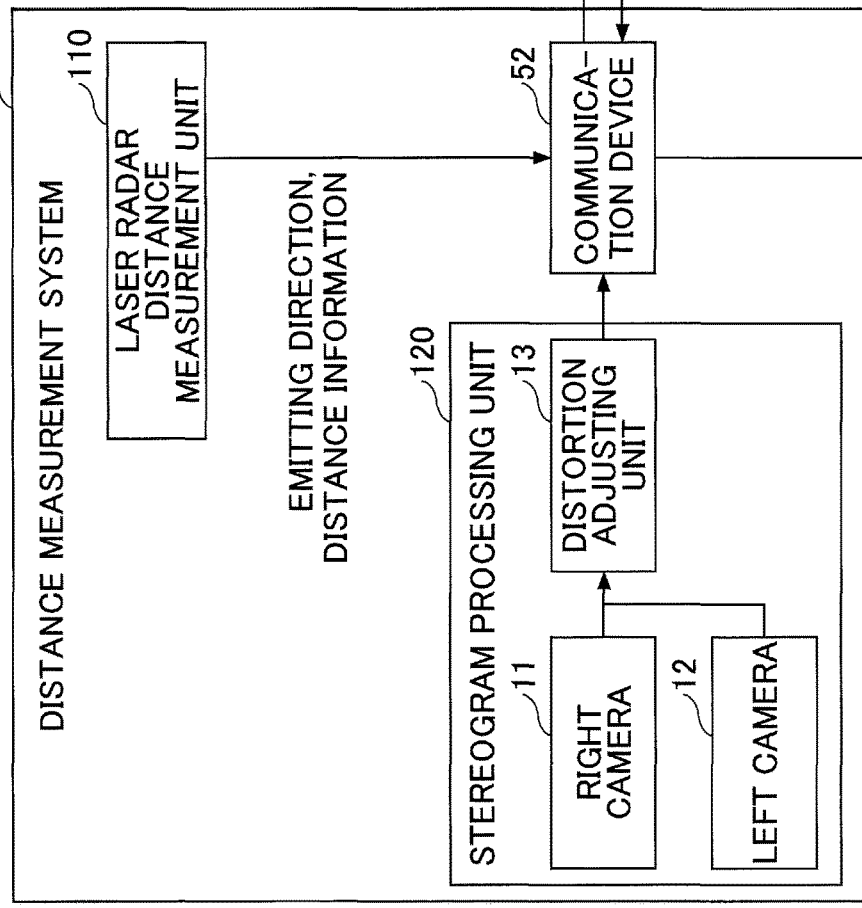
FIG. 50 is an example of a functional block diagram of the range image provision system.

FIG. 50 is an example of a functional block diagram of the range image provision system 50. Functions of the laser radar distance measurement unit 110 are the same as described in the first to fourth embodiments. The laser radar distance measurement unit 110 transmits an emitting direction of laser light and distance information to a communication device 52. A stereogram processing unit 120 in the fifth embodiment does not need to have the distance calculation unit 14, and the distortion adjusting unit 13 transmits a reference image and a comparison image to the communication device 52. The communication device 52 transmits the reference image and the comparison image to the server 51.

The server 51 includes a communication device 53 and a distance calculation unit 14. The server 51 performs integration of stereo matching cost $C_{ST}(p, Z)$ with LIDAR cost $C_{LI}(p, Z)$, to generated a range image (high-density/high-resolution 3D range image). The communication device 53 in the server 51 transmits the range image to the moving body 200.

The moving body 200 transmits the range image and the reference image to the ECU 20. Accordingly, the ECU 20 can perform driver-assistance, similar to the first to fourth embodiments.

As described above, as the moving body 200 generates a range image by communicating with the server 51, cost of the distance measurement system 100 can be reduced.

The server 51 may also transmit the range image to another moving body (which is other than the moving body from which the server 51 receives information). For example, when a moving body 200 positioned at a head of a vehicle line in a traffic jam transmits, to the server 51, distance information, an emitting direction, a reference image, and a comparison image, the server 51 transmits the generated range image to following moving bodies. Accordingly, the following moving bodies can recognize a state of the moving body 200 positioned at the head of the vehicle line.

Other Examples

A best mode for practicing the present invention has been described above using embodiments. However, the present invention is not limited to the above described embodiments. Various variations and replacements may be applied within the scope of the present invention.

Examples of a moving body in which the distance measurement system 100 is installed include a vehicle and an automobile, but the distance measurement system 100 is applicable to various types of moving bodies. For example, it is effective to apply the distance measurement system 100 to a moving body travelling autonomously in some cases, such as an aircraft, a drone, a ship, or a robot.

Laser light used in the present invention is not limited to a specific one. Any type of light having a wavelength appropriate for measuring distance may be used. Visible light, infrared radiation, or ultraviolet radiation (in a range not affecting a human body) may be used. Light may be regarded as an electromagnetic wave.

In the present embodiment, as an example of a distance measurement method having distance resolution, LIDAR is introduced. However, other methods such as methods using millimeter wave or ultrasound (sonar) may be used. A method of actively measuring distance, such as the above mentioned examples, is referred to as an active distance measurement.

In the present embodiment, a case for using a stereocamera having two camera units is described. However, a stereocamera used in the present invention may have more than two camera units. Also, the camera units may be arranged apart from each other in a horizontal direction, or may be arranged apart from each other in a vertical direction. Further, the camera units may capture light other than visible light, such as near infrared radiation or infrared radiation. The camera units may capture light via polarization filters.

The stereogram processing unit 120 is an example of an image processing unit or an image processing means. The laser radar distance measurement unit 110 is an example of a distance measurement unit or a distance information acquisition means. LIDAR cost $C_{LI}(p, Z)$ is an example of distance cost or a first evaluation value. Distance component cost $C_{LD}(p, Z)$ is an example of a second evaluation value. The failure monitoring unit 601a is an example of a first failure detecting unit. The failure monitoring unit 14a is an example of a second failure detecting unit.

What is claimed is:

1. An image processing method of generating a range image, the method comprising:
    detecting, by a distance measurement unit including a light outputting device, a distance to an object as a measured distance by emitting light from the light outputting device to the object;
    performing, by circuitry, matching of a stereogram by shifting a comparison image with respect to a reference image, to calculate matching cost values of pixels in the stereogram in a parallax space, each of the matching cost values in the parallax space corresponding to a corresponding shift amount of a pixel between the reference image and the comparison image;

converting, by the circuitry, the matching cost values in the parallax space into a set of matching cost values in a distance space, each of the matching cost values in the distance space corresponding to a corresponding distance;

performing, by the circuitry, integration of a distance evaluation value related to the measured distance, with a matching cost value corresponding to the measured distance among the matching cost values of a pixel in the stereogram corresponding to the location on the object of which the distance is detected by the distance measurement unit; and generating by the circuitry, after the integration, a range image for measuring a distance to an object, based on a result of the integration.

2. The method according to claim 1, wherein
the distance evaluation value is expressed as a first function of a length from the pixel corresponding to the location on the object of which the distance is detected by the distance measurement unit, the first function taking a minimum when the length is zero and becoming larger as the length becomes larger.

3. The method according to claim 2, wherein, in integrating the distance evaluation value,
a value of the first function, with respect to the length between the pixel corresponding to the location on the object of which the distance is detected by the distance measurement unit and a surrounding pixel of the pixel corresponding to the location on the object of which the distance is detected by the distance measurement unit, is added to a matching cost value corresponding to the measured distance among matching cost values of the surrounding pixel.

4. The method according to claim 2, wherein
the distance evaluation value is a product of a value of the first function and a value of a second function of distance, the second function taking a minimum when the distance is equal to the measured distance and becoming larger as the distance deviates from the measured distance.

5. The method according to claim 4, wherein
the integration includes
integrating, with a matching cost value corresponding to the measured distance among matching cost values of the pixel corresponding to the location on the object of which the distance is detected by the distance measurement unit, a product of a minimum value of the first function and a minimum value of the second function as the distance evaluation value; and
integrating, with a matching cost value corresponding to a distance deviating from the measured distance by a given amount, a product of the minimum value of the first function and a value of the second function with respect to the given amount as the distance evaluation value.

6. The method according to claim 4, wherein
the integration includes
integrating, with a matching cost value corresponding to the measured distance among matching cost values of a surrounding pixel of the pixel corresponding to the location on the object of which the distance is detected by the distance measurement unit, a product of a value of the first function, with respect to a length between the surrounding pixel and the pixel corresponding to the location on the object of which the distance is detected by the distance measurement unit, and a minimum value of the second function, as the distance evaluation value; and integrating, with a matching cost value corresponding to a distance deviating from the measured distance by a given amount among matching cost values of a surrounding pixel of the pixel corresponding to the location on the object of which the distance is detected by the distance measurement unit, a product of a value of the first function with respect to a length between the surrounding pixel and the pixel corresponding to the location on the object of which the distance is detected by the distance measurement unit, and a value of the second function obtained based on the given amount, as the distance evaluation value.

7. The method according to claim 1, further comprising
calculating, for each pixel, an evaluation value by applying a dense matching algorithm to a value obtained by integration of the distance evaluation value with the matching cost value;
calculating an energy cost of a given pixel, by adding the evaluation value of the given pixel and the evaluation values of a surrounding pixel of the given pixel; and
determining a distance that minimizes the energy cost as distance information of the given pixel.

8. The method according to claim 1, further comprising
displaying information indicating that the distance measurement unit or a capturing unit has failed, in response to a detection of failure of the distance measurement unit or the capturing unit, wherein the capturing unit is configured to capture an image contained in the stereogram.

9. The method according to claim 8, wherein
the generating of the range image is performed by using the matching cost values of the stereogram, in a case in which failure of the distance measurement unit is detected; and
the method further comprises outputting the measured distance detected by the distance measurement unit in a case in which failure of the capturing unit is detected.

10. The method according to claim 1, further comprising detecting a light reception level curve, each value on the light reception level curve being associated with a distance to the object; wherein
the integration of the distance evaluation value with the matching cost value of the pixel corresponding to the location on the object of which the distance is detected by the distance measurement unit is performed in a case in which the matching cost values in the distance space is flat and a number of a minimum value of the light reception level curve is one, or in which the light reception level curve includes a plurality of peaks and the number of the minimum value of the matching cost values in the distance space is one.

11. The method according to claim 1, wherein the pixel corresponding to the location on the object of which the distance is detected by the distance measurement unit is identified based on a direction of measuring a distance of the object by the distance measurement unit.

12. The method according to claim 1, wherein, in the generating of the range image, distance information determined based on the result of the integration is associated with the pixel.

13. An image processing apparatus configured to generate a range image, the image processing apparatus comprising:

a distance measurement unit including a light outputting device, the distance measurement unit being configured to detect a distance to an object by emitting light from the light outputting device to the object; and circuitry configured to cause the distance measurement unit to detect the distance to the object as a measured distance;

to perform matching of the stereogram by shifting a comparison image with respect to a reference image, to calculate matching cost values of pixels in the stereogram in a parallax space, each of the matching cost values in the parallax space corresponding to a corresponding shift amount of a pixel between the reference image and the comparison image;

to convert the matching cost values in the parallax space into a set of matching cost values in a distance space, each of the matching cost values in the distance space corresponding to a corresponding distance;

to perform integration of a distance evaluation value related to the measured distance, with a matching cost value corresponding to the measured distance among the matching cost values of a pixel in the stereogram corresponding to the location on the object of which the distance is detected by the distance measurement unit; and to generate, after the integration, a range image for measuring a distance to an object, based on a result of the integration.

14. An on-board device installed in a moving body, the on-board device comprising:

a distance measurement unit including a light outputting device, the distance measurement unit being configured to detect a distance to an object by emitting light from the light outputting device to the object; and circuitry configured to cause the distance measurement unit to detect the distance to the object as a measured distance;

to perform matching of the stereogram by shifting a comparison image with respect to a reference image, to calculate matching cost values of pixels in the stereogram in a parallax space, each of the matching cost values in the parallax space corresponding to a corresponding shift amount of a pixel between the reference image and the comparison image;

to convert the matching cost values in the parallax space into a set of matching cost values in a distance space, each of the matching cost values in the distance space corresponding to a corresponding distance;

to perform integration of a distance evaluation value related to the measured distance, with a matching cost value corresponding to the measured distance among the matching cost values of a pixel in the stereogram corresponding to the location on the object of which the distance is detected by the distance measurement unit; and to generate, after the integration, a range image based on a result of the integration;

wherein the on-board device is configured to send the range image to an electronic control unit (ECU) in the moving body.

15. A moving body comprising:

the on-board device according to claim 14; and an electronic control unit (ECU) configured to control the moving body by using a range image received from the on-board device.

* * * * *